US008176087B2

(12) United States Patent
Worrall

(10) Patent No.: US 8,176,087 B2
(45) Date of Patent: May 8, 2012

(54) DATA PROCESSING

(75) Inventor: David Tom Worrall, Sheffield (GB)

(73) Assignee: Data Equation Limited, Sheffield (GB)

(*) Notice: Subject to any disclaimer, the term of this patent is extended or adjusted under 35 U.S.C. 154(b) by 340 days.

(21) Appl. No.: 11/824,608

(22) Filed: Jun. 29, 2007

(65) Prior Publication Data
US 2008/0016106 A1  Jan. 17, 2008

(30) Foreign Application Priority Data
Jun. 30, 2006 (GB) .................. 0613026.4

(51) Int. Cl.
G06F 17/30 (2006.01)
(52) U.S. Cl. ....................................... 707/802
(58) Field of Classification Search ............ 707/2–3, 707/101; 711/100
See application file for complete search history.

(56) References Cited

U.S. PATENT DOCUMENTS

| 5,448,727 | A |   | 9/1995  | Annevelink |          |
|-----------|---|---|---------|------------|----------|
| 5,715,441 | A |   | 2/1998  | Atkinson et al. |     |
| 5,748,952 | A | * | 5/1998  | Chadha et al. ........... | 1/1 |
| 5,845,274 | A | * | 12/1998 | Chadha et al. ........... | 707/2 |
| 6,374,268 | B1|   | 4/2002  | Testardi    |         |
| 6,606,628 | B1|   | 8/2003  | Monsen et al. |       |
| 6,643,654 | B1|   | 11/2003 | Patel et al. |        |
| 6,694,323 | B2| * | 2/2004  | Bumbulis ........... | 707/101 |
| 6,724,982 | B1|   | 4/2004  | Hamlin      |         |
| 7,188,048 | B2| * | 3/2007  | Kouritzin et al. ........... | 702/181 |
| 7,499,912 | B2| * | 3/2009  | Hershkovich et al. ........... | 707/3 |
| 2002/0188405 | A1 |  | 12/2002 | Luo et al. |     |
| 2003/0115227 | A1 |  | 6/2003  | Guthery |        |
| 2004/0117448 | A1 |  | 6/2004  | Newman et al. | |
| 2005/0004925 | A1 |  | 1/2005  | Stahl et al. |   |
| 2005/0019009 | A1 |  | 1/2005  | Gough |          |
| 2005/0065986 | A1 |  | 3/2005  | Bixby et al. |   |
| 2005/0071123 | A1 | * | 3/2005 | Kouritzin et al. ........... | 702/181 |
| 2005/0091443 | A1 | * | 4/2005 | Hershkovich et al. ........ | 711/100 |

FOREIGN PATENT DOCUMENTS

| EP | 0859330   | 8/1998  |
| EP | 1113666   | 7/2001  |
| WO | WO94/29807 | 12/1994 |
| WO | WO98/28744 | 7/1998  |

OTHER PUBLICATIONS

Bohannon, P., McIlroy, P., and Rastogi, R., "Main-Memory Index Structures with Fixed-Size partial keys," vol. 30, 2 of SIGMOD Recod, pp. 163-174, ACM Press.*

(Continued)

*Primary Examiner* — Sheree Brown
(74) *Attorney, Agent, or Firm* — James Creighton Wray

(57) ABSTRACT

Data is stored and data objects are indexed by an index having a tree configuration and the tree is traversed to identify the location of a data object. Data objects are analyzed to assess the extent to which a second data object is related to a first data object, and locations of related data objects within the tree are clustered so as to minimize tree traversal when accessing data objects considered to be related.

10 Claims, 52 Drawing Sheets

OTHER PUBLICATIONS

J.R.Rhyne; Hierarchical File Structure Method; IBM Technical Disclosure Bull.; vol. 26, No. 3A; Aug. 1983.

Shigesada et al.; A Distributed Hypermedia Operating System; Proc. of the International Conf. on Comm. Tech.; Aug. 21-25, 2000.

Ames et al.; Richer File System Metadata Using Links and Attributes; Proc. of the 22nd IEEE/NASA Conf. on Mass Storage; Apr. 11-14, 2005.

Alex S.; WINZIP—A Long Way Toward Innovation; posted on www.worthinstalling.com/2006/03; Mar. 25, 2006.

McKusick et al.; A Fast File System for UNIX; ACM Transactions on Computer Systems; Feb. 18, 1984; pp. 181-197.

Yeh et al.; Using File Grouping to Improve Disk Performance; 15th IEEE Int. Symp. on HP Distrbuted Computing; Jun. 19-23, 2006, pp. 365-366.

Kuo et al.; Real-time Data Access Control on B-tree Index Structures; Proc. 15th Int. Conf. on Data Eng.; Mar. 23-26, 1999; pp. 458-467.

* cited by examiner

DATA STREAM ID ⟶ LOCAL STREAM ID

DATA PROCESSING

This application claims the benefit of United Kingdom Application No. 06 13 026.4 filed Jun. 30, 2006, which is hereby incorporated by reference in its entirety.

TECHNICAL FIELD

The present invention relates to a method of storing data, data storage apparatus having a processing device and at least one storage device, instructions executable by a computer or by a network of computers, a computer-readable medium having computer-readable instructions executable by a computer, a computer-readable memory system having structured data stored therein so as to represent a data structure.

BACKGROUND OF THE INVENTION

Data processing environments are known in which data is stored locally on local storage devices. It is also known to store data remotely on networked storage devices. Network transfer of locally and remotely stored data can be slow and difficult for networked users who require access to the data.

BRIEF SUMMARY OF THE INVENTION

According to an aspect of the present invention, there is provided a method of storing data wherein data objects are indexed by an index having a tree configuration and the tree is traversed to identify the location of a data object, comprising the steps of analysing data objects to assess the extent to which a second data object is related to a first data object, and clustering locations of related data objects within the tree so as to minimise tree traversal when accessing data objects considered to be related.

WRITTEN DESCRIPTION OF THE BEST MODE FOR CARRYING OUT THE INVENTION

FIG. 1

Figure 1:
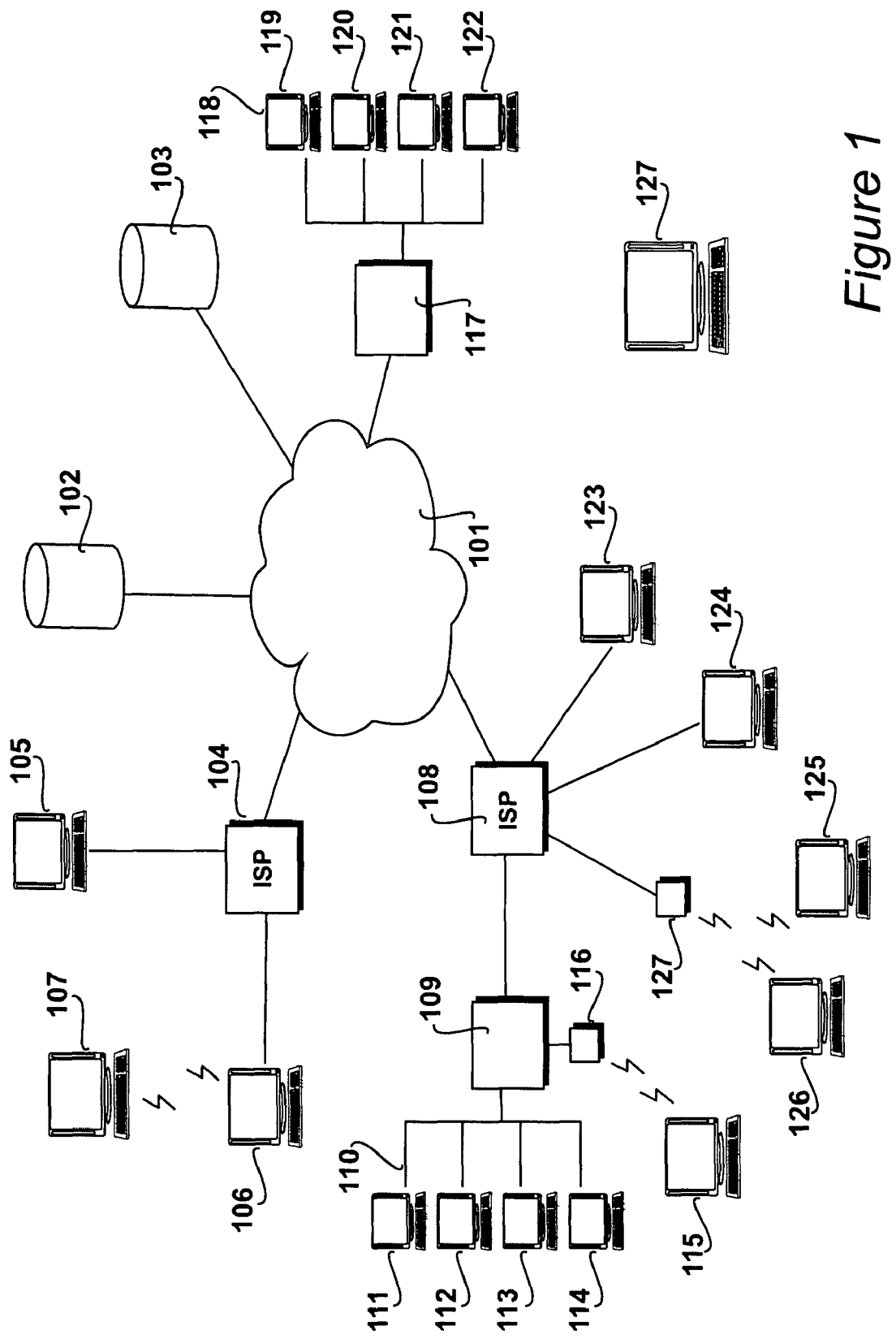
FIG. 1 illustrates a networked environment for implementation of the invention.

A networked environment in which the invention may be implemented is illustrated in FIG. 1. The Internet 101 connects various computer systems and networks around the world. Servers 102 and 103 are directly connected to the internet 101. Internet Service Provider (ISP) 104 is connected to computer systems 105 and 106. Computer system 107 is wirelessly connected on an ad-hoc basis to computer system 106. ISP 108 connects server 109 to the internet 101. Server 109 is part of a wired LAN 110 which connects computer systems 111, 112, 113 and 114. In addition, computer system 115 is wirelessly connected to server 109 via a wireless access point 116. Web server 117 connects directly to the internet 101 and provides a LAN 118 that connects computer systems 119, 120, 121 and 122. Computer systems 123 and 124 are connected to the internet via ISP 108, while computer systems 125 and 126 are connected via wireless modem/router 127 which is also connected to the internet via ISP 108. Computer system 127 is not connected to the internet.

Other methods of connecting computer systems such as servers, personal computers and laptops to the internet, both wired and wirelessly, are possible.

In this example, server 109 and computer systems 111 to 115 are part of a digital effects house providing computer-generated special effects for films, advertisements and so on. Server 117 and computer systems 119 to 122 are part of the same company, and therefore share data, but work in a different physical location. Servers 102 and 103 provide backup for the data produced by the company and are in different physical locations. Computer systems 105, 106, 107, 123 and 124 are the home computer systems of artists working for the company, while computer systems 123 and 124 are laptops of artists who are working within areas that have wireless internet access available, known as wireless hotspots.

In such an environment it can be difficult to share and backup data efficiently. Traditional methods of moving data over networks are slow, particularly when moving the large amounts of data associated with digital effects. There is, therefore, a tendency for artists to store their work on their hard drives rather than backing it up to the local servers. Computer theft or hard drive failure can thus lead to the loss of days of work. Communication over the internet 101 is even slower, meaning that routine backup to remote servers 102 and 103 may occur only once a day, usually overnight. Further, many artists often work on the same data at once, each working on a different aspect of the editing. This can lead to problems with overwriting of work and lockouts.

FIG. 2

Figure 2:
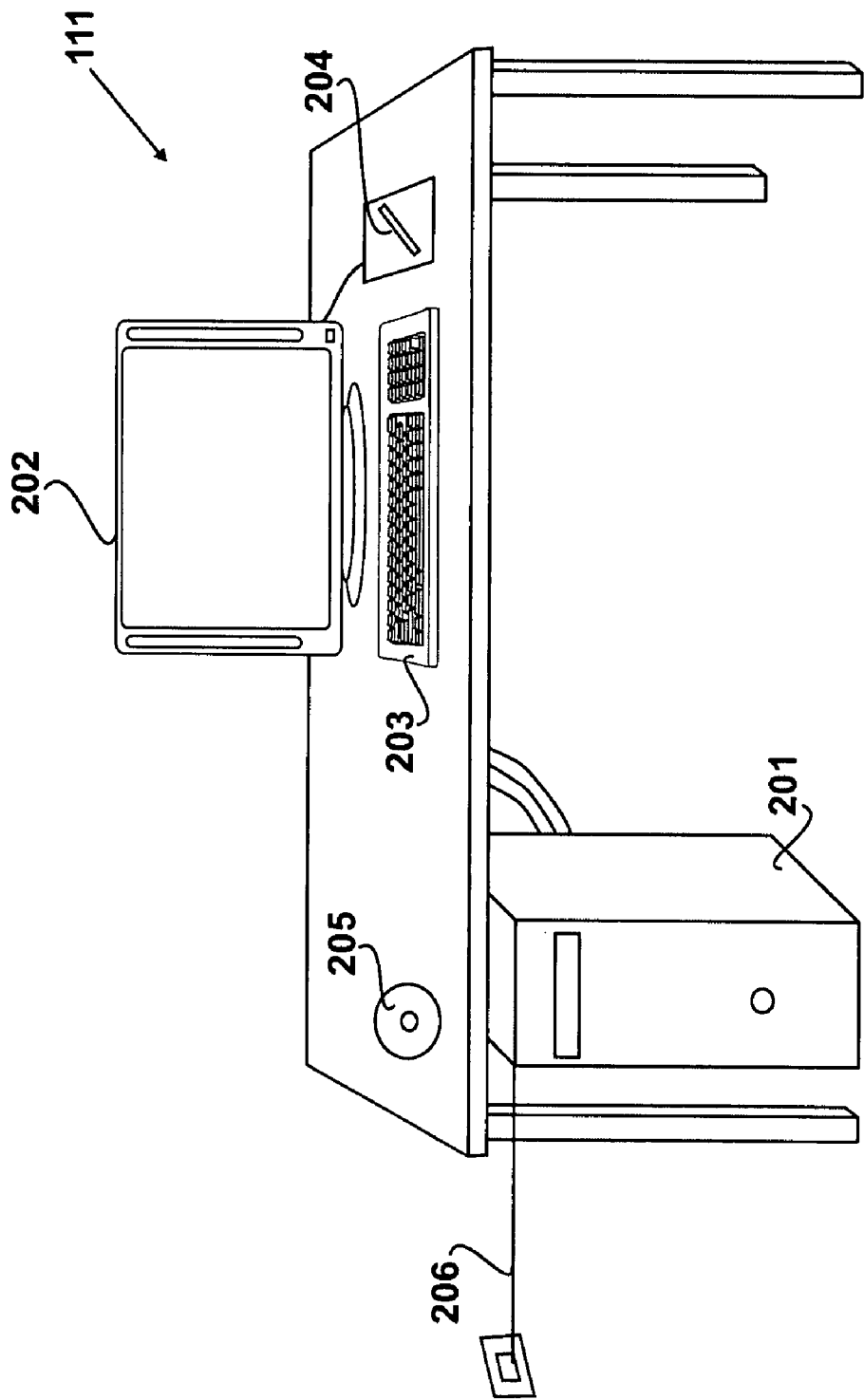
FIG. 2 illustrates a computer system shown in FIG. 1.

FIG. 2 illustrates computer system 111. Thus computer system 111 includes a processing system 201 that supplies image signals to a widescreen video display unit (VDU) 202. The operator controls the processing system 201 by means of a keyboard 203 and a stylus-operated graphics tablet 204.

Instructions controlling the processing system 201 may be installed from a physical medium such as a CD-ROM disk 205, or over a network via network cable 206. These instructions enable the processing system 201 to interpret user commands from the keyboard 203 and the graphics tablet 204 such that data may be viewed, edited and processed.

FIG. 3

Figure 3:
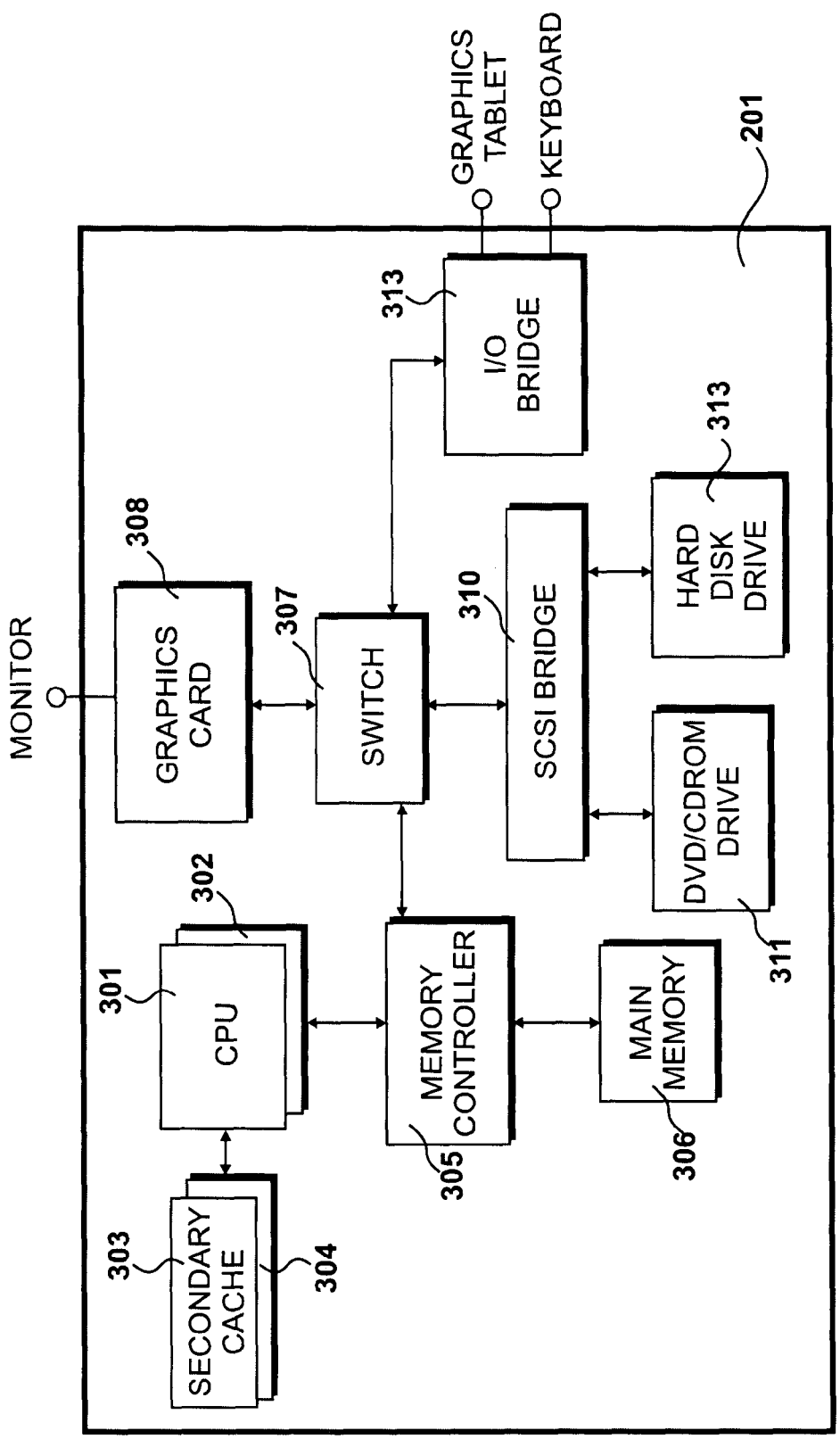
FIG. 3 details a processing system illustrated in FIG. 2.

The processing system 201 shown in FIG. 2 is detailed in FIG. 3. The processing system comprises two central processing units (CPUs) 301 and 302 operating in parallel. Each of these CPUs 301 and 302 has a dedicated secondary cache memory 303 and 304 that facilitates per-CPU storage of frequently used instructions and data. Each CPU 301 and 302 further includes separate primary instruction and data cache memory circuits on the same chip, thereby facilitating a further level of processing improvement. A memory controller 305 provides a common connection between the CPUs 301 and 302 and a main memory 306. The main memory 306 comprises two gigabytes of dynamic RAM.

The memory controller 305 further facilitates connectivity between the aforementioned components of the processing system 201 and a high bandwidth non-blocking crossbar switch 307. The switch makes it possible to provide a direct high capacity connection between any of several attached circuits. These include a graphics card 308. The graphics card 308 generally receives instructions from the CPUs 301 and 302 to perform various types of graphical image rendering processes, resulting in images, clips and scenes being rendered in real time on the monitor 202.

A second SCSI bridge 310 facilitates connection between the crossbar switch 307 and a DVD/CD-ROM drive 311. The CD-ROM drive provides a convenient way of receiving large quantities of instructions and data, and is typically used to install instructions for the processing system 201 onto a hard disk drive 313. Once installed, instructions located on the hard disk drive 312 may be fetched into main memory 306 and then executed by the CPUs 301 and 302. An input/output bridge 313 provides an interface for the graphics tablet 204 and the keyboard 203, through which the user is able to provide instructions to the processing system 201.

FIG. 4

Figure 4:
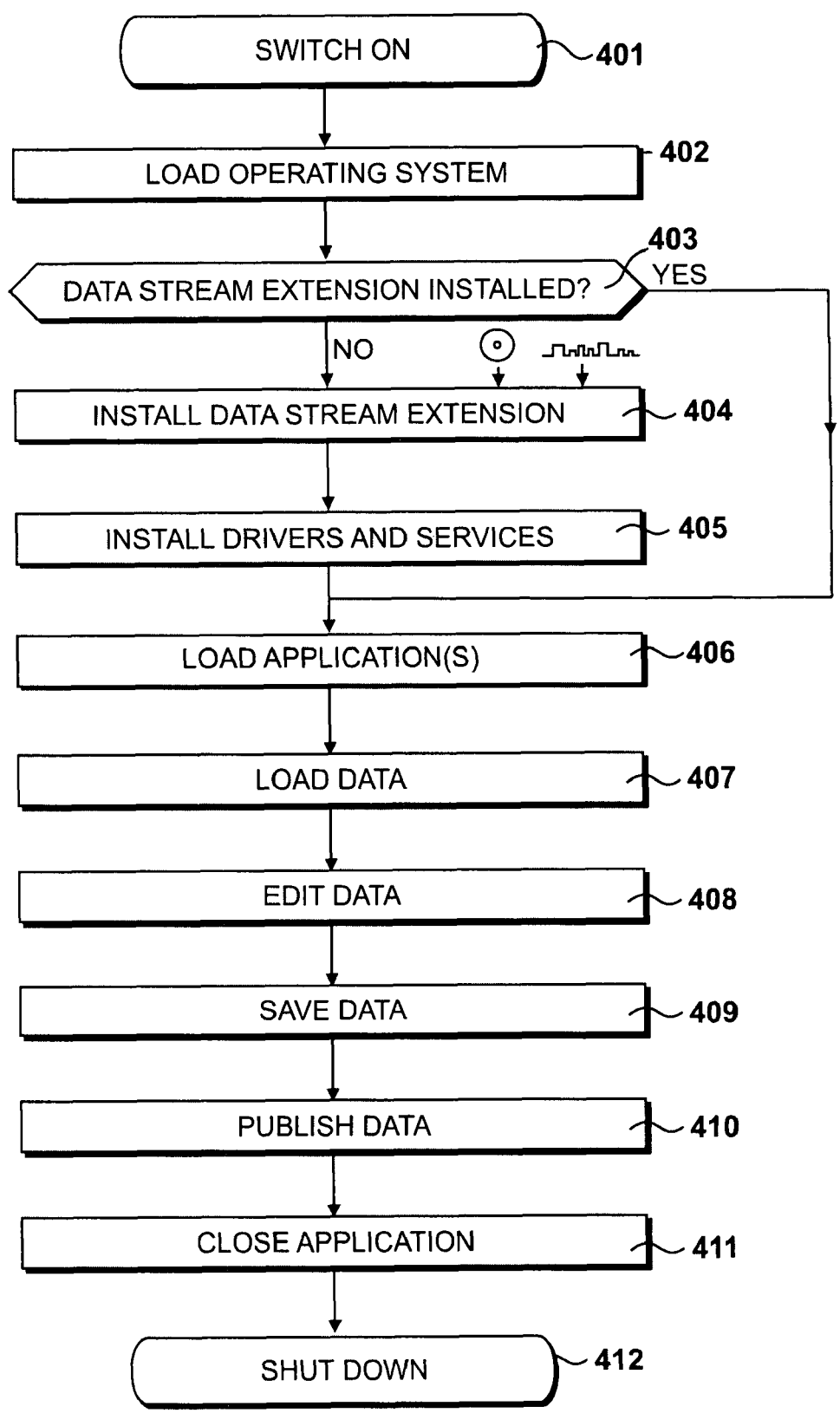
FIG. 4 details steps carried out by the processing system shown in FIG. 3 to process data.

FIG. 4 details steps carried out by processing system 201 to process data. At step 401 the processing system is switched on and at step 402 the operating system is loaded. The operating system may be any commercially available or open source operating system, for example those made available by Microsoft®, Apple®, UNIX® or Linux®. In this example, the operating system is Windows XP®. The functionality of this invention is provided by an extension for the operating system referred to herein as the data stream extension. Thus at step 403 a question is asked as to whether the operating system includes the data stream extension and if this question is answered in the negative then the data stream extension is installed at step 404, with its drivers and background threads being installed at step 405.

If the question asked at step 403 is answered in the affirmative, to the effect that the data stream extension is installed, then at step 406 at least one application is loaded. This may be, for example, an image editing application, character animation application, audio editing application, and so on. An application that explores the filesystem and allows the user to view available files could also be loaded.

Data to be edited is loaded at step 407 and edited at step 408. At step 409 it is saved, and at step 410 the user may publish it if required. Typically, this happens when the user considers the work to be complete.

At step 410 the application is closed and at step 411 processing system 201 is shut down.

FIG. 5

Figure 5:
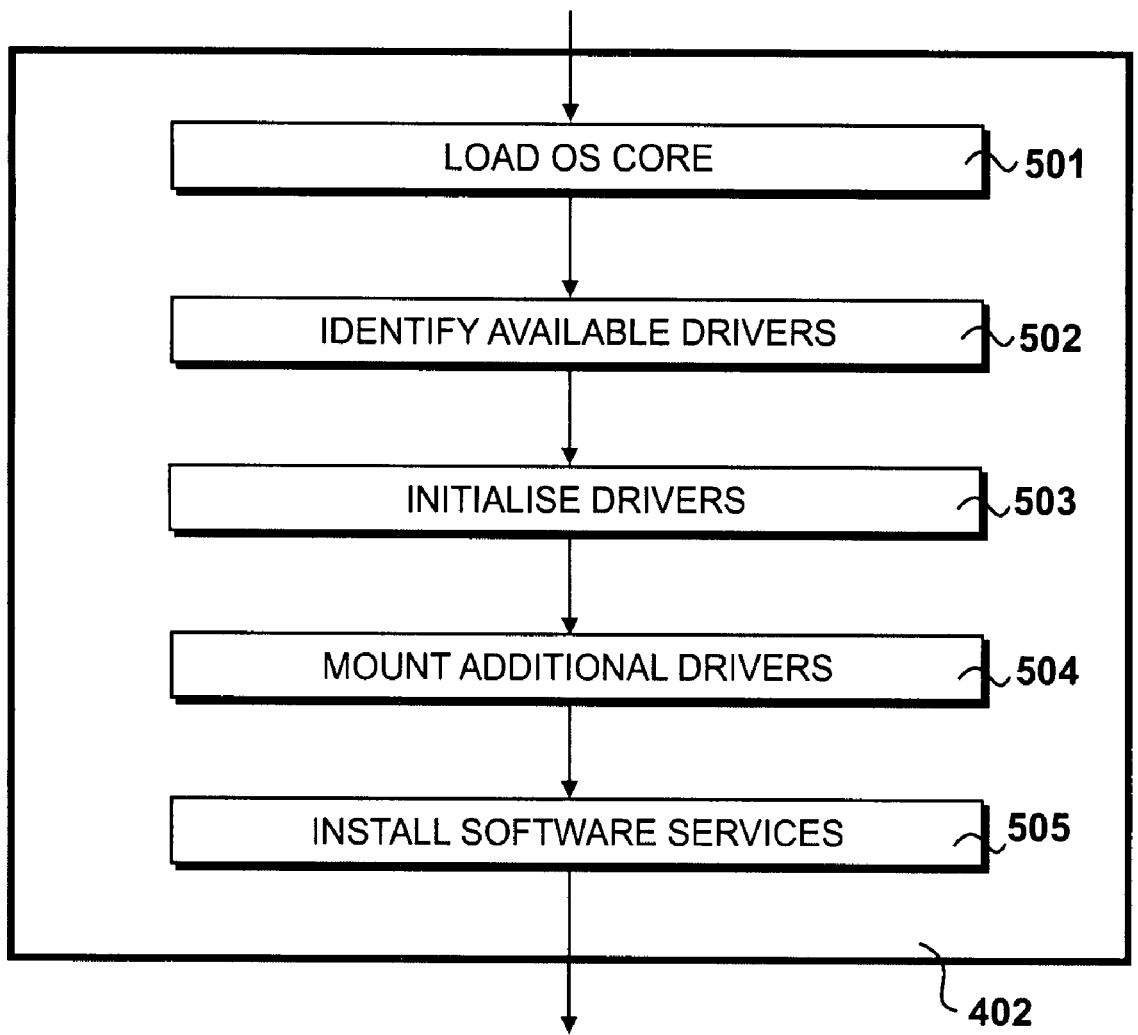
FIG. 5 details steps carried out during FIG. 4 to load an operating system.

Step 402 at which the operating system is loaded is detailed in FIG. 5. At step 501 the core of the operating system is loaded, including the kernel. At step 502 available extensions are identified, and at step 503 drivers for these extensions are initialised. At step 504 any additional drives are mounted, and at step 505 background threads are initialised.

FIG. 6

Figure 6:
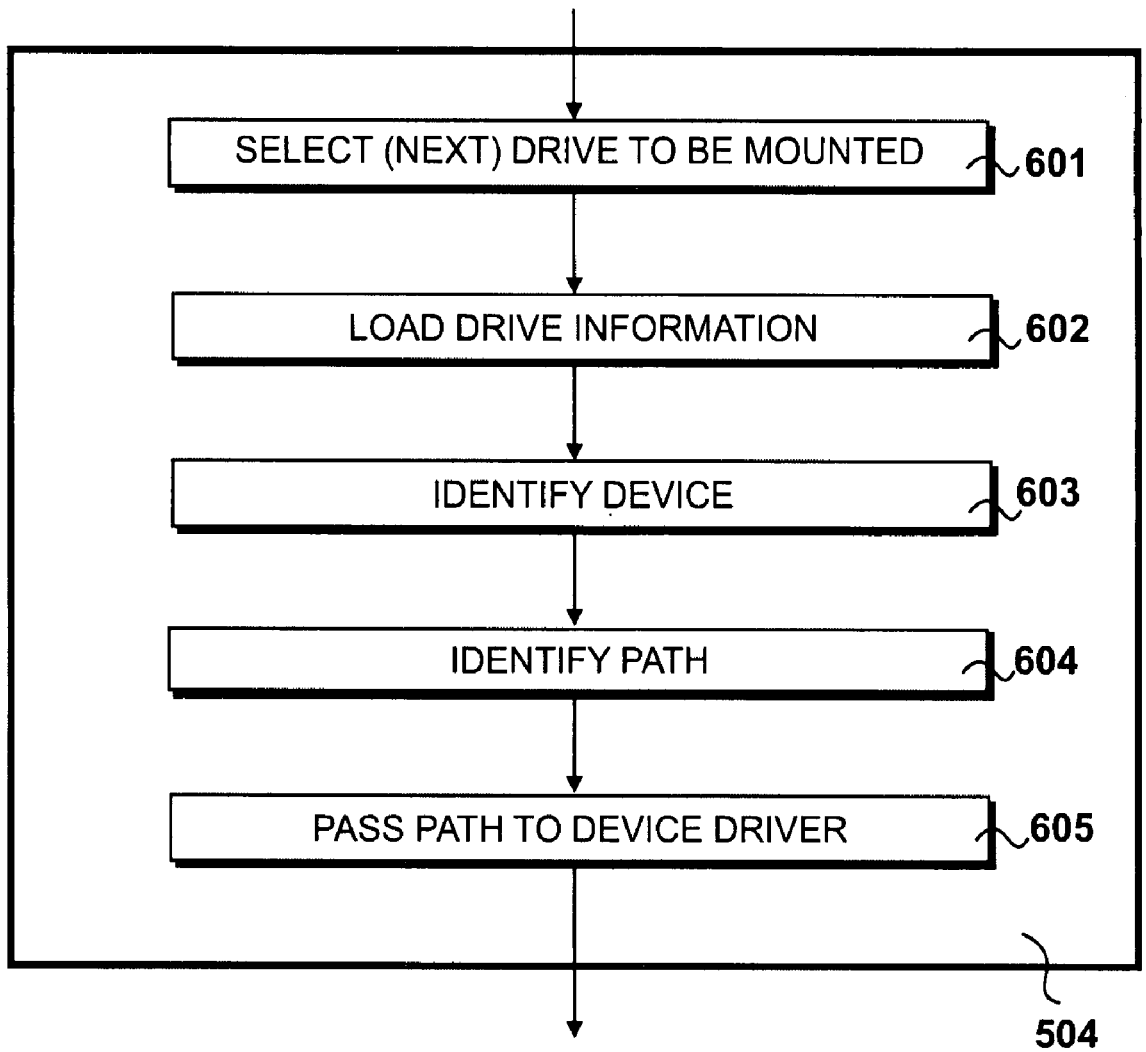
FIG. 6 details steps carried out during FIG. 5 to mount drives.

Step 504 at which drives are mounted is detailed in FIG. 6. At step 601 the first drive to be mounted is selected, and at step 602 information regarding the drive is loaded. At step 603 the device associated with the drive is identified and at step 604 the path of the drive is identified. At step 605 the path is passed to the device driver which completes the step of mounting the drive.

FIG. 7

Figure 7:
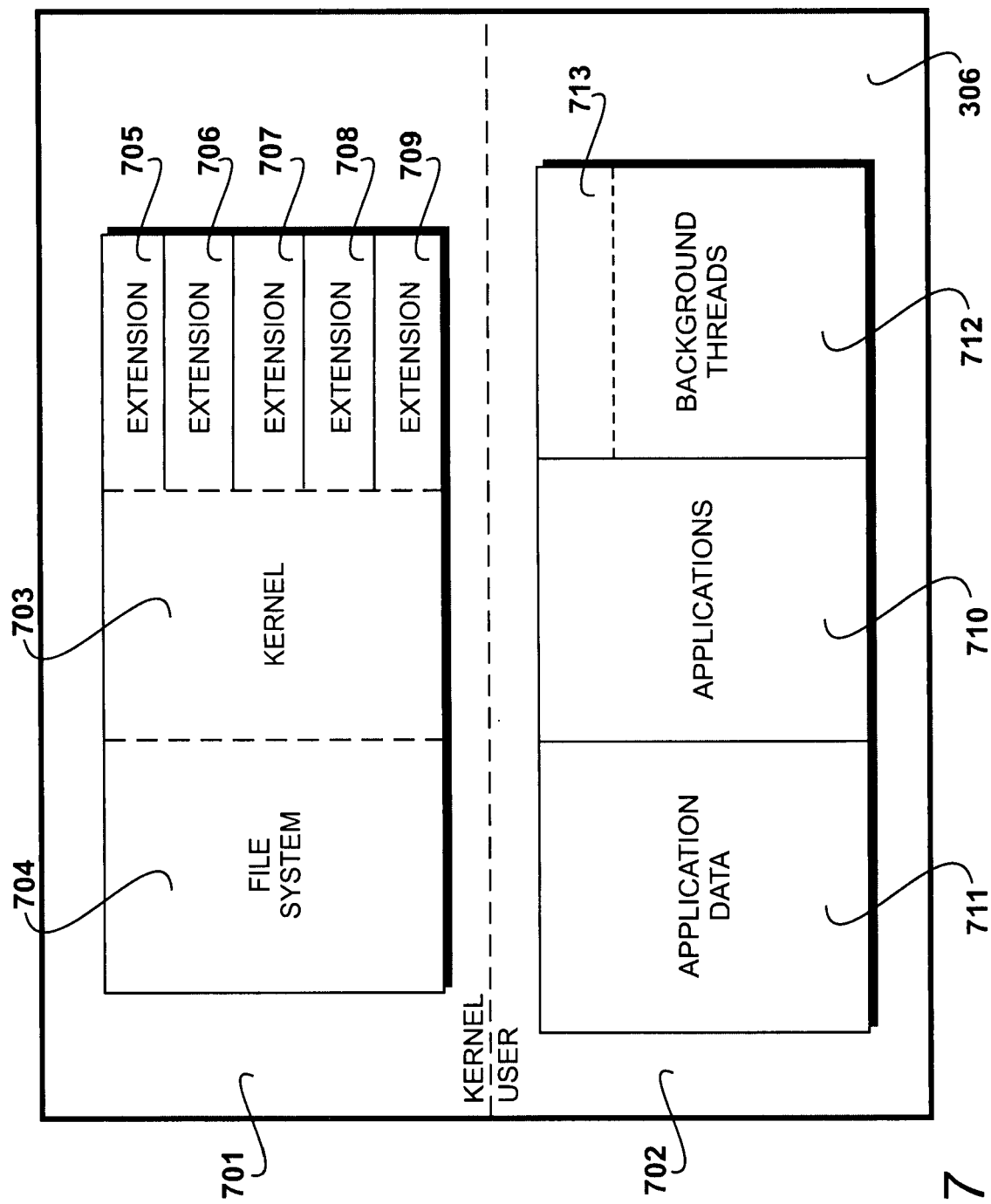
FIG. 7 illustrates the contents of the main memory of the processing system shown in FIG. 3.

The contents of the main memory 306 following step 407 are detailed in FIG. 7. Main memory 306 is split into kernel memory 701 and user memory 702. Kernel memory 701 contains the kernel 703 of the operating system, including the file system 704, and a plurality of extensions such as data stream extension 705, extension 706, extension 707, extension 708 and extension 709.

Within user memory are application instructions 710 loaded at step 406 and application data 711 loaded for editing at step 407, plus background threads 712 associated with the operating system, including data stream extension background threads 713.

FIG. 8

Figure 8:
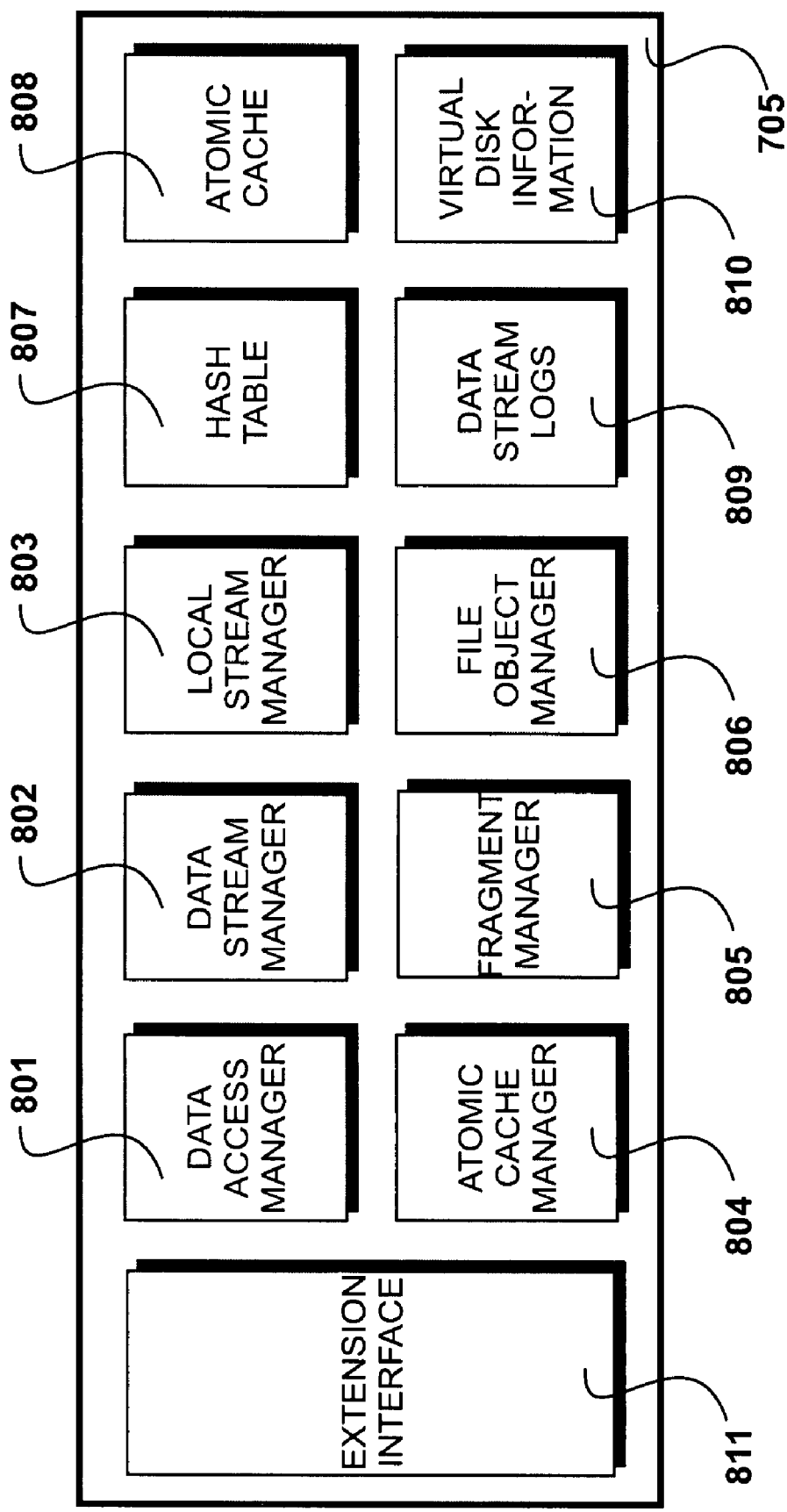
FIG. 8 shows the contents of a portion of the memory shown in FIG. 7 used by a data stream extension.

FIG. 8 details the portion 705 of memory used by the data stream extension. The functionality of the extension is provided by extension interface 811 that interfaces with the operating system, and by five modules: data access manager 801 that processes requests received from the interface and from threads within the extension, data stream managers 802 that process requests received from data access manager 801, local stream managers 803 that process requests received from the data stream managers 802 to retrieve and store data, atomic cache manager 804, fragment manager 805, and file object manager 806. Hash table 807, atomic cache 808, data stream logs 809 and virtual disk information 810 are also stored within kernel memory.

Filesystem 704 provides a structure for the data stored on storage devices such as hard drive 313, or a flash memory-based storage device (known as a USB key) or CD-ROM. Applications request the opening, closing, reading and writing of files via the operating system. The way in which these files are stored is not relevant either to the applications or to the higher-level operating system. The kernel of an operating system responds to these requests by accessing its filesystem to ascertain the physical location of the files, the data comprising which need not be contiguously stored, and returning the file as continuous data. Thus file system 704 includes data structures that provide extension interface 811 with the information necessary to retrieve and supply data to applications 710.

FIG. 9

Figure 9:
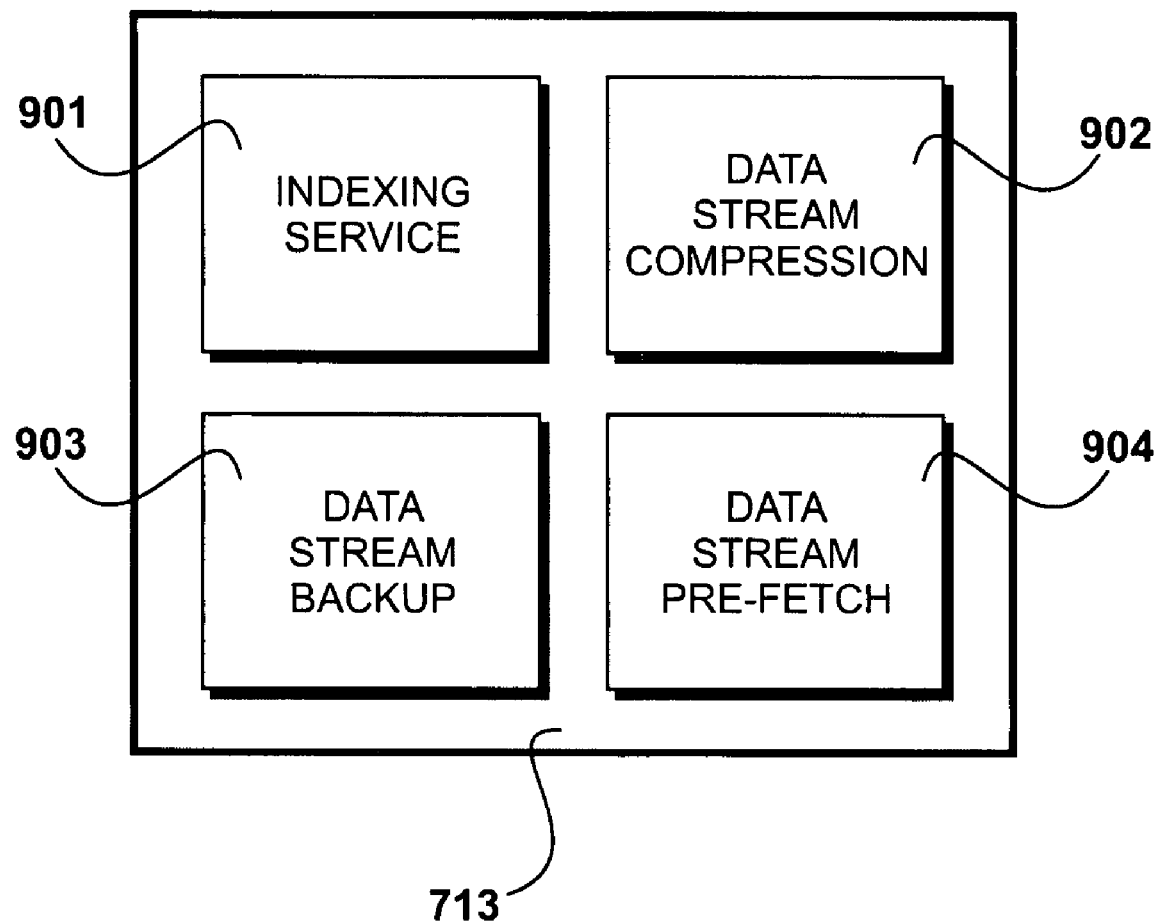
FIG. 9 shows the contents of a portion of the memory shown in FIG. 7 used by background threads.

FIG. 9 details the portion 713 of memory used by the data stream background threads. It includes an indexing service 901, which performs indexing of data to speed up searching, data stream compression service 902, which compresses old data streams, data stream backup service 903, which backs up data streams to local and networked locations, and data stream prefetch service 904, which receives new data streams broadcast over a network.

FIG. 10

Figure 10:
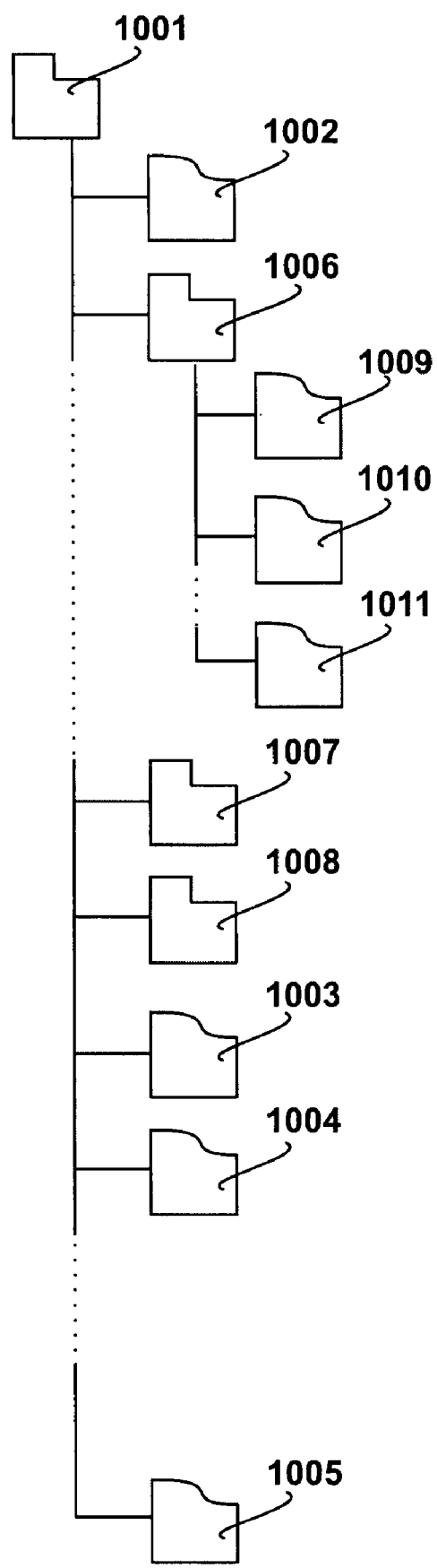
FIG. 10 shows the contents of the hard drive shown in FIG. 7.

FIG. 10 illustrates the contents of hard drive 313. Operating system files are stored in a directory structure dependent from a root directory 1001, and they are indexed using filesystem 704. The actual method of storage and indexing is dependent upon the operating system used but in this example the filesystem is NTFS. Filesystem 704 enables kernel 703 to identify the physical location on disk of any particular operating system directory or operating system file.

Root directory 1001 contains a local stream index file 1002, operating system files such as operating system files 1003, 1004 and 1005, and operating system directories such as operating system directories 1006, 1007 and 1008. An operating system directory contains no more than 256 operating system files, and when this space is used, up to 256 operating system subdirectories are created. Thus, for example, operating system directory 1001 contains 256 operating system files, as does operating system directory 1006, operating system directory 1007 and operating system directory 1008. For example, operating system directory 1006 contains operating system files 1009, 1010 and 1011. Operating system directory 1008, as the last-created directory, probably contains fewer than 256 operating system files.

In a typical operating system without the data stream extension, the operating system directory structure as held by filesystem 704 is viewed by applications running in user memory and each file corresponds with a file that can be opened by an application. It is not possible for a user to alter his view of the file structure without altering the filesystem itself, for example by moving or renaming files and directories. In contrast, when the data stream extension is installed, filesystem 704 need not correspond to the user's view of the data. The operating system files contain data streams that are used to make up application directories and application files which are used by applications 710.

When data stream extension 705 is installed, operating system files can be of two types, either a file type or block type. File type operating system files contain a portion of data corresponding to at least a part of an application file. In this example, files 1010, 1004 and 1005 are of this type. In the present embodiment, an operating system file may not exceed eight megabytes (MB) in size, so an application file may be spread over several operating system files. File type operating system files are named according to an arbitrary but consistent convention. In this example, the first file of this type is called F0000001.dat, the second is called F0000002.dat, and so on.

Figure 11:
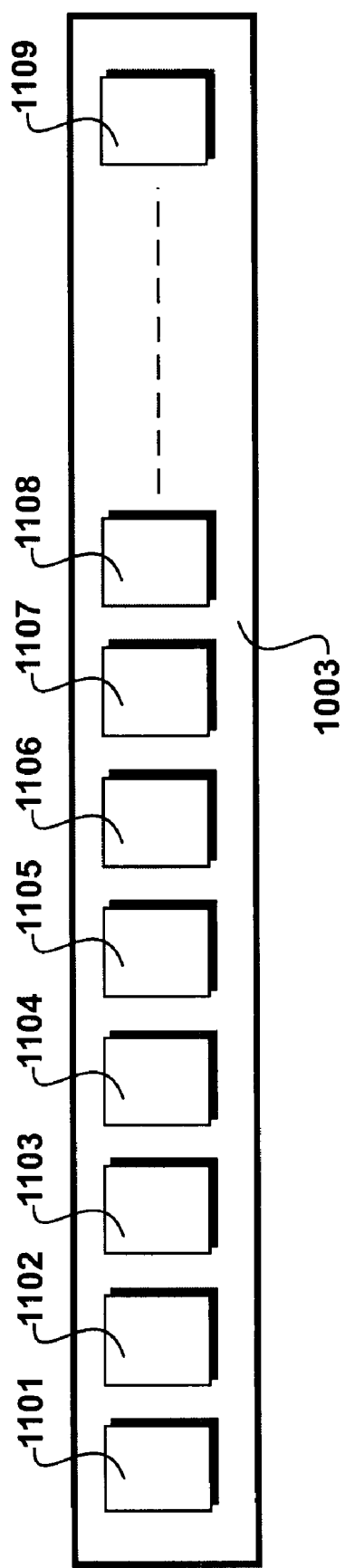
FIG. 11 illustrates an operating system file stored on the hard drive shown in FIG. 10.

The second type of operating system file is illustrated in FIG. 11.

FIG. 11

FIG. 11 illustrates cache block type operating system file 1003. Operating system files 1009 and 1011 are of this type also. File 1003 contains one thousand atomic cache blocks, each of which are eight kilobytes (kB) in size, such as blocks 1101, 1102, 1103, 1104, 1105, 1106, 1107, 1108 and 1109. An atomic cache block such as block 1101 contains either a portion of data, or a plurality of fragments, each of which is a portion of data. A portion of data may be either a part of an application file, or a piece of data used by data stream extension 705 to manage the filesystem.

Block type operating system files are named according to an arbitrary but consistent convention. In this example, the first file is called C0000001.dat, the second is called C0000002.dat, and so on.

FIG. 12

Figure 12:
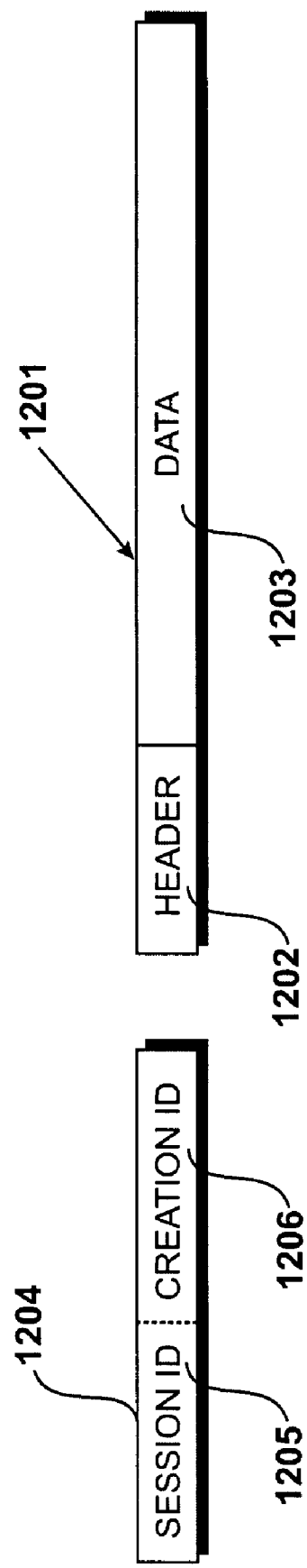
FIG. 12 illustrates a data stream stored on the hard drive shown in FIG. 10.

FIG. 12 illustrates a data stream 1201. A data stream includes a header 1202 and a portion of data 1203. This is of variable size and may be a few bits long up to 8 MB, which in this example is the size limit of an operating system file.

A data stream is referenced by a data stream ID 1204 which is 10 bytes long, including a 46-bit session ID 1205 and a 34-bit creation ID 1206. A session ID is allocated to each data access manager in the environment shown in FIG. 1. Each computer system running an operating system on which a data stream extension is installed will have a data stream manager, although it is not necessary for every computer system shown in FIG. 1 to use the data stream extension. Each data access manager then allocates data stream IDs using its allocated session ID and locally-generated creation IDs, ensuring the uniqueness of data stream IDs within the environment.

A data stream ID is not stored with the data stream and is a reference tool only. A data stream may be duplicated on several storage devices and thus if a particular data stream ID is identified as being required, the data stream can be retrieved from any of these storage devices, as data streams with the same ID contain identical data.

FIG. 13

Figure 13:
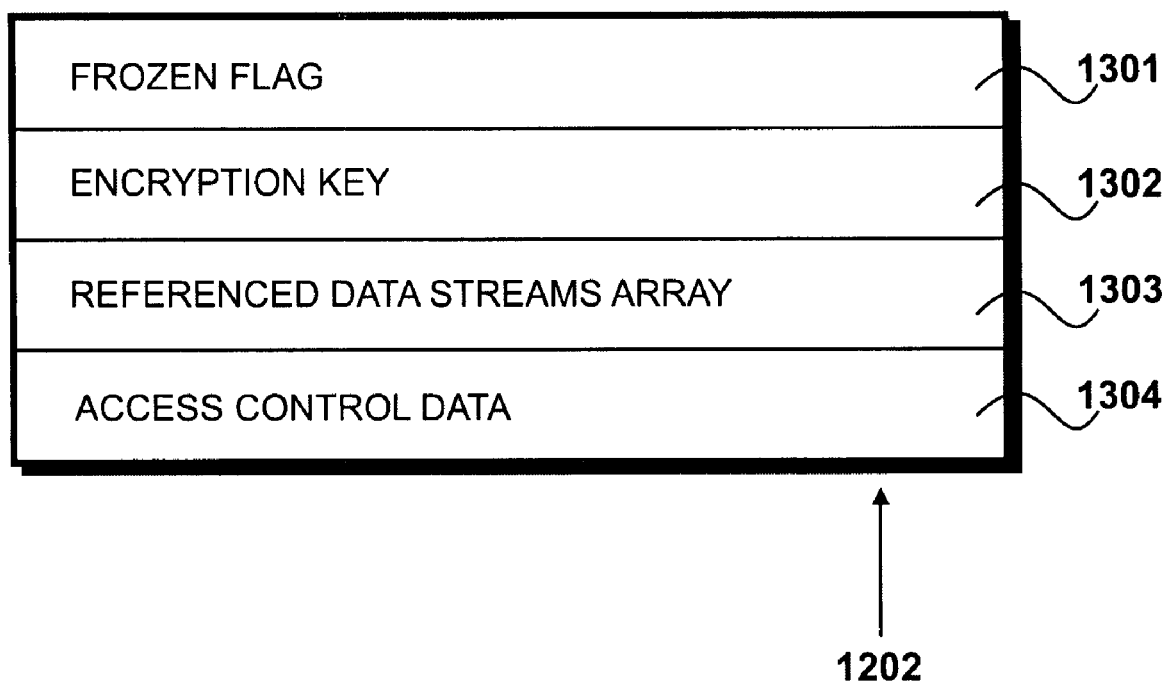
FIG. 13 shows the contents of the header of the data stream shown in FIG. 12.

The contents of header 1202 are shown in FIG. 13. Once a data stream is frozen it cannot be changed and thus a flag indicating whether or not the data stream is frozen is at 1301. Once a data stream is frozen it cannot be changed. Thus if it needs to be changed it is duplicated and the duplicate is changed instead. This means that data is generally not deleted, but stored in the form of old data streams. Data stream logs 809 store information regarding the predecessors of data streams.

A data stream is encrypted using an 8-byte symmetrical encryption key 1302 which is encrypted using an asymmetric public key. Data streams contain references to other data streams, as will be shown in FIG. 14, and so a data stream header includes an array 1303 of referenced data stream IDs. Lastly, access control data 1304 may be used by applications to control user access privileges.

FIG. 14

Figure 14:
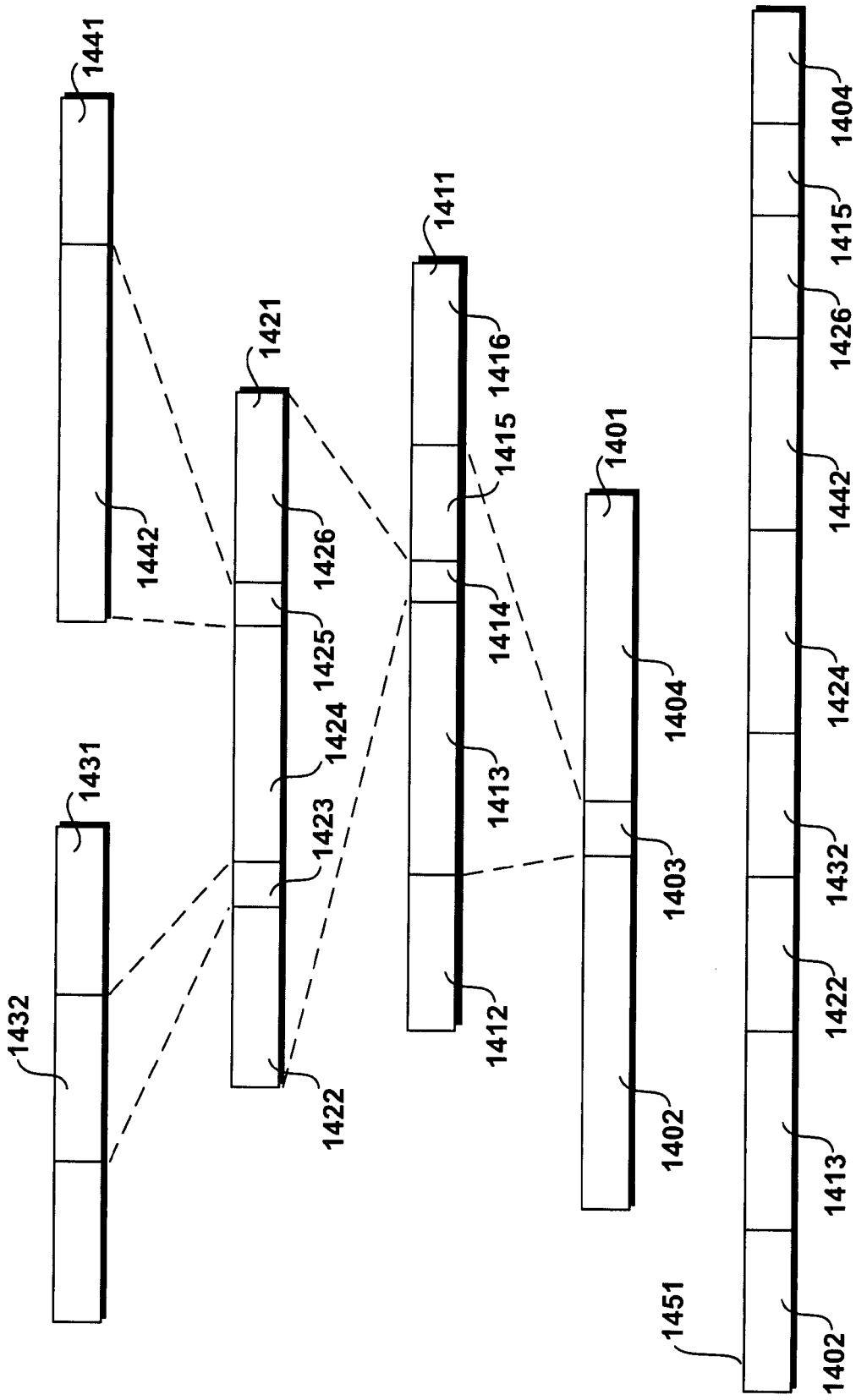
FIG. 14 illustrates how data streams reference each other to form a larger portion of data.

FIG. 14 illustrates how data streams reference each other to form a larger portion of data such as the information contained in an application file. Data stream 1401 includes a first data element 1402, a reference 1403, and a second data element 1404. Data stream 1411 includes a first data element 1412, a second data element 1413, a reference 1414, a third data element 1415 and a fourth data element 1416. Reference 1403 refers to second data element 1413, reference 1414, and third data element 1415. First and fourth data elements 1412 and 1416 are not relevant to data stream 1401, although they may be referred to by other data streams, and are part of data stream 1411.

Reference 1414 refers to the whole of data stream 1421, which includes a first data element 1422, a first reference 1423, a second data element 1424, a second reference 1425, and a third data element 1426. First reference 1423 refers to a data element 1432 of data stream 1431, while second reference 1425 refers to a data element 1442 of data stream 1441.

Thus when evaluating data stream 1401, data element 1402 is read first. Reference 1403 is then evaluated using array 1303, which is an array of data stream IDs and start and end positions within that data stream. Reference 1403 comprises a value indicating an offset within the array, and thus the evaluation of reference 1403 comprises finding the data stream ID stored at the indicated position within array 1303. This leads to element 1403 being read from data stream 1411 at the indicated position.

Reference 1414 within data stream 1411 is then evaluated, leading to element 1422 being read. Reference 1423 is then evaluated, leading to element 1432 being read. Evaluation of data stream 1421 continues after reference 1423, giving element 1424. Evaluation continues in this way, and the eventual portion of data that is constructed is shown at 1451.

Thus data stream 1401, although the data it contains consists of element 1402, reference 1403, and element 1404, can be considered to contain the information in data portion 1451.

Using this method it is not necessary to rewrite the whole file when changes are made, nor to send the whole file over a network when backing up. For example, if a change were made within data element 1442, then in traditional filesystems in order to share or back up this change the whole of the virtual data stream 1451 would have to be transported via a network. However, using the present system only changed data stream 1441 must be transported.

Also, in order to copy the file it is only necessary to copy root data stream 1401. This will contain the same references to other data streams, which need not be copied, and thus the whole virtual data stream 1451 can be constructed.

Further, this method facilitates efficient version control of application files.

FIG. 15

Figure 15:
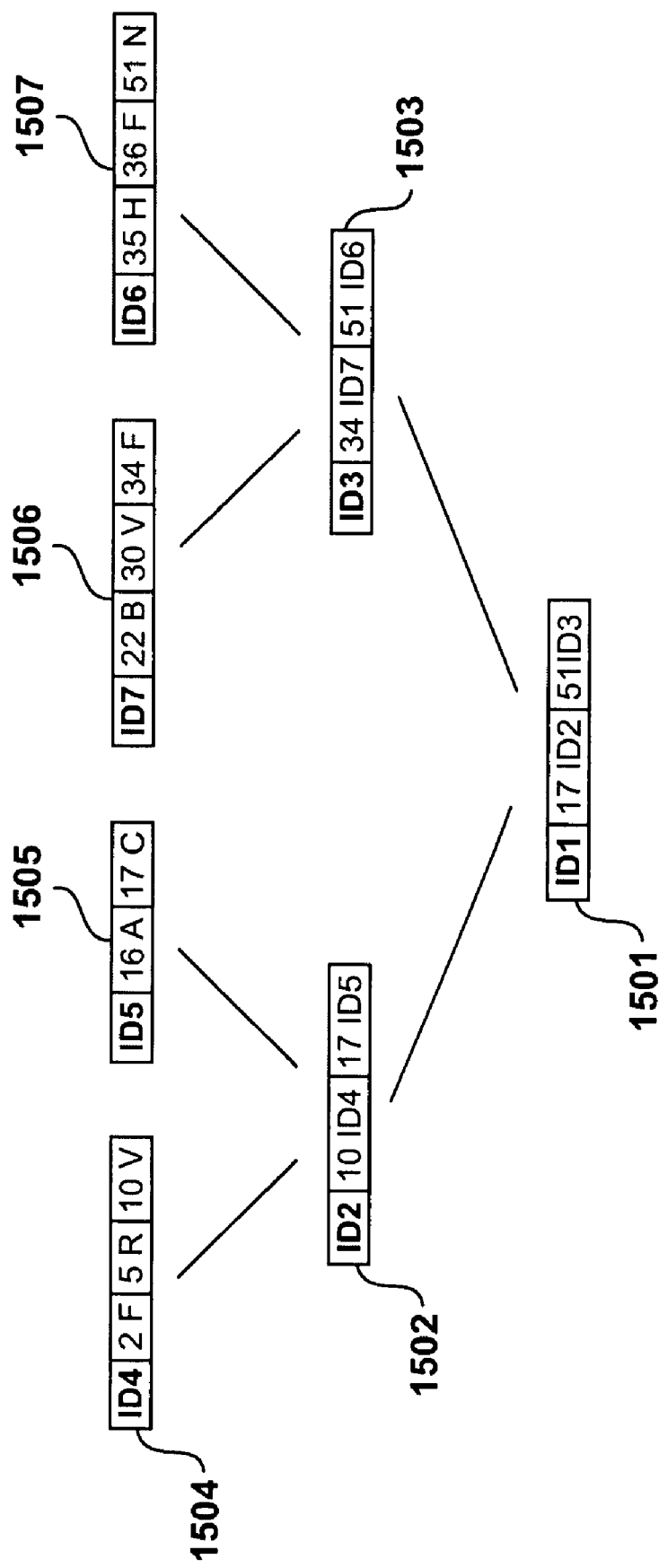
FIG. 15 illustrates an example of a B+ tree.

The indexing of data streams is performed using B+ trees. An example of a B+ tree is shown in FIG. 15. It has a root node 1501, intermediate nodes 1502 and 1503, and leaf nodes 1504, 1505, 1506 and 1507. A B+ tree can have just a root node, and may not have intermediate nodes. However, the number of nodes between the root node and each leaf node must be identical throughout the tree.

The leaf nodes contain key-value pairs, in which a searchable key is paired with a value that is to be retrieved. In this example, the key is an integer and the value is a letter. Thus, for example, the value associated with key 22 is B, as shown in leaf node 1505.

Within each node the key-value pairs are in order by key, and this continues across the leaves, Thus leaf 1504 contains keys 2, 5 and 10, leaf 1505 contains keys 16 and 17, leaf 1506 contains keys 22, 30 and 34, and leaf 1507 contains keys 35, 36 and 51. The leaf nodes have a capacity of 8 kilobytes and are typically approximately half-full. Additionally, each leaf node includes a pointer to the next leaf node, such that a listing of all the values indexed can be quickly obtained without needing to traverse the whole tree.

Each intermediate node also contains key-value pairs. For each pair, the key is the last key in one of its child nodes, and the value is a pointer to that node. The pairs in intermediate nodes are also arranged in order by key. The root node has a similar structure to the intermediate nodes, except when the root is the only node in the tree, when the root node has a similar structure to a leaf node.

FIG. 16

Figure 16:
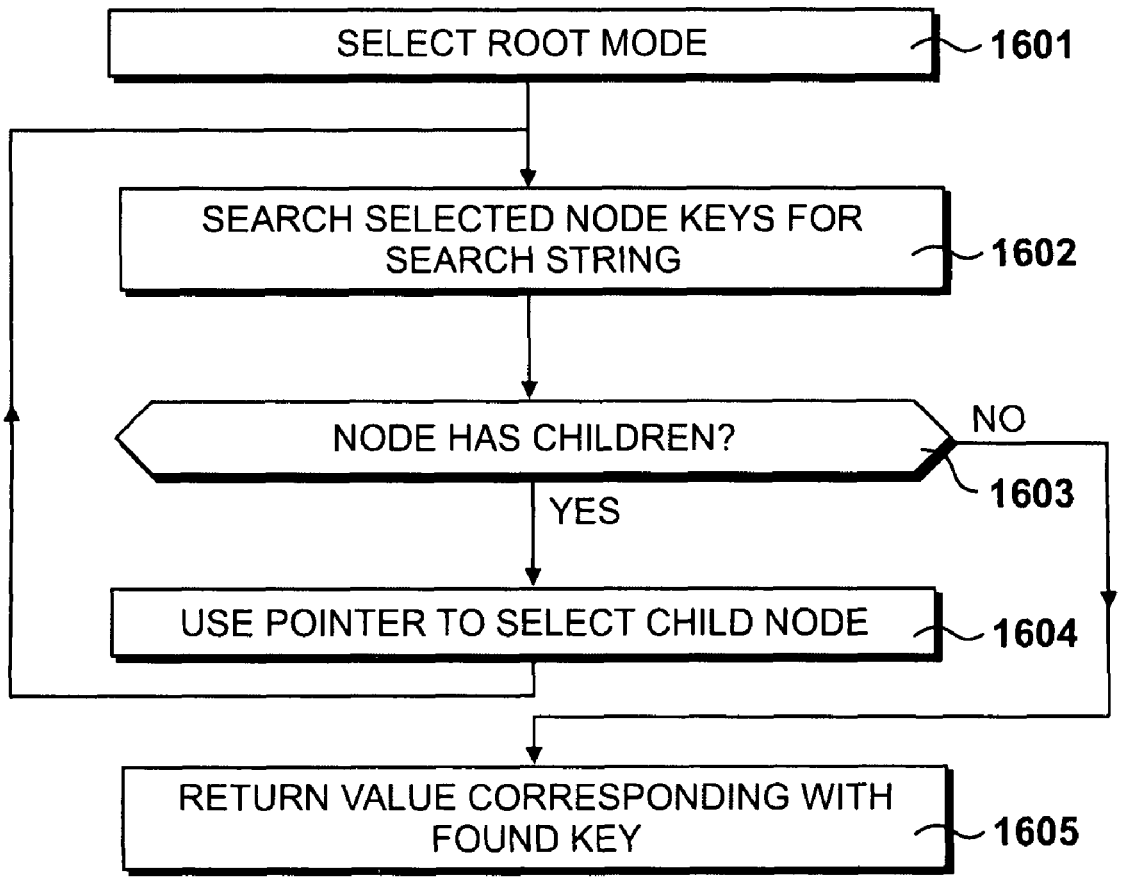
FIG. 16 details the process of searching the B+ tree illustrated in FIG. 15.

The process of searching a B+ tree is detailed in FIG. 16. At step 1601 the root node (which in this system is a data stream) is selected, and at step 1602 the keys in the selected node are searched for the search string using a binary search. This may be any string of data, for example a file name or a data stream ID.

At step 1603 a question is asked as to whether the node has children, and if this question is answered in the affirmative then the pointer associated with the key is identified and used to locate the next node. Control is then returned to step 1602 and the keys in the child node are searched for the search string.

Eventually the question asked at step 1603 is answered in the negative to the effect that the node has no children. In this case, the value associated with the found key is the required value and it is returned.

Using B+ trees can significantly speed up searches of large amounts of data because a search through thousands of records can require the searching of only a few nodes.

Many of the B+ trees used in the embodiment described herein use data streams as nodes, and in this case the pointers in the root and intermediate nodes are data stream IDs. Thus these trees are not stored in a single place, but are traversed by starting with the data stream ID of the root node and obtaining data streams as necessary.

FIG. 17

As described with reference to FIGS. 10 and 11, data streams are stored either as entire operating system files, as blocks within operating system files, or as fragments within the blocks. An application directory or file is made up of at least one of these data streams, with the referencing illustrated in FIG. 14 used when an application directory or file is made up of more than one data stream.

Applications 710 see a different view of the data from that shown in FIG. 10. The application file structure is composed of application files, some of which are directories, each of which has a file ID and is described by a file object, shown in FIG. 17.

File object 1701 includes various flags 1702, a date indication 1703, a size indication 1704 and at least one data stream ID 1705. Depending upon the operating system used it may contain two further data stream IDs 1706 and 1707. For example, some operating systems require two streams of data, one containing the data itself and another containing metadata, sometimes known as a resource fork. Thus data stream ID 1705 is named DATA and data stream ID 1706 is named RESOURCE. If further data streams are required then their IDs are stored in a B+ tree in which the key is the name of the stream of data and the value is the data stream ID. The data stream ID of the root node of this tree is stored at 1707.

If the file object describes an application file, then the data stream referenced at 1705 contains the actual data making up the file, possibly along with other data streams that it references. If the file object describes a file directory, then the data stream referenced at 1705 is the root node of a B+ tree that indexes the contents of the directory, as will be further described with reference to FIG. 18.

FIG. 18

Figure 17:
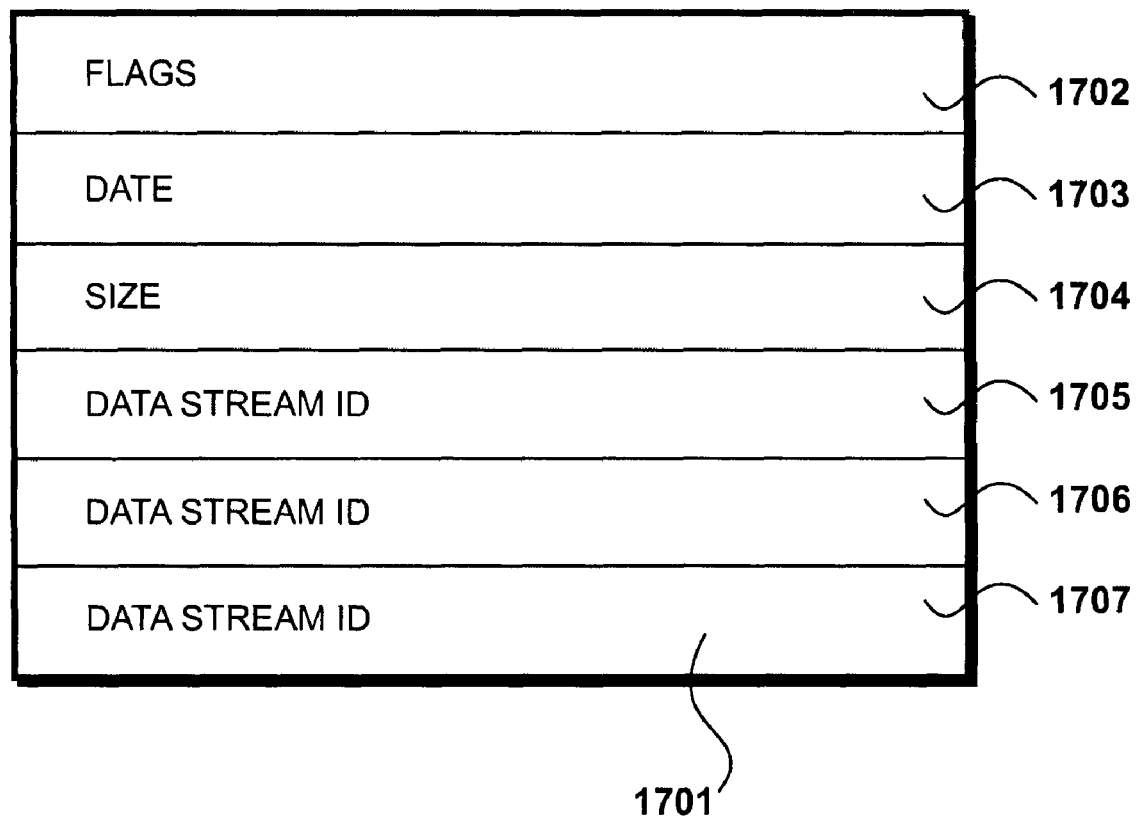
FIG. 17 shows a file object.
Figure 18:
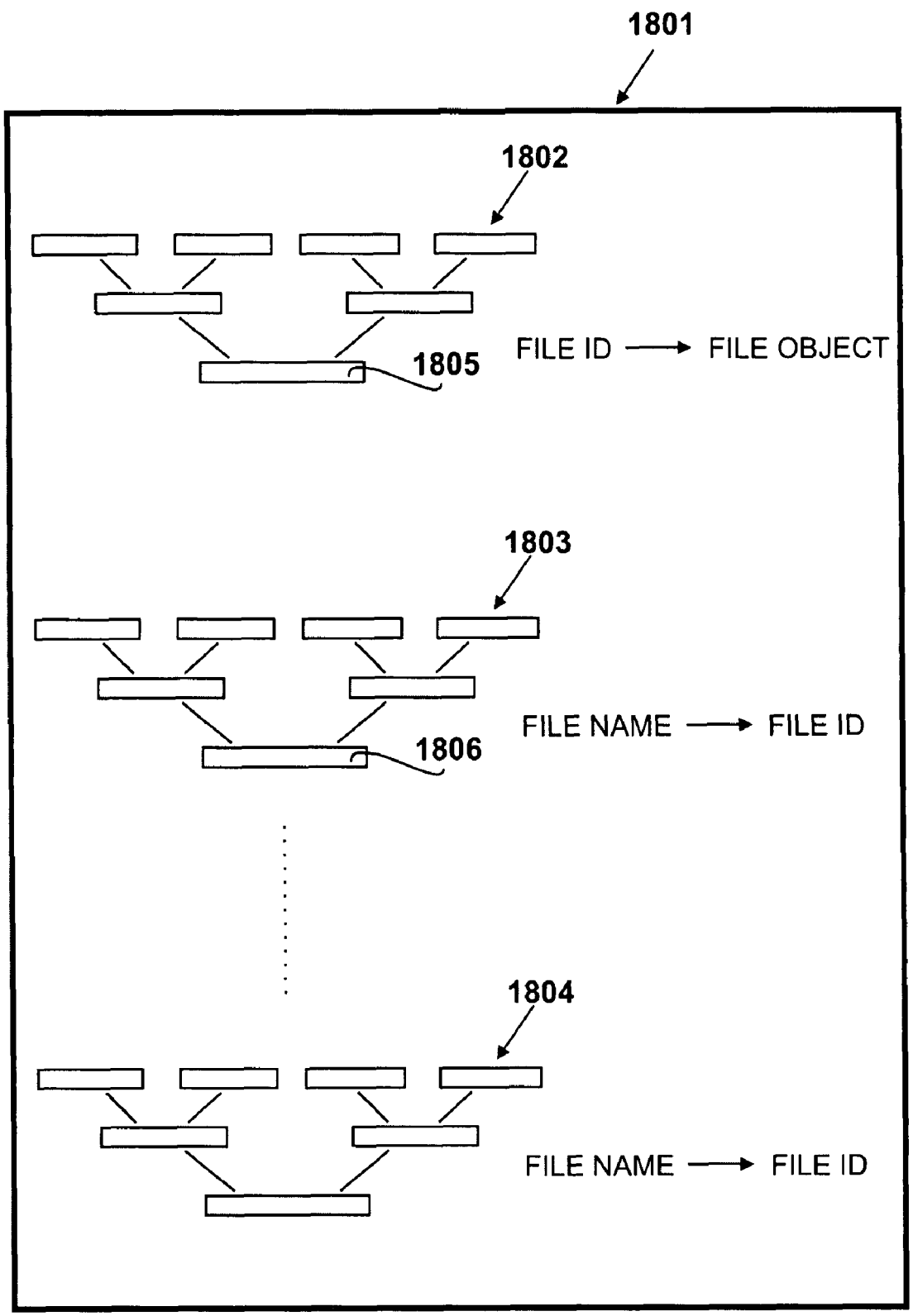
FIG. 18 shows an application file index.

FIG. 18 illustrates the application file index 1801 that describes the file structure as perceived by applications 710. It comprises a plurality of B+ trees that use data streams as nodes: one file object index and a plurality of directory indices. File object index 1802 is a B+ tree in which the key is a file ID and the value is a file object as shown in FIG. 17. Directory index 1803 is a B+ tree in which the key is a filename and the value is a file ID. There is a directory index for each application directory in the file structure, although only directory index 1804 is shown. Each node in each of trees 1802 to 1804 is a data stream.

Thus in order to access the application file structure it is necessary to know the data stream ID of the root node 1805 of the file object index 1802 and the file ID of the root directory of the file structure. With this information it is possible to find the file object of the root directory. In this example, the root directory is described by directory index 1803, and thus the file object found contains the data stream ID of the root node 1806 of the directory index 1803.

If a specific path is to be accessed then the filename of the application directory or application file can be searched for within directory index 1803, resulting in a file ID being found. This file ID is then searched for within file object index 1802 to obtain a file object, and so on through all the subdirectories in the path until the data stream ID of the application file is found. Alternatively, the leaf nodes of directory index 1803 can be traversed to list the contents of the application directory, for example for display in an Explorer environment or application dialog box.

FIG. 19

Figure 19:
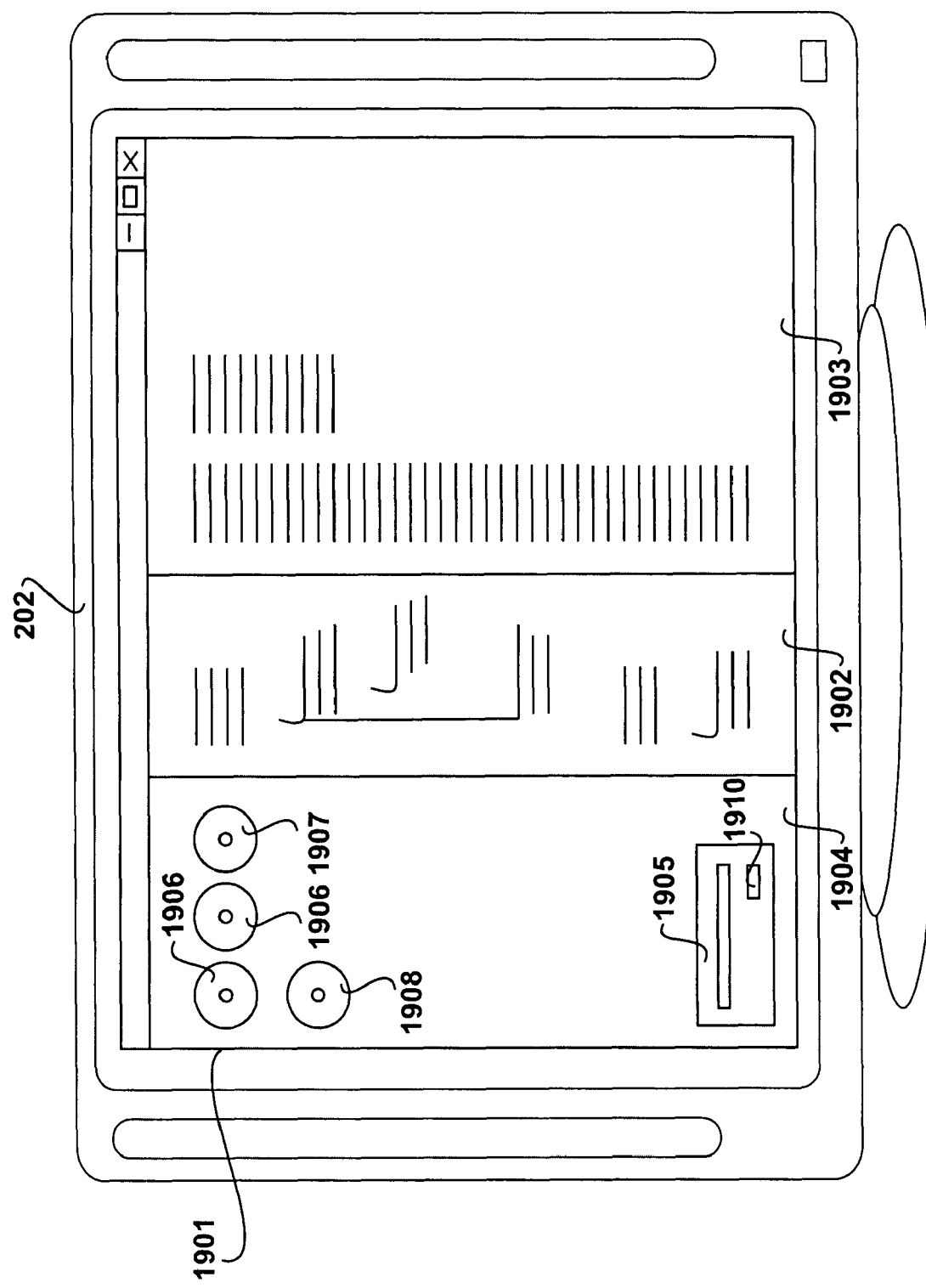
FIG. 19 illustrates an interface displayed on the VDU shown in FIG. 2.

FIG. 19 illustrates the interface 1901 shown to a user of computer system 111 on VDU 202 when using an explorer application. A folder tree is shown in pane 1902, with a list of files shown in pane 1903. These files are application files and the directory structure shown is not the same as that shown in FIG. 10, which is the storage of operating system files. Pane 1904 shows a virtual disk drive 1905 along with virtual disks 1906, 1907, 1908 and 1909. Each virtual disk can be considered to contain folders and files that are only available to the user when the disk is inserted into virtual disk drive 1905. Pressing the eject button 1910 on virtual disk drive 1905 ejects the virtual disk and the data is no longer available.

Each virtual disk is actually a small amount of information representing an application file structure. It includes the data stream ID of the root node of the file object index, and the file ID of the root directory of the data structure. With this information the file structure can be displayed to the user, and without it the file structure is inaccessible. Thus when the user inserts a virtual disk into the virtual disk drive 1905 the file structure represented by the information is mounted by the kernel in the same way as drives are mounted during step 504 detailed in FIG. 6.

Virtual disks can be created for any storage location. They can be sent over a network so that another user can access the data, transported between computers, and so on. This system allows data to be constantly backed up throughout the environment shown in FIG. 1 without the need for users password-protecting their data or such, since without the data stream ID of a directory index other users cannot access that data.

Virtual disks can include any directory that the user sets up, including search directories. For example, the user can specify that a directory is to include all files created in the last month, or all files with a specific extension, or all files that contain specific text, and so on. Indexing service 901 constantly indexes properties and contents of files to allow this type of directory to be created and updated very quickly. This type of directory is possible because an application file can be stored in more than one application directory, since the application file structure is not related to the underlying operating system file structure.

FIG. 20

Figure 20:
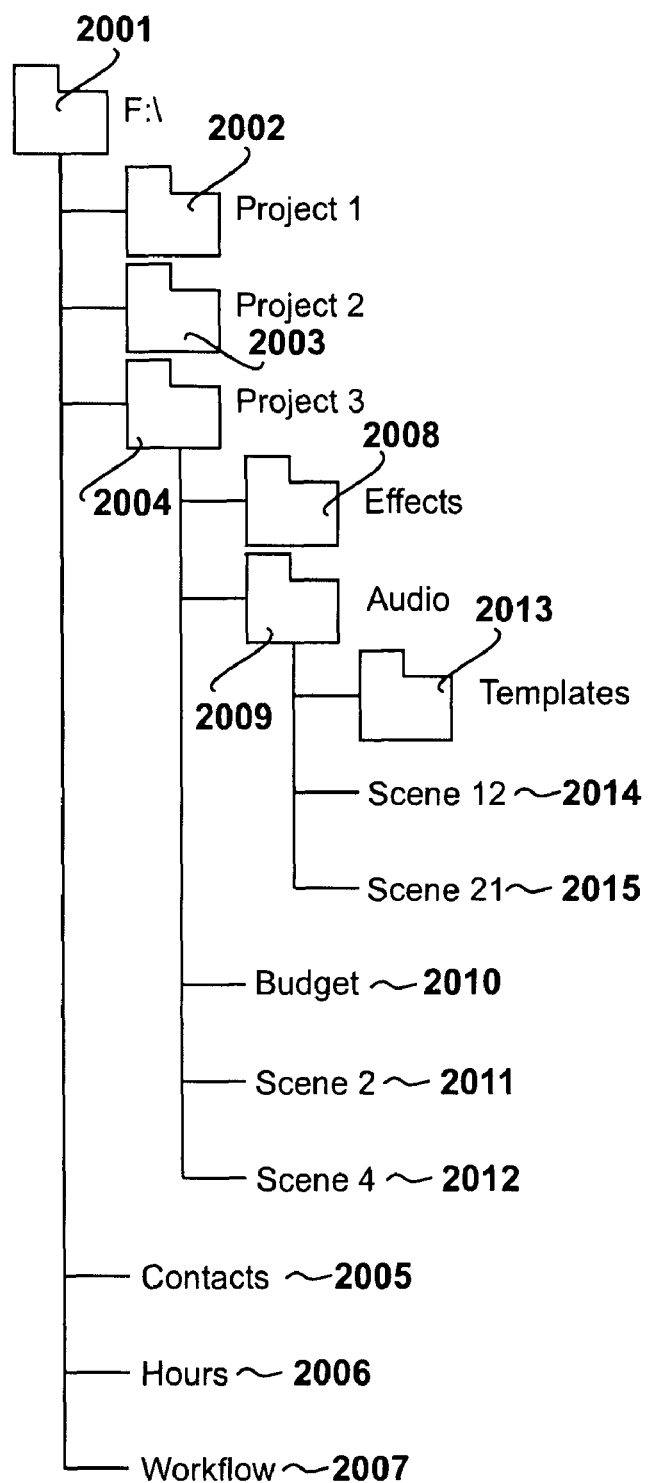
FIG. 20 illustrates an exemplary application file structure described by an application file index shown in FIG. 18.

FIG. 20 illustrates an exemplary application file structure as it would appear to a user. Such an application file structure is described by an application file index such as that shown in FIG. 18 and is called a virtual disk. Root directory 2001 contains three application directories 2002, 2003 and 2004, and three application files 2005, 2006 and 2007. Application directories 2002 and 2003 are shown unexpanded. Application directory 2004 contains two application directories 2008 and 2009, and three application files 2010, 2011 and 2012. Application directory 2009 contains an application directory 2013 and two application files 2014 and 2015. Suppose a user is interested in application file 2014, which has a path F:\Project 3\Audio\scene 12.

The root directory 2001 is described by a directory index. To find this index, the system requires the data stream ID of the root node 1805 of the file object index 1802, and the file ID of the root directory mounted as drive F:\. It searches the file object index 1802 for this file ID to identify the data stream ID of the root node of the directory index for application directory 2001.

A search in this directory index for the filename "Project 3" will result in the file ID of application directory 2004 being identified. The system searches file object index 1802 for this file ID to find the file object for the application directory and identify the data stream ID of the root node of its directory index.

A search in this directory index for the filename "Audio" identifies the file ID for application directory 2009. The system then searches file object index 1802 for this file ID to find the file object for application directory 2009 and identify the data stream ID of the root node of its directory index.

A search in this directory index for the filename "Scene 12" identifies the file ID for application file 2009. The system then searches file object index 1802 for this file ID to find the file object for application directory 2009 and identify the data stream that contains the data making up the application file.

The directory structure shown in FIG. 20 is constructed by the user and can be changed by the user. Thus it is possible for other users to view the filesystem using a completely different file structure, or for the user to view it in more than one different way simply by mounting a different virtual disk. For example, if the user wishes to move directory 2013 so that it is contained within directory 2002 instead of directory 2009 he will perform an operation within his application, such as a drag and drop, to perform this. This will result in an alteration of the directory indices for directories 2002 and 2009. In prior art file systems this would move the directory for every other user of the file system. However, in the system described herein this move would only affect this virtual disk, or view of the filesystem. Other virtual disks would be unaffected, since the structure shown in FIG. 20 does not reflect the actual underlying storage of the data.

Since file object index 802 is a B+ tree ordered by file ID, file IDs that are similar are stored close to each other. In the present embodiment, application directories and application files that are close to each other in the structure shown in FIG. 20 are given similar file IDs. The path of a file is split into four parts: the root directory plus at least one subdirectory, the filename, and two halves of the remaining path. Thus, for example, "F:\project3\effects\unfinished\scenelist.txt" would be split into a first part "F:\project3\", a second part "effects\", a third part "unfinished\" and a fourth part "scenelist.txt". A hash is created of each part and the hashes combined to create a file ID. This creates similar file IDs for files that are stored in similar locations.

This means that directories and files that are likely to be accessed during the same workflow have IDs clustered within file object index 802. Since the nodes of file object index 802 are data streams, and since frozen data streams are never changed but duplicated, a change to a leaf node alters its parent because the leaf node's data stream ID changes, meaning that the parent node, which contains the data stream ID as a value, must change. This change propagates down to the root node. However, once a new data stream is created it is not frozen for a period of time, meaning that other changes made to the data stream while it is unfrozen do not result in a new data stream being created. For example, a first file is edited, leading to a new data stream being created for the leaf containing the file object, the leafs parent node, and so on to the root node. A short while later a second file is edited, its file object being contained within the same leaf node as the first. The relevant data streams of the file object index 802 are already in memory, making the reading and editing of them quicker, and since the data streams are not yet frozen they can be changed.

Thus clustering changes within leaf nodes results in required data streams being more likely to be in memory, and fewer data streams being created within the tree, which results in less strain on the file system and computer, and also means that when the file object index 802 is synchronised with another, fewer data streams need to be duplicated.

FIG. 21

Figure 21:
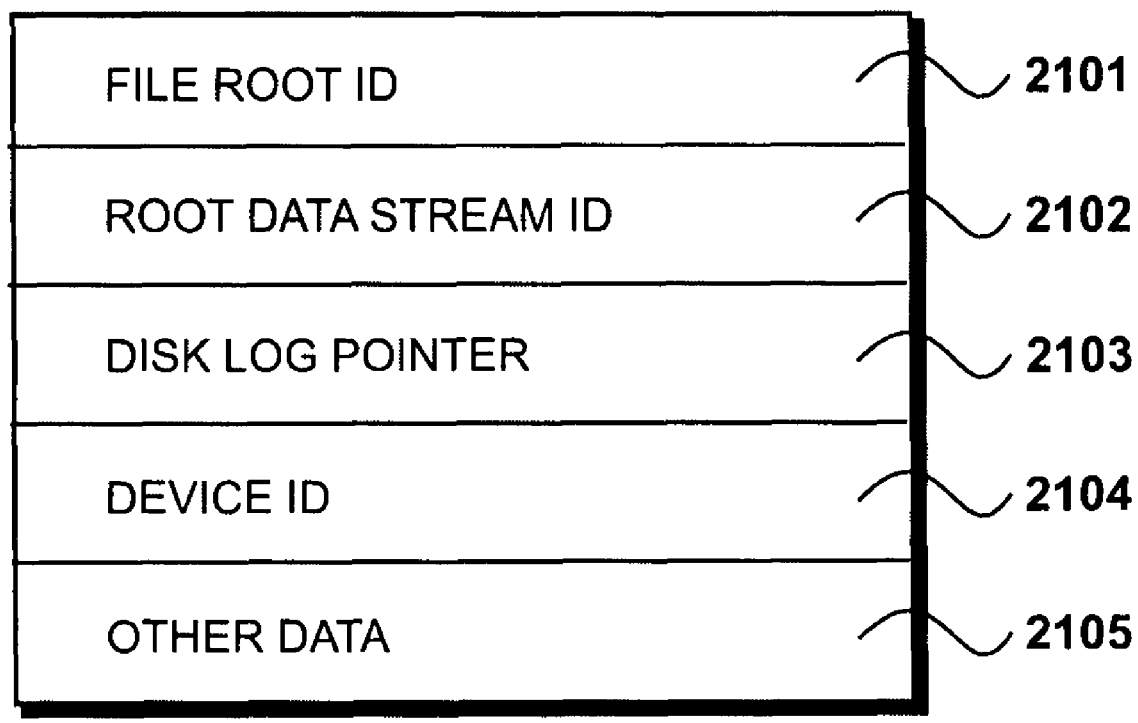
FIG. 21 shows the virtual disk data shown in FIG. 8.

FIG. 21 shows virtual disk data 810 which is stored on the hard drive for each virtual disk available to a user and is loaded into memory at 809 when the disk is mounted. It includes an indication 2101 of the file ID of the root directory of the disk and an indication 2102 of the data stream ID of the root node 1806 of the file object index 1802. Disk log pointer 2103 is a pointer to the atomic cache block in which the log of changes made to the disk is stored. Device ID 2104 indicates the device driver which should be used to mount the disk, and other data 2105 contains any other data which might be necessary.

Virtual disk data 810 is stored as a data stream and thus in order to access it a data stream ID is required. This data stream ID can be shared between computer systems that have the data stream extension installed to allow other users to view and work on the same virtual disk. Without this data stream ID it is not possible for other users to access the disk.

During step 410 when the user publishes data to the network, the system synchronises the user's virtual disk with the copy of the virtual disk on the network. This can be done simply by duplicating the data stream ID of the root node of the file object index. Since data streams are constantly backed up the process of publication is constantly occurring, but to the user the process is instantaneous because until the data stream ID is duplicated the process is not completed.

FIG. 22

Figure 22:
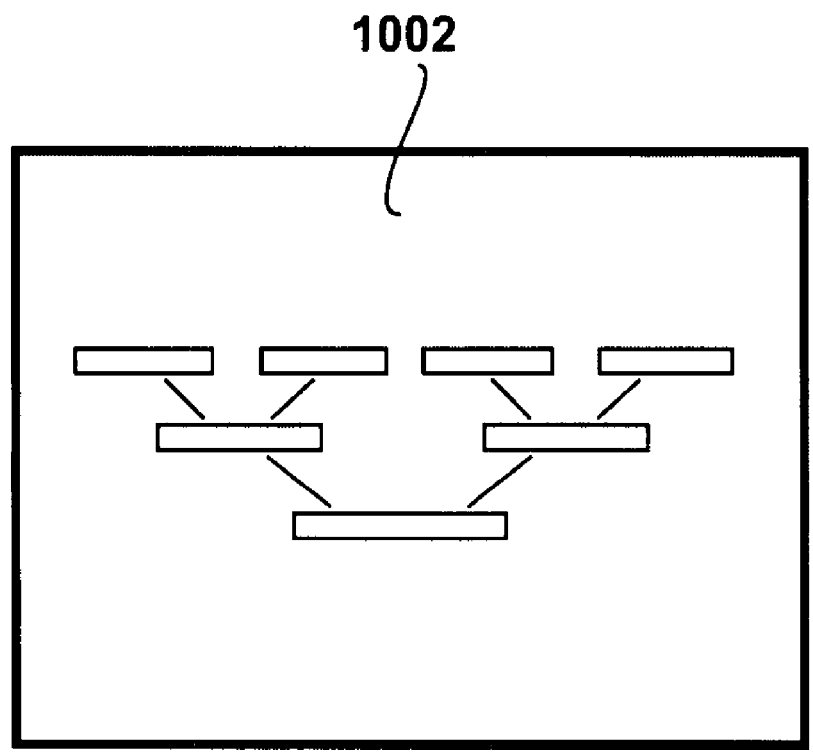
FIG. 22 illustrates the local stream index shown in FIG. 10.

FIG. 22 illustrates the local stream index 1002 that is stored as a file in the root directory of the operating system directory structure. The data within it is structured as a B+ tree in which the key is a data stream ID and the value is a corresponding local stream ID. It is not stored as data streams like other B+ trees used by the system.

Local stream IDs indicate the actual location of data streams on storage devices, and thus a local stream index exists for each storage device accessible by the data access manager 801.

FIG. 23

Figure 23:
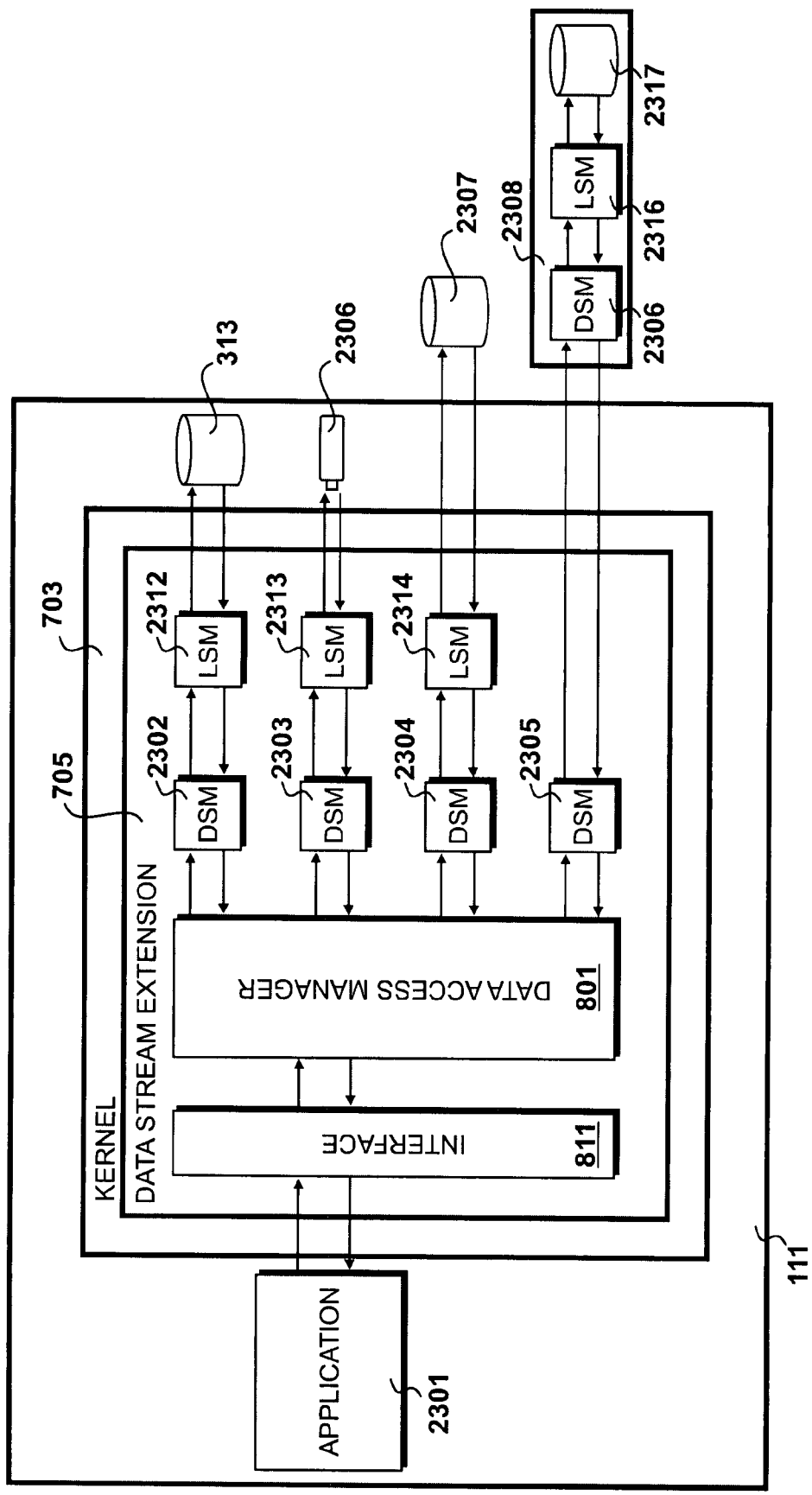
FIG. 23 details steps taken to load data during FIG. 4.

FIG. 23 illustrates the process of loading data at step 407. An application 2301 sends an OPEN request, including a path and filename, to the kernel 703 of the operating system which is intercepted by the interface 811 and transmitted to data access manager 801 of data stream extension 705. Data stream manager 801 handles this request by converting the path and filename into a data stream ID, as discussed with reference to FIG. 20.

Extension 705 includes a plurality of data stream managers 802, one for each storage device to which it has access. Thus data stream manager 2302 retrieves data streams from the local hard drive 313, data stream manager 2303 retrieves data streams from a connected USB flash memory stick 2306, and data stream managers 2304 and 2305 retrieve data streams from networked servers 2307 and 2308.

Each data stream manager communicates with a respective local stream manager. For example, data stream manager 2302 communicates with local stream manager 2312 which controls storage on hard drive 313, data stream manager 2303 communicates with local stream manager 2313 which controls storage on USB stick 2306, and data stream manager 2304 communicates with local stream manager 2314, which controls storage on remote server 2307. Data stream manager 2305 communicates with a remote data stream manager 2306 on server 2308, which itself communicates with a local stream manager 2316 on server 2308 which controls storage on the hard drive 2317 of remote server 2308. Server 2307 is called a passive server because it is accessed from a local stream manager on a client computer, whereas server 2308 is an active server.

The data stream required by data access manager 801 could be stored on any or all of storage devices 313, 2306, 2307 or 2317. Thus data access manager 801 makes a decision as to which data stream manager is most likely to retrieve the data stream first and forwards the request to that data stream manager, for example data stream manager 2302.

On receipt of the "OPEN" request, data stream manager 2302 converts the data stream ID to a local stream ID using the local stream index 1002 and passes the local stream ID to local stream manager 2312 which retrieves the data stream from hard drive 313. Alternatively, data stream manager 2302 may return the message that the data stream is not stored on hard drive 313. If data stream manager 2302 does not return the data within a specified period of time then data access manager 801 forwards the request to another data stream manager. On receipt of the data stream the data access manager stops all the data stream managers that are still retrieving the data stream.

FIGS. 24A, 24B, 24C

Figure 24:
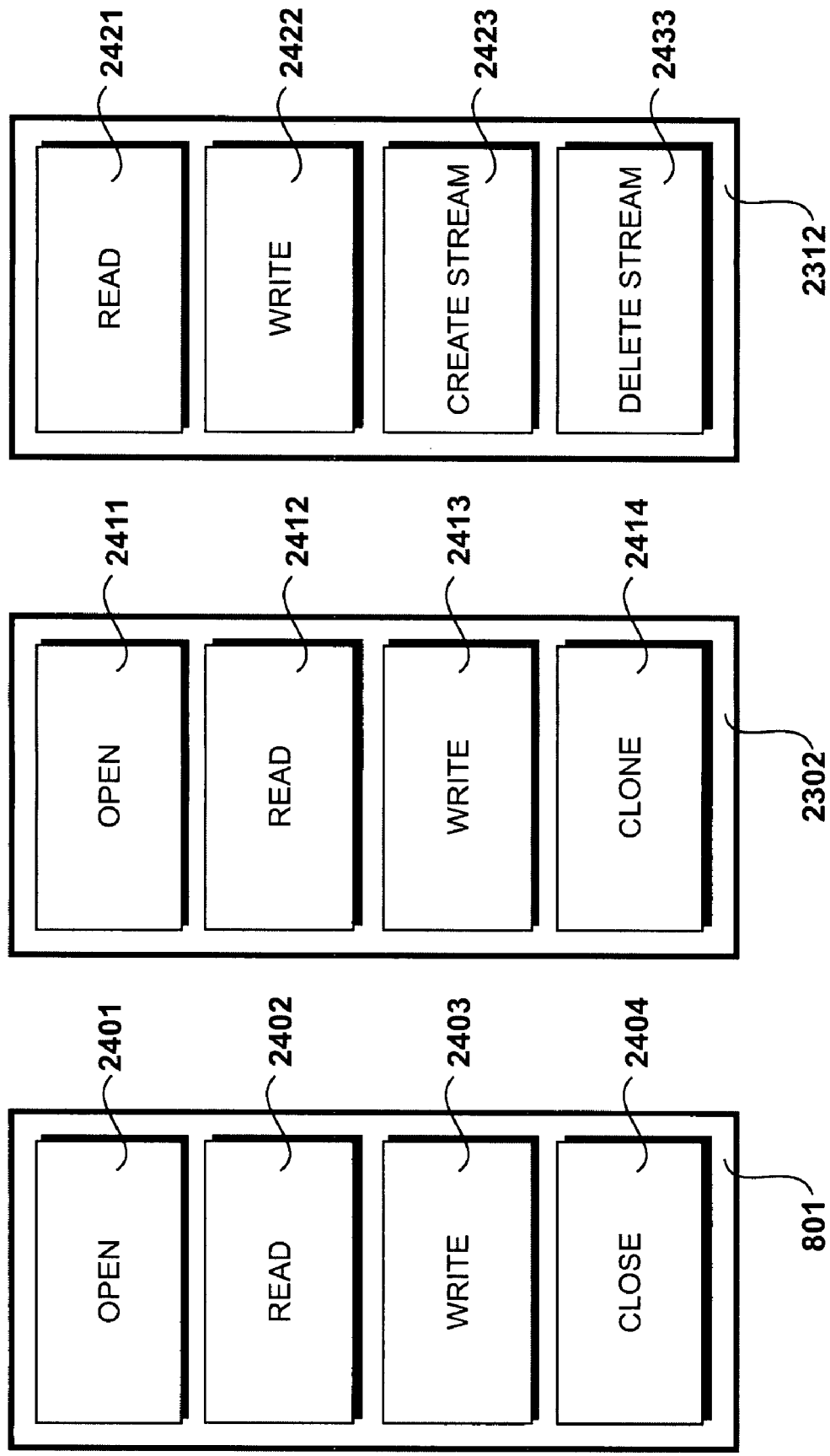
FIG. 24A shows the data access manager shown in FIG. 8.
FIG. 24B shows the data stream manager shown in FIG. 8.
FIG. 24C shows the local stream manager shown in FIG. 8.

FIG. 24A shows data access manager 801. It includes four processes: Open process 2401, Read process 2402, Write process 2403 and Close process 2404. These processes catch the corresponding requests from the extension interface 811 and process them.

FIG. 24B shows data stream manager 2302. It includes four processes: Open process 2411, Read process 2412, Write process 2413 and Clone process 2414. These processes receive the corresponding requests from data access manager 801 and process them. Data stream managers 2303 to 2305 are identical.

FIG. 24C shows local stream manager 2312. It includes four processes: Read process 2421, Write process 2422, CreateStream process 2423 and DeleteStream process 2424. These processes receive requests from data stream manager 2302 and process them. Local stream managers 2313 and 2314 are identical.

FIG. 25

Figure 25:
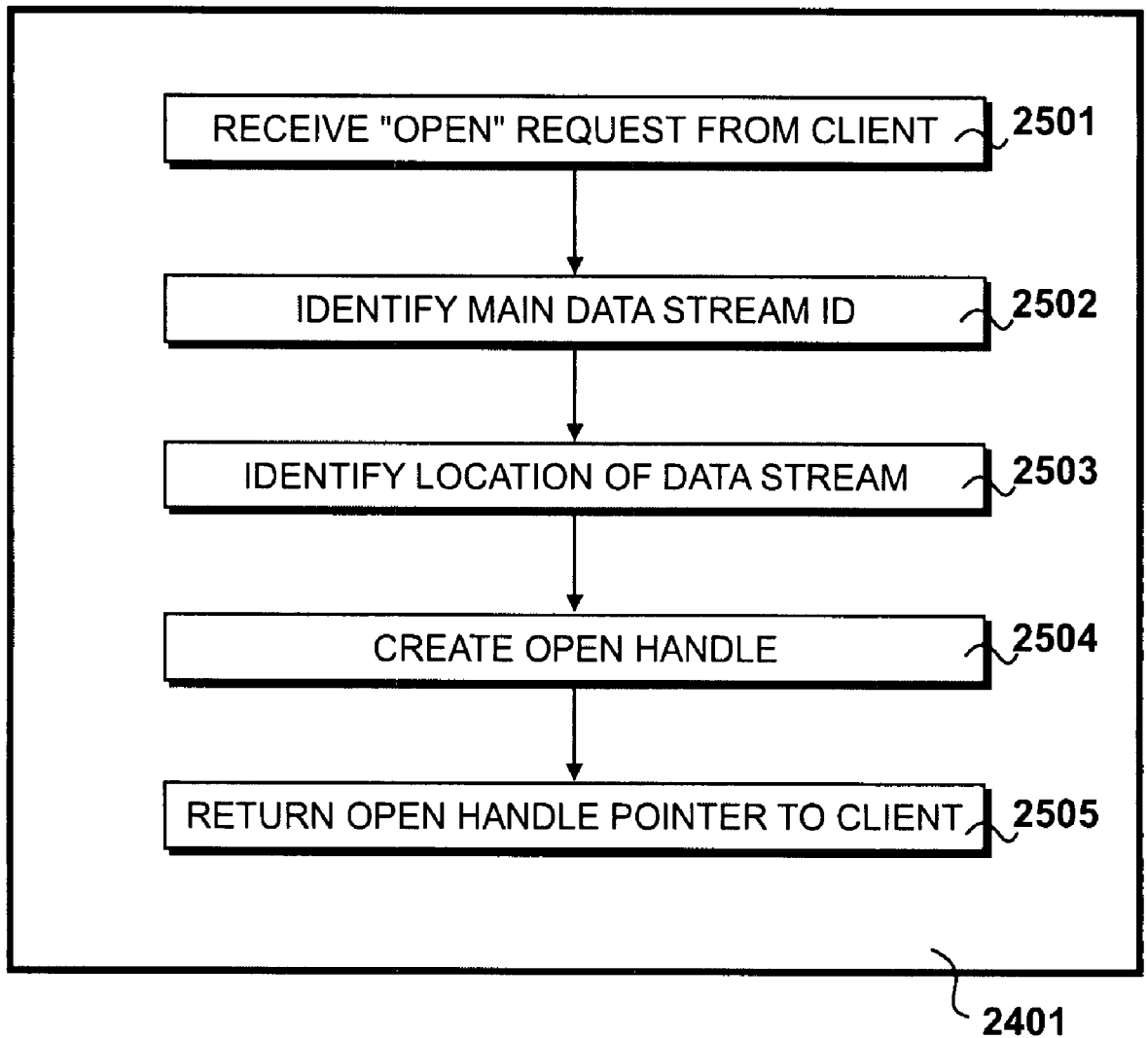
FIG. 25 details a process carried out by the data access manager shown in FIG. 24A to open a data stream.

Open process 2401 of data access manager 801 is shown in FIG. 25. At step 2501 an OPEN request is received from a client. The client may be the operating system, having received a request for an application file from one of applications 710, or another thread associated with the data stream extension, such as a B+ tree manager, the indexing manager and so on; additionally data access manager 801 may make a recursive call to itself, thus becoming its own client. The request includes a path to the requested filename.

At step 2502 the main data stream ID of the application file is identified from local stream index 1002, and at step 2503 the location of the data stream is identified. At step 2504 an open handle is created and at step 2505 a memory pointer to the open handle is returned to the client, in order that the data stream may be accessed via a READ request.

FIG. 26

Figure 26:
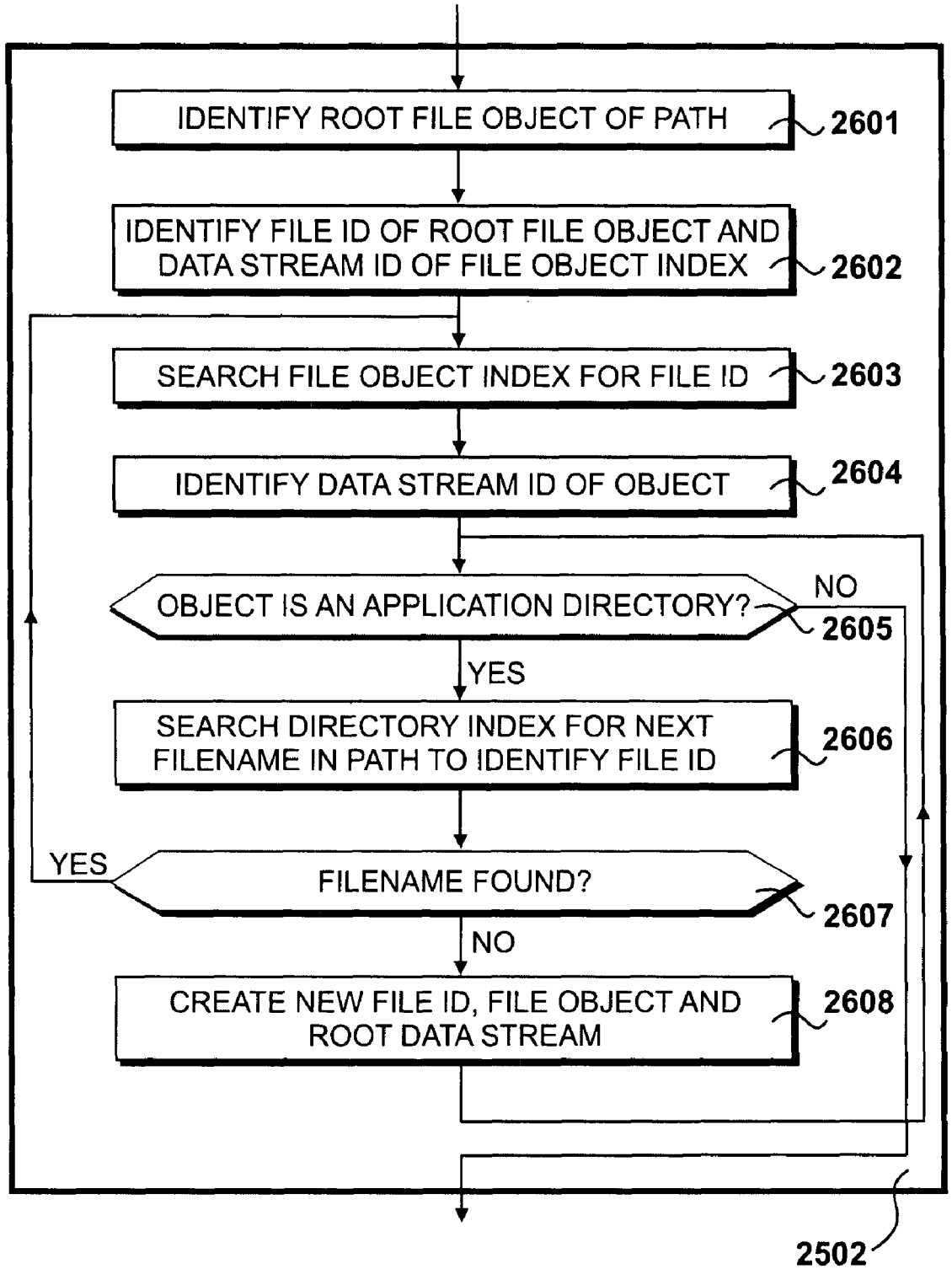
FIG. 26 details steps carried out during FIG. 25 to identify a main data stream ID.

FIG. 26 details step 2502 at which the main data stream ID for the requested file is identified. At step 2601 the root file object of the path is identified and at step 2602 the file ID of the root file object and the data stream ID of the root node of the file object index 802 are identified from the virtual disk information 810. At step 2603 the file object index 802 is searched for the identified file ID and at step 2604 the main data stream ID of the file object is identified. At step 2605 a question is asked as to whether the file object identifies an application directory, and if this question is answered in the affirmative then at step 2606 the directory index for the directory is searched for the filename that forms the next part of the path to identify the next file ID.

A question is then asked at step 2607 as to whether the filename has been found in the directory index, and if the question is answered in the affirmative then control is returned to step 2603 and the file object index 802 is searched using the file ID identified. If it is answered in the affirmative then at step 2608 a new file ID, file object and root data stream are created, and control is returned to step 2605.

Since the file object index and directory indices are comprised of data streams, the steps of searching them require repeated READ requests to be made for specific data streams. Thus requests made for data streams are not always made by applications but by drivers within extension 705.

If the question asked at step 2605 is answered in the negative, to the effect that the object indicates an application file, then step 2502 is completed.

FIG. 27

Figure 27:
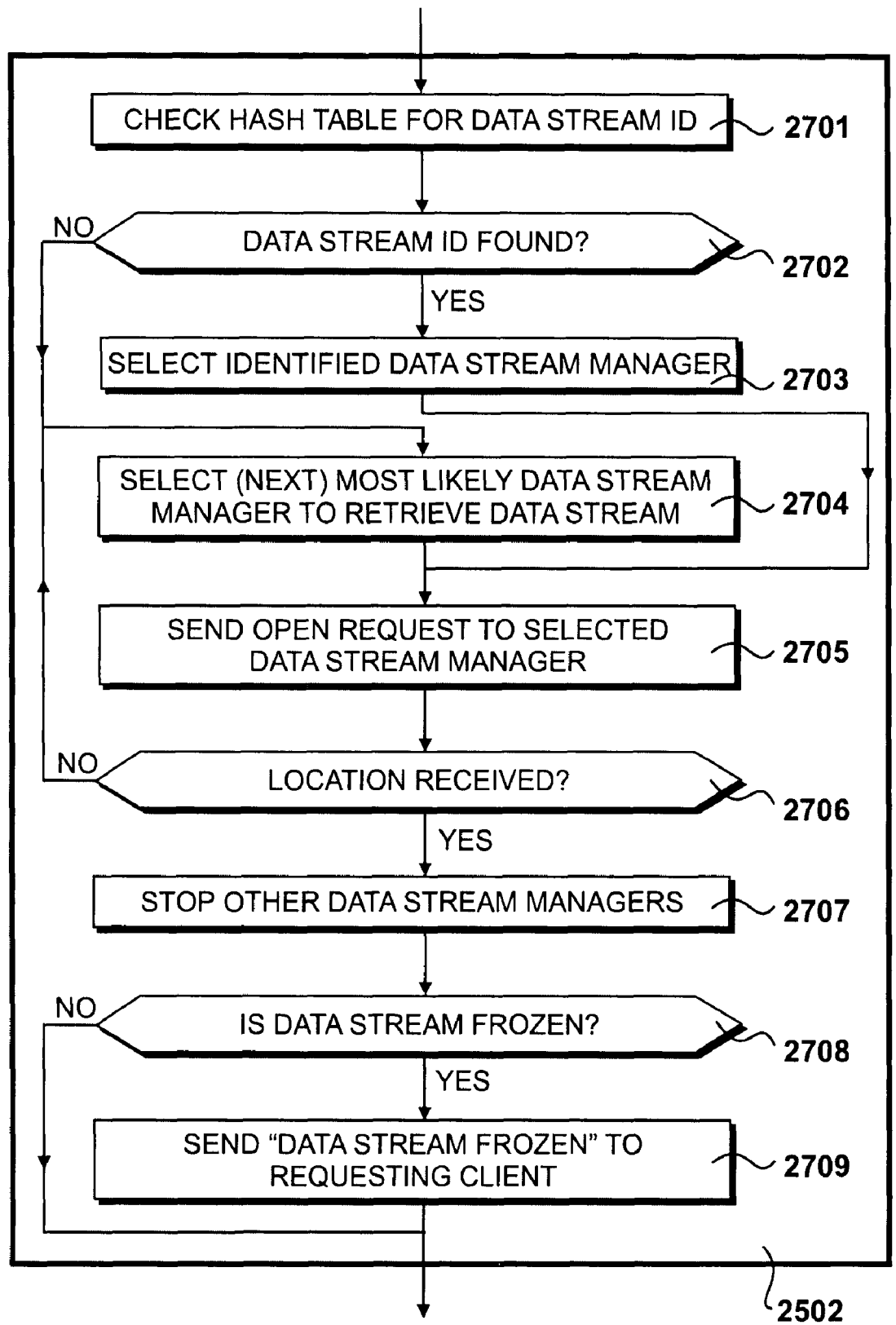
FIG. 27 details steps carried out during FIG. 25 to identify the location of a data stream.

FIG. 27 details step 2502 at which the location of the data stream identified during step 2502 is identified. Data access manager 801 maintains a hash table which points to the location of recently accessed data streams. A hash of a data stream ID is used as the key in the table, and the value is the corresponding local stream ID and a reference to the local stream manager that can access it. Thus at step 2701 the data access manager checks the hash table for the identified data stream ID, and at step 2702 a question is asked at to whether the data stream ID has been found. If this question is answered in the affirmative then at step 2703 the data stream manager that communicates with the indicated local stream manager is selected.

If the question asked at step 2702 is answered in the negative then at step 2704 the data access manager selects the data stream manager that is most likely to retrieve the data stream quickly. This selection is made on the basis of recent performance and hinting information stored for each data stream manager comprising ranges of data stream IDs that the data stream manager can access.

At step 2705 an OPEN request is sent to the data stream manager selected at step 2703 or 2704, and at step 2706 a question is asked at to whether the location of the data has been received. If this question is answered in the negative then control is returned to step 2704 and the next mostly likely data stream to retrieve the data is selected. If the question is answered in the affirmative, then at step 2707 any other data stream managers that have been sent corresponding OPEN requests are stopped.

At step 2708 a question is asked at to whether the data stream is frozen and cannot therefore be opened for read/write access. If this question is answered in the affirmative then at step 2709 the message "DATA STREAM FROZEN" is sent to the requesting client in order that the client may send a CLONE request to the data access manager. Following this step or an answer in the negative at step 2708, step 2502 is concluded.

FIG. 28

Figure 28:
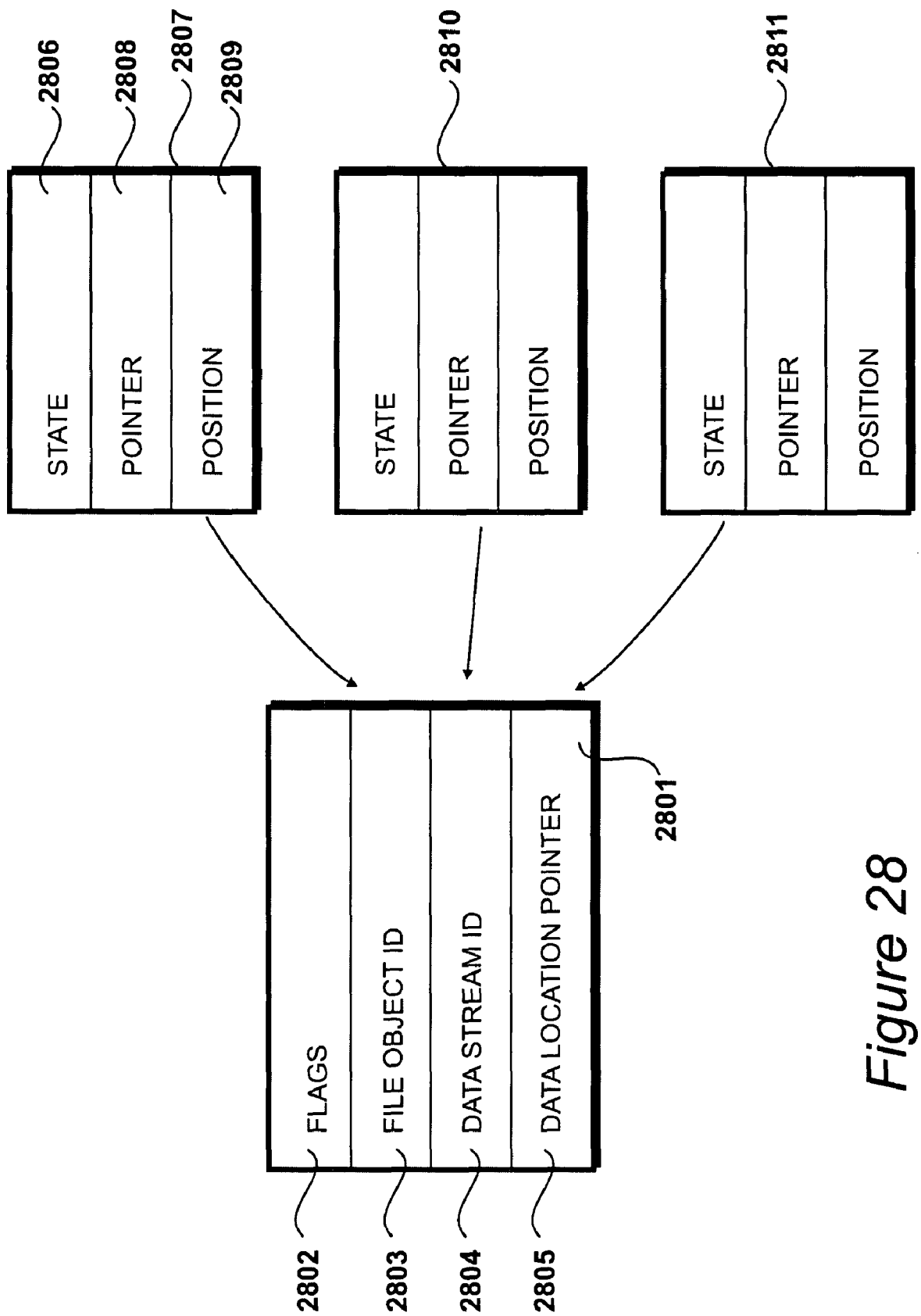
FIG. 28 illustrates open handles.

An OPEN request from the operating system results in an open handle being returned. Multiple requests for the same application file result in multiple open handles. In order to conserve memory, each open handle is small and consists mainly of a pointer to a master handle, stored in a hash table, that contains the required information. Thus as shown in FIG. 28, master handle 2801 includes flags 2802 regarding the state of the file object, the file object ID 2803, the data stream ID 2804 and a pointer 2805 to the location of the data. Open handle 2805 includes only an indication 2807 of state, a memory pointer 2808 to master handle 2801, and an indication 2809 of the position reached by the application in reading the file. Open handles 2810 and 2811 are similarly constructed.

FIG. 29

Figure 29:
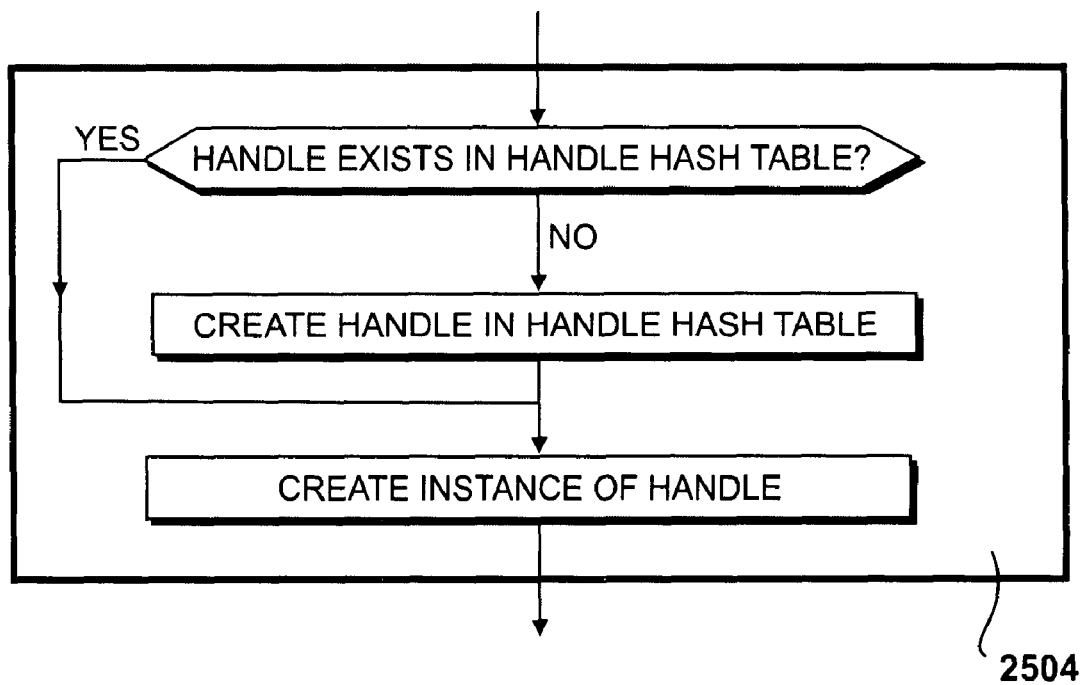
FIG. 29 details steps carried out during FIG. 25 to create an open handle.

FIG. 29 details step 2504 at which an open handle is created. At step 2901 a question is asked as to whether a master handle for this file exists. If this question is answered in the negative then at step 2902 a master handle is created using the file object ID and data stream ID identified at step 2502, and location retrieved at step 2503. Following this step, and if the question asked at step 2801 is answered in the negative, at step 2803 an open handle is created that references the master handle.

FIG. 30

Figure 30:
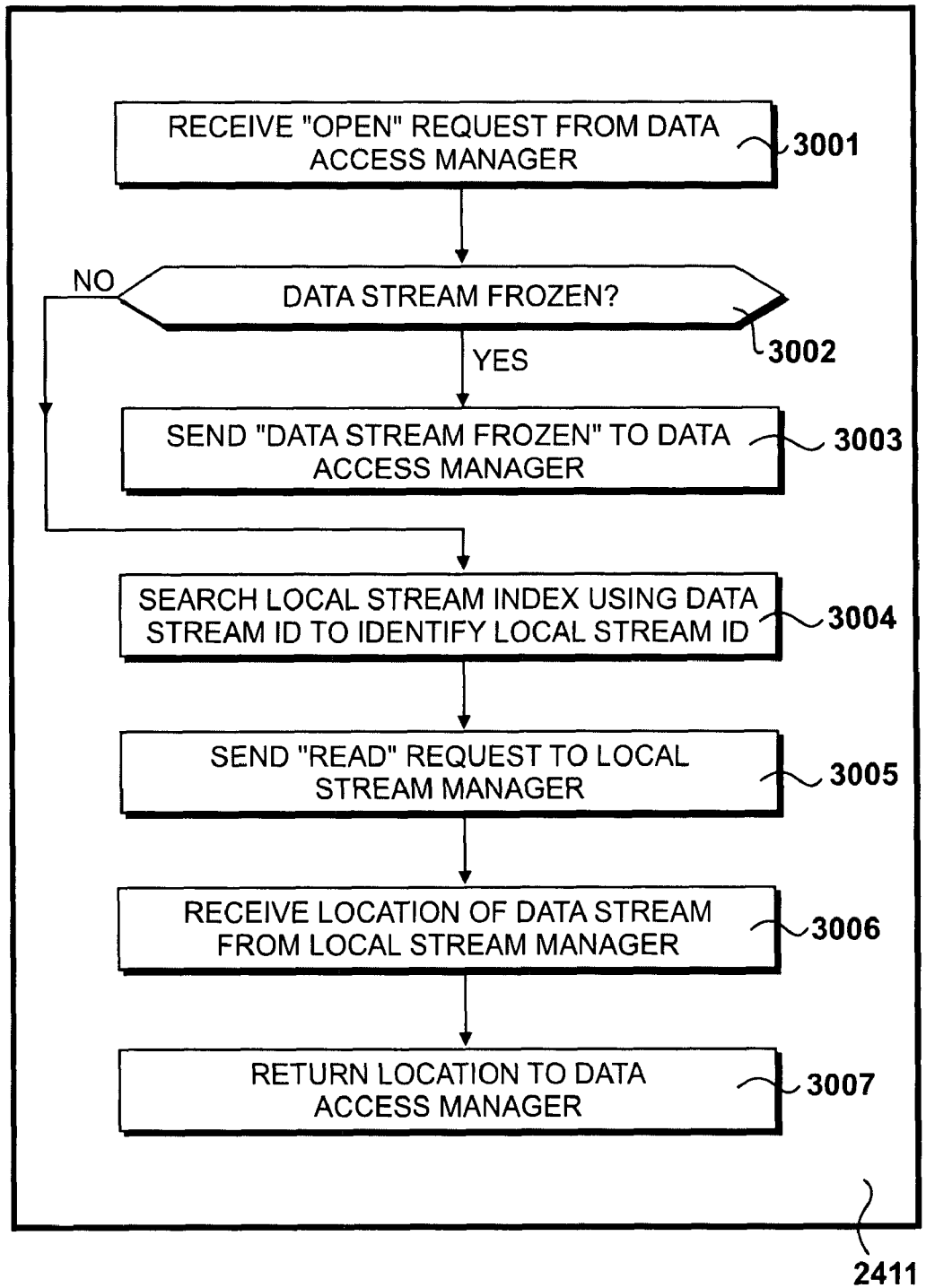
FIG. 30 details a process carried out by the data stream manager shown in FIG. 24B to open a data stream.

FIG. 30 details OPEN process 2411 on data stream manager 2302. At step 3001 an OPEN request is received from data access manager 801 (sent at step 2705). The request includes a data stream ID. At step 3002 a question is asked at to whether the data stream is frozen, and if this question is answered in the affirmative a message to this effect is returned to data access manager 801 and process 2411 is completed.

If the data stream is not frozen then at step 3004 the local stream index 1002 is searched to identify the local stream ID corresponding to the received data stream ID, and at step 3005 a READ request is sent to local stream manager 2312.

At step 3006 the location of the data stream is received from local stream manager 2312 and at step 3007 the location is returned to data access manager 801.

FIG. 31

Figure 31:
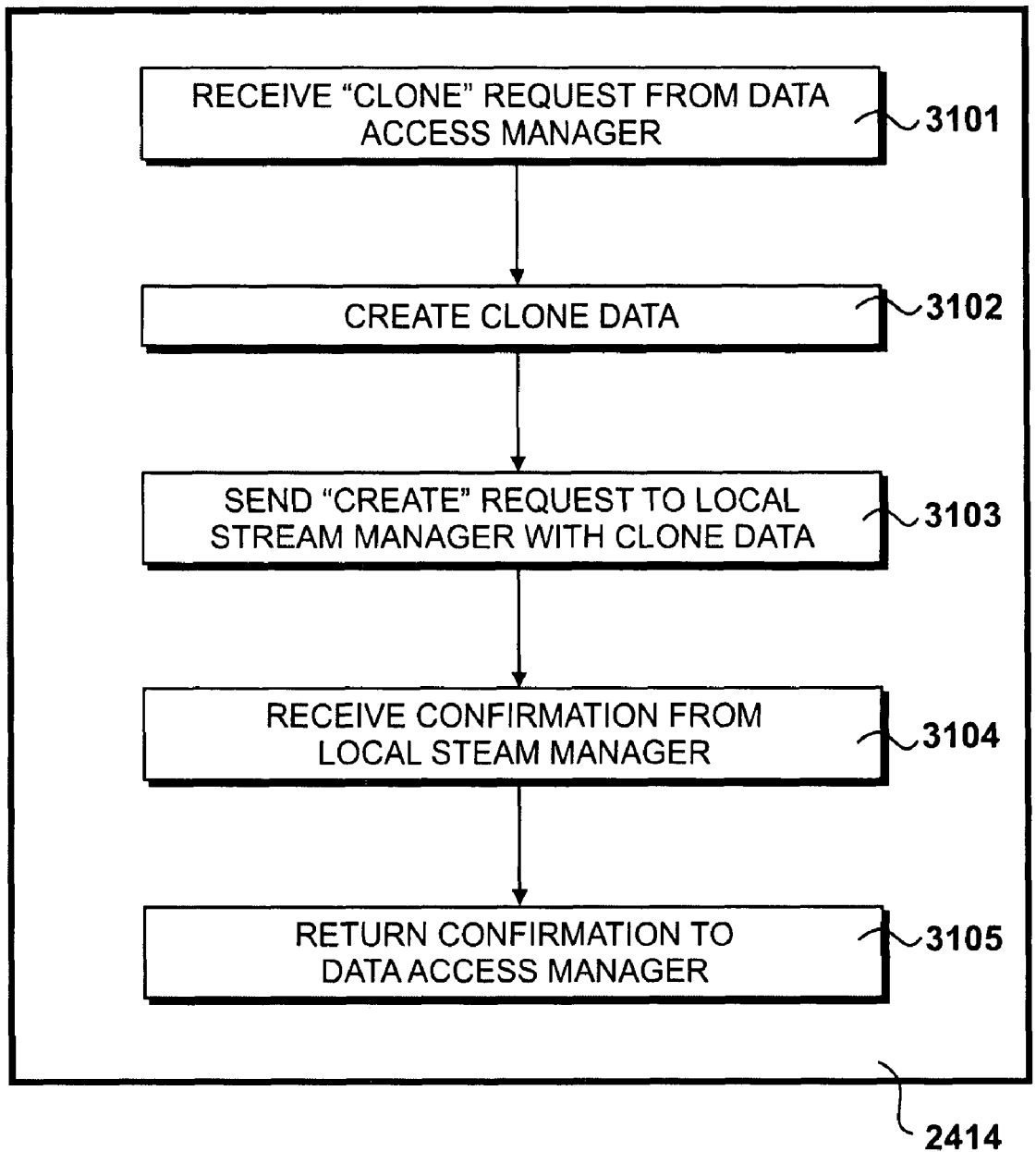
FIG. 31 details a process carried out by the data stream manager shown in FIG. 24B to clone a data stream.

FIG. 31 details clone process 2414 on data stream manager 2302 which occurs when a client requests data access manager 801 to clone a data stream following an indication that it is frozen, and data access manager 801 passes this request on to the relevant data stream manager. Thus at step 3101 a CLONE request is received, and at step 3102 clone data is created. In this embodiment a clone data stream is simply a reference to the entirety of its predecessor, but in other embodiments it could be a copy of the data. Whichever method is used, the clone data stream is considered to contain the same information as its predecessor, whether or not it contains the same data.

At step 3103 a CREATE request is sent to local stream manager 2312 together with the clone data, and at step 3104 confirmation of the new data stream is received from local stream manager 2312. At step 3105 confirmation is sent to data access manager 801. The requesting client can then make a new OPEN request for the clone data stream.

FIG. 32

Figure 32:
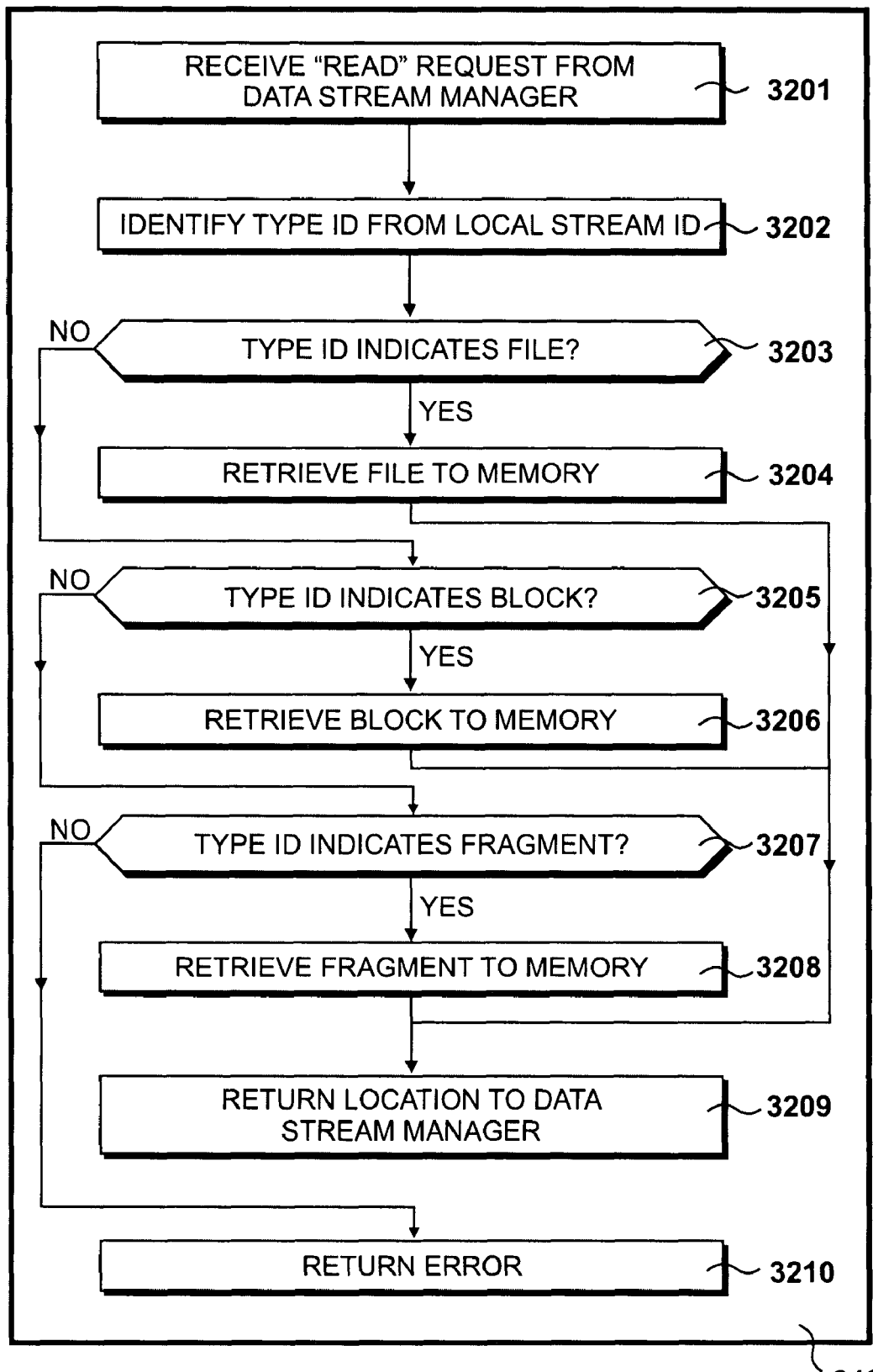
FIG. 32 details a process carried out by the local stream manager shown in FIG. 24C to read a data stream.

FIG. 32 details Read process 2422 on local stream manager 2312. At step 3201 a READ request is received along with a local stream ID. The type ID that identifies the way in which the referenced data stream is stored—as an operating system file, a block or a fragment—is identified at step 3202. The local stream ID received at step 3201 is a 6-byte identifier made up of a high word, a mid word and a low word, each word comprising 2 bytes. In this example, the type ID is identified by the two high bits of the mid word. If they are 00 the type ID indicates a file; if they are 01 the type ID indicates an atomic cache block; if they are 10 the type ID indicates a fragment.

At step 3203 a question is asked as to whether the type ID indicates an operating system file, and if this question is answered in the affirmative then at step 3204 the required file is retrieved to memory using the underlying operating system services.

If the question asked at step 3203 is answered in the negative, then at step 3205 a further question is asked as to whether the type ID indicates a block, and if this question is answered in the affirmative then at step 3206 the block is retrieved to memory.

If the question asked at step 3205 is answered in the negative, then at step 3207 a further question is asked as to whether the type ID indicates a fragment, and if this question is answered in the affirmative then at step 3208 the block is retrieved to memory.

Following any of steps 3204, 3206 or 3208 a confirmation of read is sent to data stream manager 2312 at step 3209. Alternatively, if the question asked at step 3207 is answered in the negative, an error message is returned at step 3210.

FIG. 33

Figure 33:
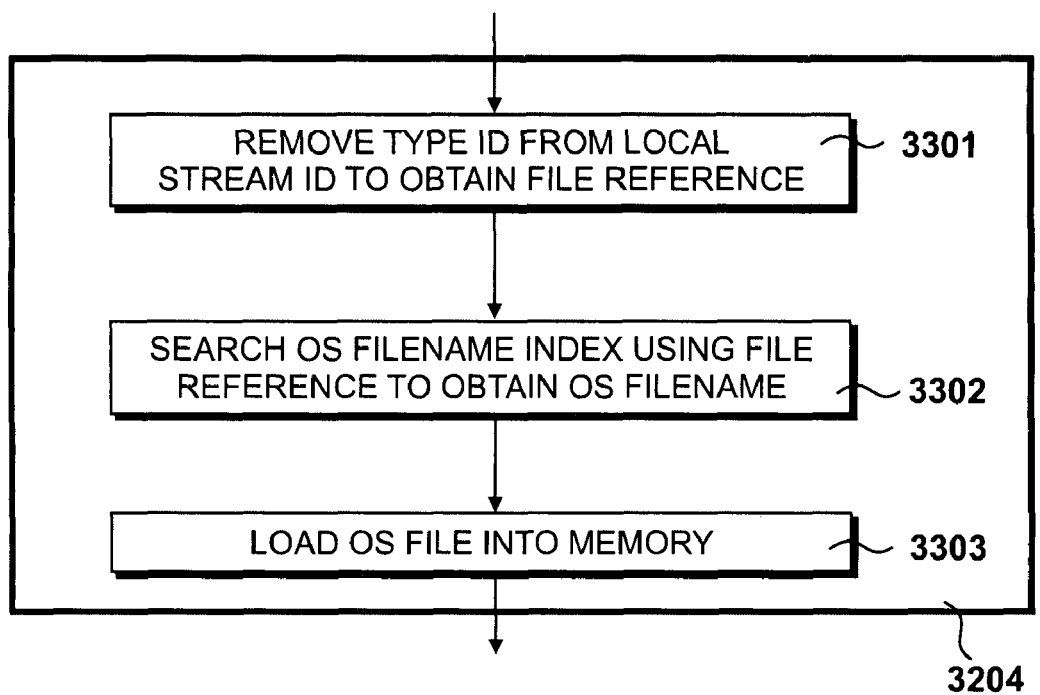
FIG. 33 details steps carried out during FIG. 32 to retrieve an operating system file.

FIG. 33 details step 3204 at which an operating system file is retrieved. At step 3301 the type ID is removed from the local stream ID to leave a 46-bit reference. At step 3302 this reference is used to identify the operating system filename. In this embodiment, the index is a B+ tree stored as an operating system file in which the key is the reference and the value is an operating system filename.

At step 3303 the required file is loaded into memory.

FIG. 34

Figure 34:
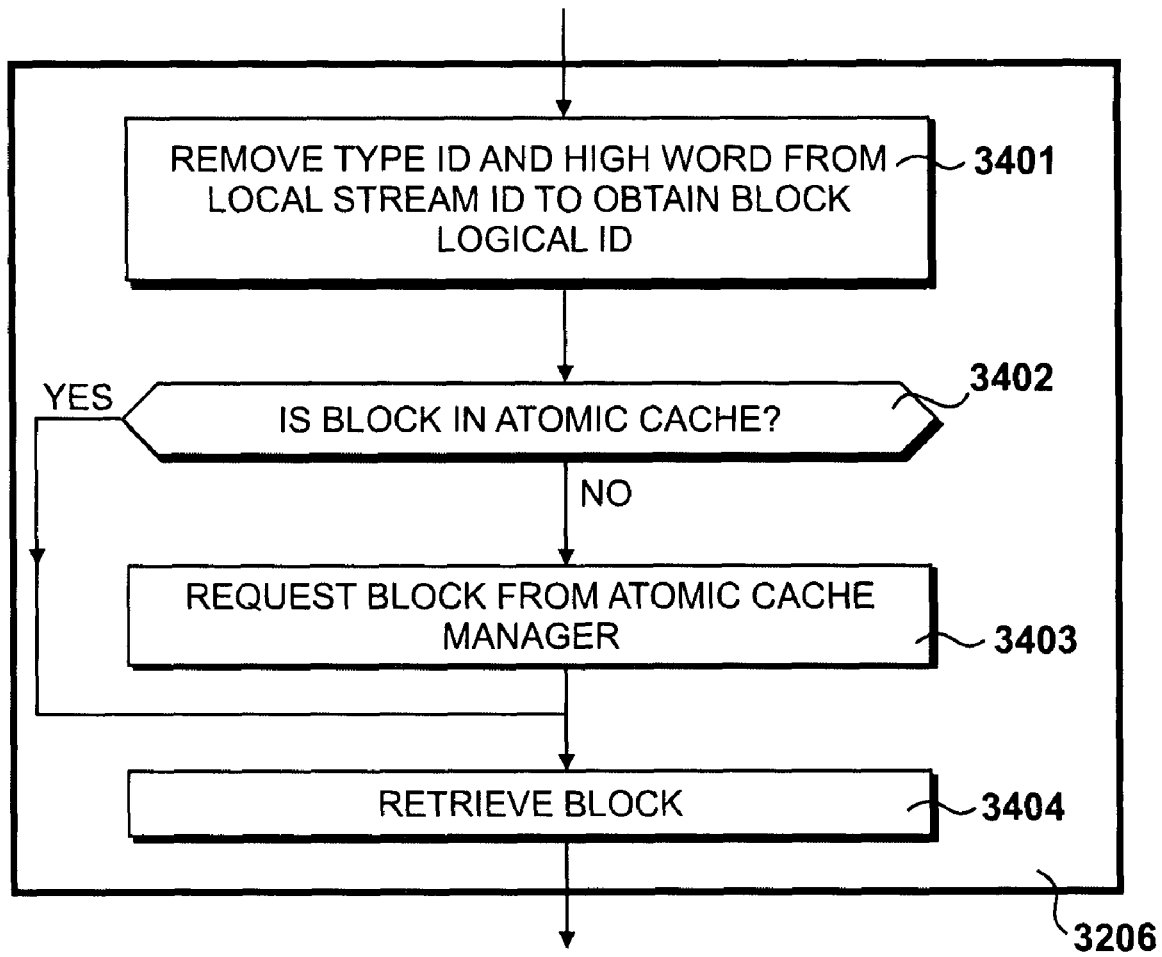
FIG. 34 details steps carried out during FIG. 32 to retrieve an atomic cache block.

FIG. 34 details step 3206 at which an atomic cache block is retrieved. At step 3401 the type ID and high word are removed from the local stream ID to leave a 30-bit logical block ID. At step 3402 a question is asked as to whether the required block is already in the atomic cache, and if this question is answered in the negative then at step 3403 the logical block ID is forwarded to atomic cache manager 804, which loads the block into the atomic cache 808 as will be described further with reference to FIG. 48.

FIG. 35

Figure 35:
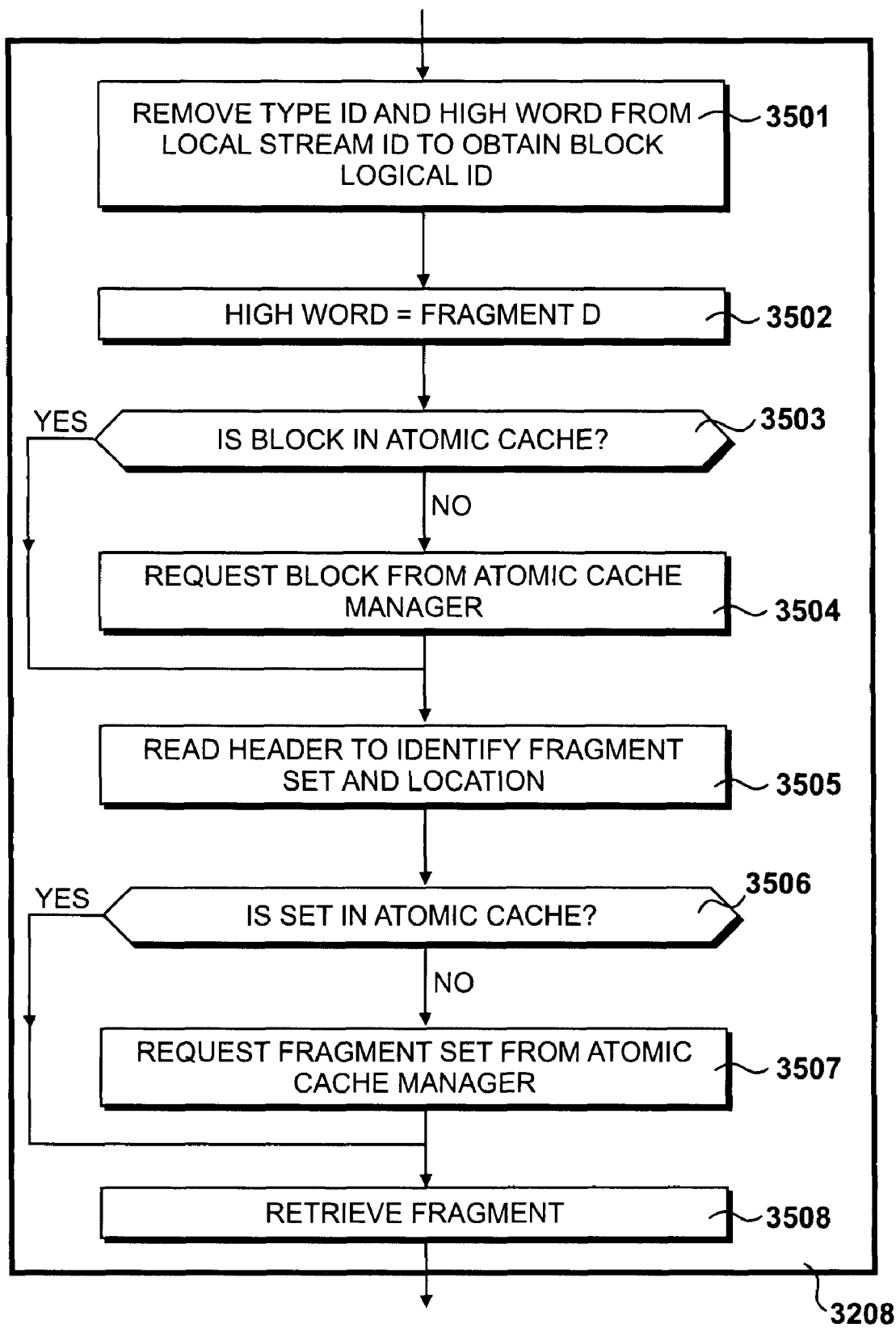
FIG. 35 details steps carried out during FIG. 32 to retrieve a fragment.

FIG. 35 details step 3208 at which a fragment is retrieved. As will be described further with reference to FIG. 35, fragments are stored in sets of four blocks. The first block of the set contains a header. At step 3401 the type ID and high word are removed from the local stream ID to leave a 30-bit logical block ID, identifying the first block in the set in which the fragment is stored. At step 3502 the high word is identified as a fragment ID.

At step 3503 a question is asked as to whether the required block is already in the atomic cache, and if this question is answered in the negative then at step 3504 the logical block ID is forwarded to atomic cache manager 804 which loads the block into the atomic cache 808. At step 3505 the header of the block is read to identify the fragment set to which it belongs and the location of the required fragment.

At step 3506 a question is asked as to whether the required set (of four blocks) is already in the atomic cache, and if this question is answered in the negative then at step 3507 the logical IDs of the blocks making up the fragment set are forwarded to atomic cache manager 804 which loads the blocks into the atomic cache 808.

At step 3508 the required fragment is loaded into memory.

FIG. 36

Figure 36:
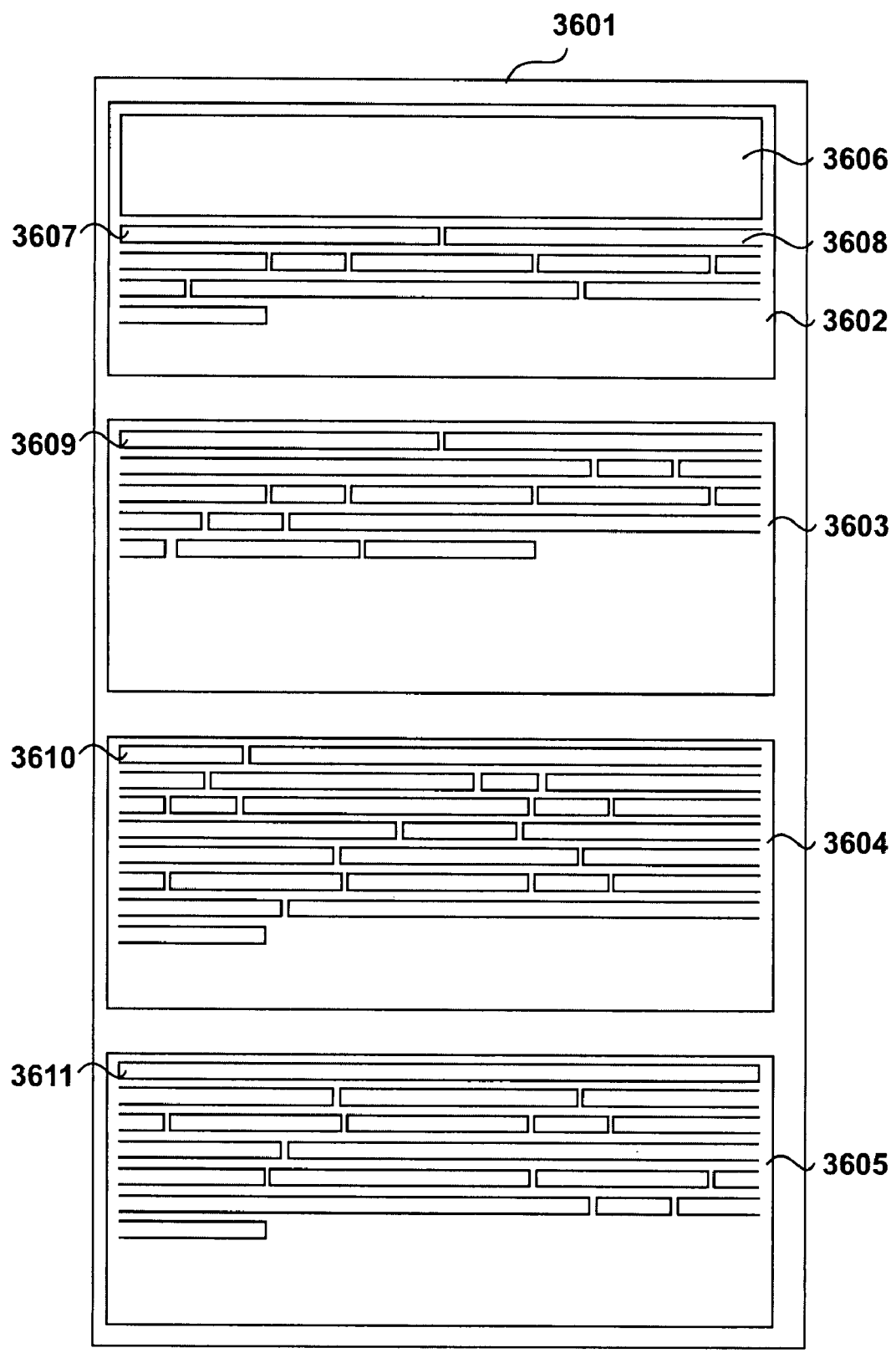
FIG. 36 illustrates a fragment set.

FIG. 36 illustrates a fragment set comprising four atomic cache blocks 3602, 3603, 3604 and 3605. The first block 3602 contains a header 3606. Each block contains fragments, such as fragments 3607, 3608, 3609, 3610 and 3611. A fragment is a portion of data that is smaller than 4 kB in size. Any portion of data between 4 kB and 8 kB is stored in its own block, and if it is larger than that in its own operating system file.

The fragments are stored "nose-to-tail" without any space between them. When a fragment shrinks or grows the fragments following it move backwards or forwards within the block. The blocks in the fragment set are therefore filled at the same rate, rather than the first block being filled, followed by the second, and so on, in order that there is space if possible for a fragment to grow.

Figure 37:
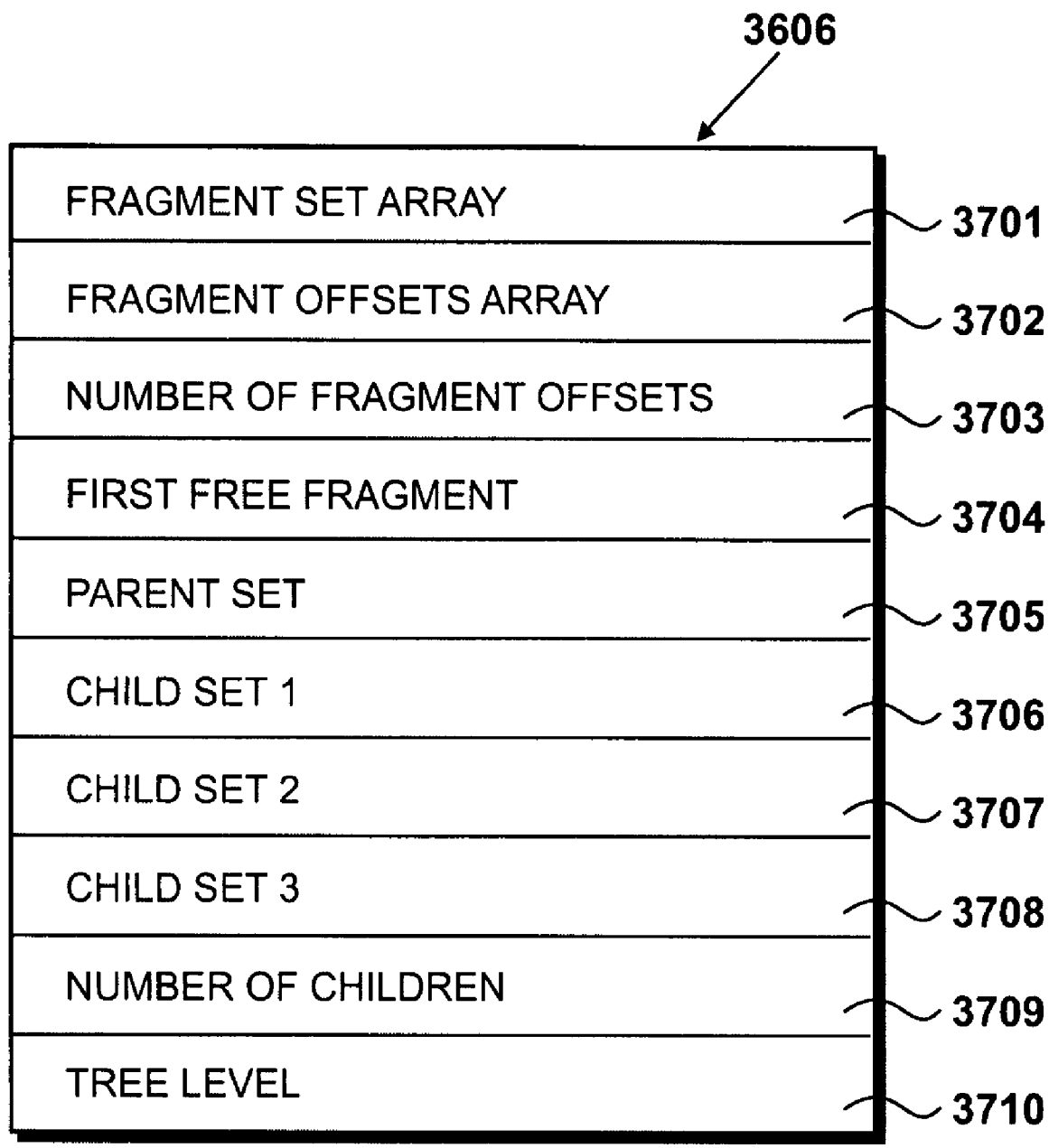
FIG. 37 illustrates information in the header of the fragment set shown in FIG. 36.

Fragments are arranged so that data streams that refer to each other are stored close to each other. This means that in order to access a particular file, it is likely that only one set of fragments has to be loaded, or more if the file is larger. Additionally, each set has child sets so that when related fragments spill out of one set they are then stored in only one other, and so on. This increases the clustering effect.
FIG. 37

FIG. 37 shows the information held in header 3606. Firstly, the fragment set array holds the logical IDs of the four blocks in the set. Fragment offsets array 3702 holds the location of all the fragments in the set, expressed as an offset in size from the beginning of the set over all four blocks. Each array slot is the same size so that the array can be addressed using array offsets. Once a fragment is stored, the array offset of its location does not change, although its fragment offset within the set may do. Information 3703 identifies the number of fragment offsets in the array.

Information 3704 identifies the first free array slot in the fragment offsets array 3702. The free slots are a linked list, such that the first free slot holds a pointer to the next free slot, and so on, with the final free slot holding a zero.

Figure 38:
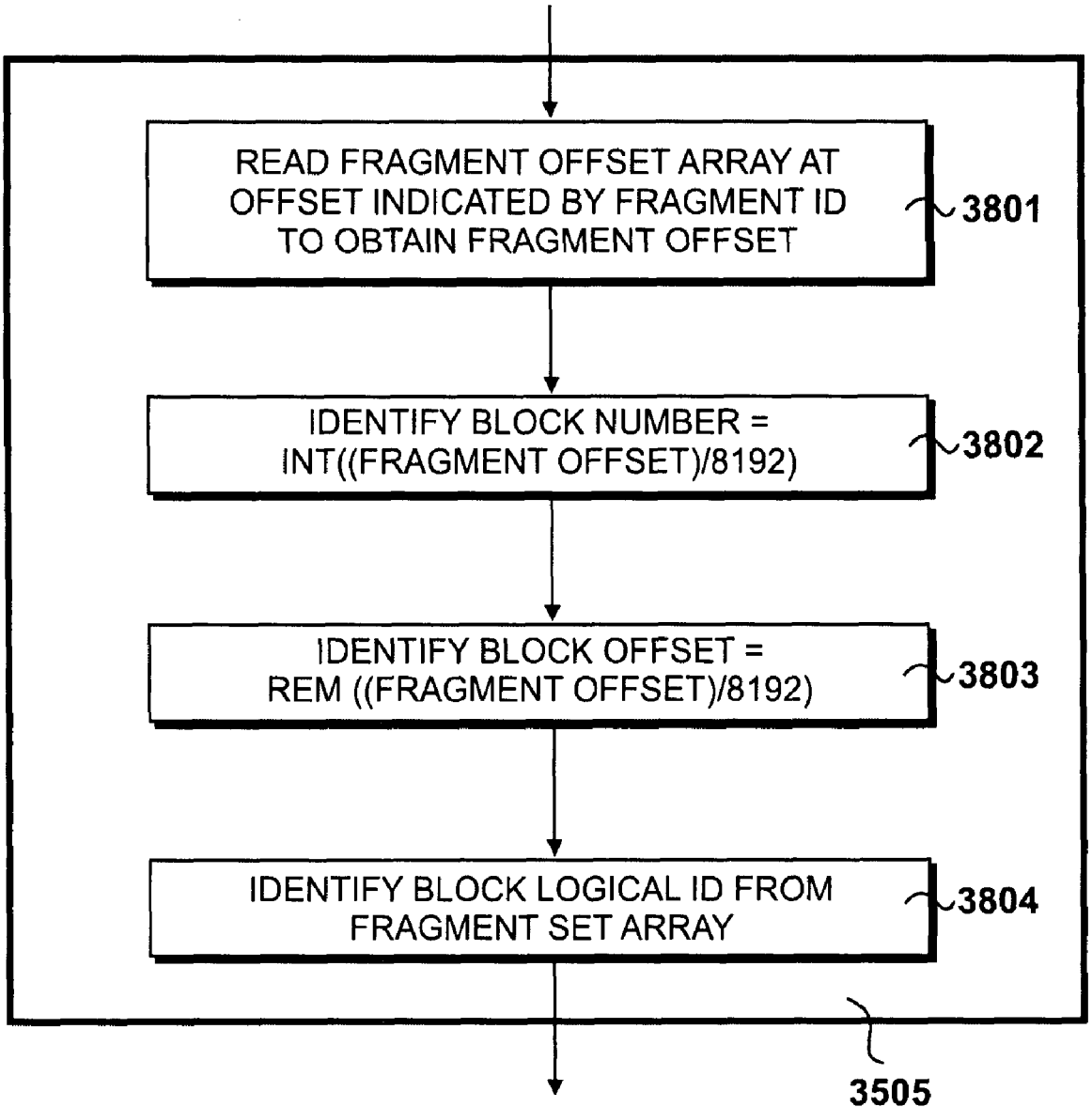
FIG. 38 details steps carried out during FIG. 35 to read the header shown in FIG. 37.

Fragment sets can have up to three child sets, and thus the parent set of the set is identified at 3705, and up to three child sets identified at 3706, 3707 and 3708. The number of child sets is identified at 3709, and the level of the set within the tree structure thus created is identified at 3710.
FIG. 38

FIG. 38 details step 3505 at which the header 3606 is read to identify required information. The fragment ID identified at step 3502 is an array offset within fragment offsets array 3702, and so at step 3801 fragment offsets array 3702 is read at the indicated slot to identify the fragment offset, in bytes, where the fragment is actually stored. At step 3802 the block number (from 0 to 3) is identified by taking the integer part of the result of dividing the fragment offset by 8192 (the number of bytes in a block). The remainder of this division is identified as the block offset at step 3803. For example, a fragment offset of 9000 gives a block number of 1 and a block offset of 808, indicating that the fragment is stored at and following byte 808 of the second block in the set. Thus the block number of the block where the fragment is stored and the location of the fragment within the block are identified using the fragment offset.

Figure 39:
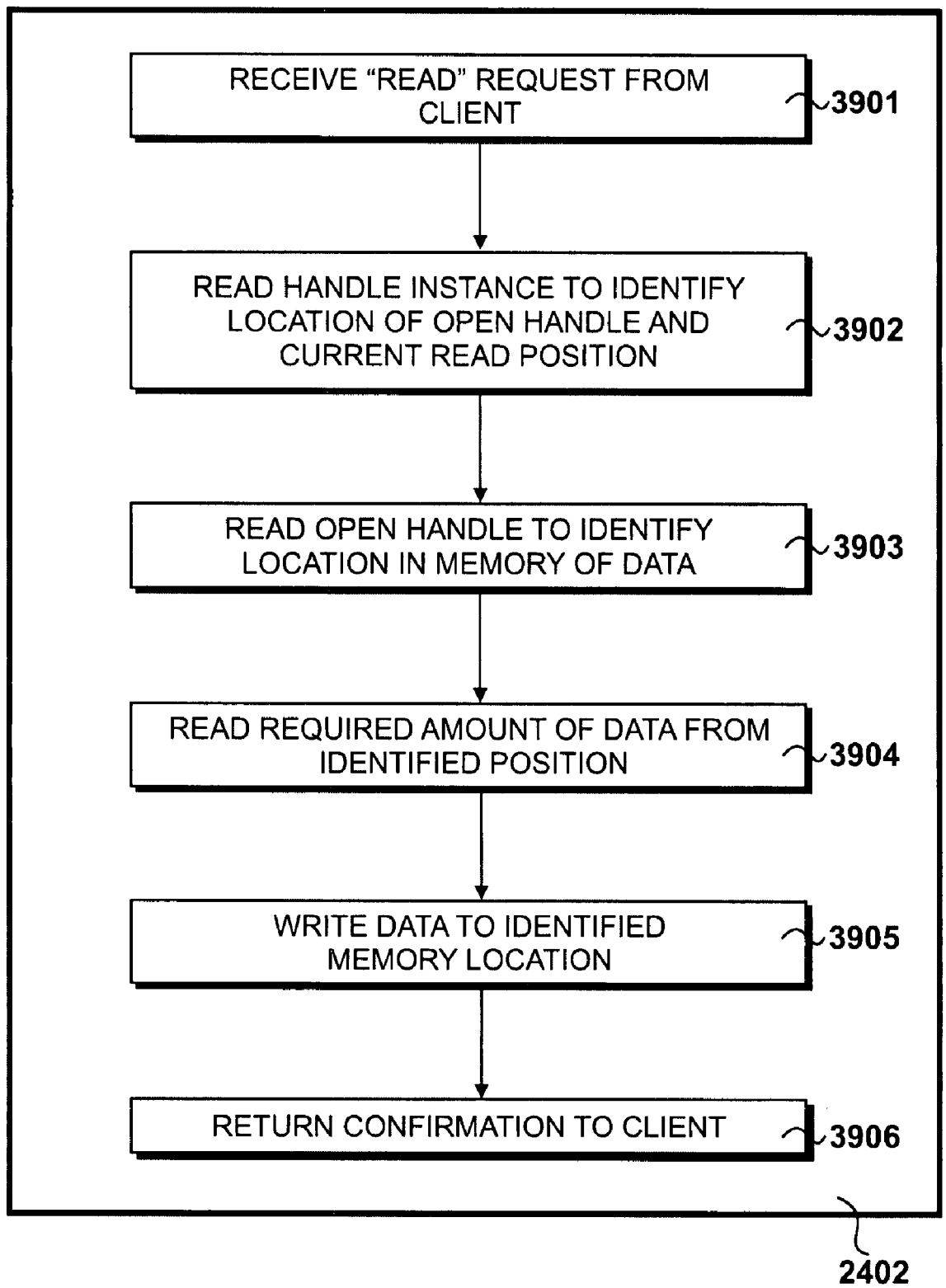
FIG. 39 details a process carried out by the data access manager shown in FIG. 24A to read a data stream.

The logical ID of the required block is identified from fragment set array 3701 at step 3804, following which the fragment can be read from the block in the atomic block cache.
FIG. 39

Once the data has been read into the specified location by local stream manager 2312, it can be read by the requesting application. Thus on receipt of a READ request with an open handle and an indication of a memory location at step 3901 of Read process 2402 on data access manager 801, the open handle is read at step 3902 to identify the location of the master handle and the current read position. At step 3903 the open handle is read to identify the location of the data.

Figure 40:
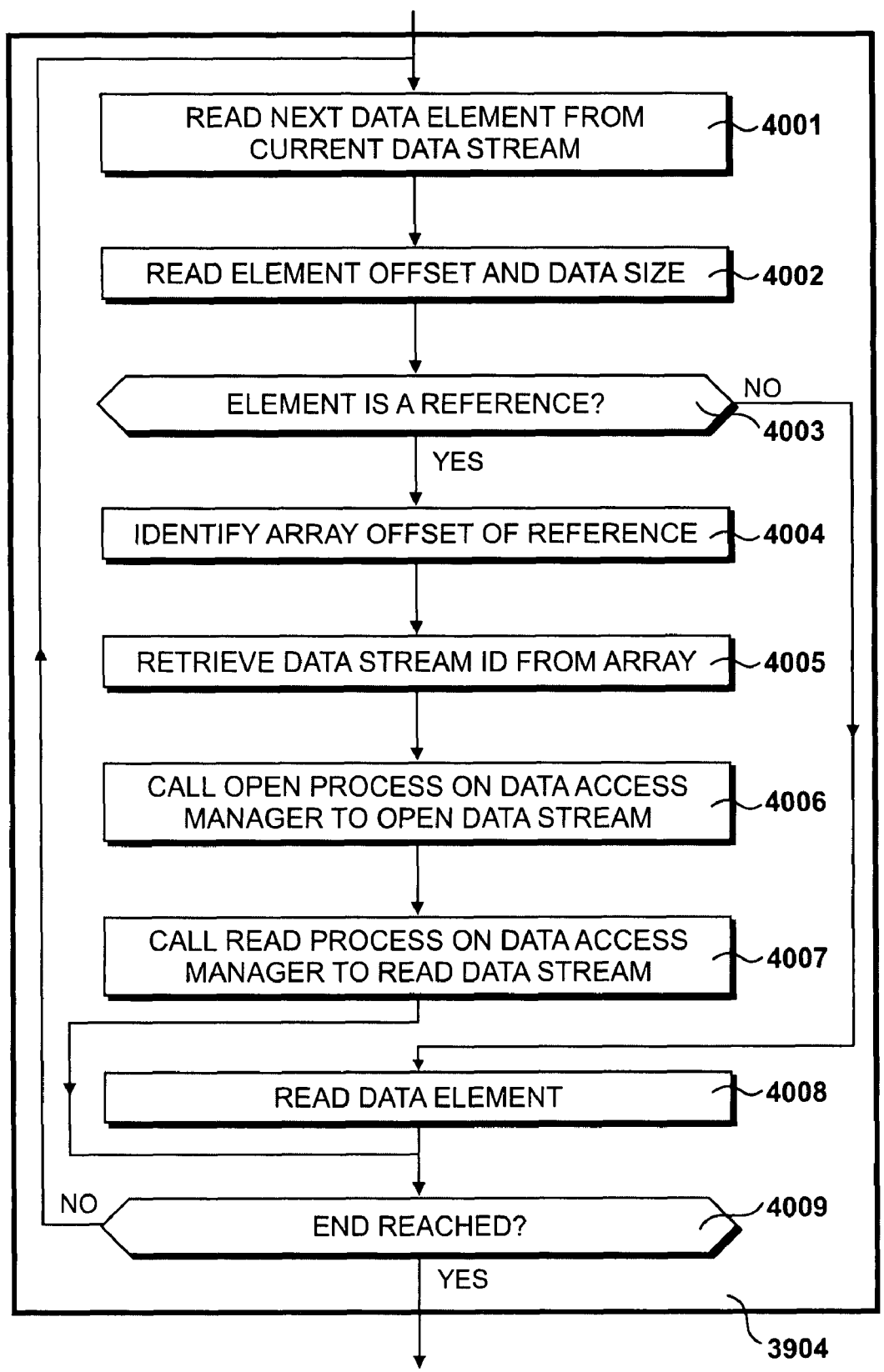
FIG. 40 details steps carried out during FIG. 39 to read data from a data stream.

At step 3904 the required amount of data is retrieved and stored at the indicated place in memory and at step 3906 a confirmation is sent to the client.
FIG. 40

Step 3904 at which data is read is detailed in FIG. 40. This algorithm performs the process illustrated in FIG. 14. At step 4001 the first data element in the data stream is read and at step 4002 the element's offset in the data stream and the size of the data in the element are identified. At step 4003 a question is asked as to whether the element is a reference to another data stream. If this question is answered in the affirmative then at step 4004 the array offset in the element is identified, and at step 4005 array 1303 is read and the data stream ID at the identified offset is retrieved. At step 4006 an OPEN request is sent to data access manager 801 to open the identified data stream, and at step 4007 a READ request is sent to data access manager 801 to read the identified amount of data from the identified offset of the referred data stream. Thus data access manager 801 recursively calls itself whenever data streams are referenced within a data stream being read. The read data streams are later closed with CLOSE requests.

Figure 41:
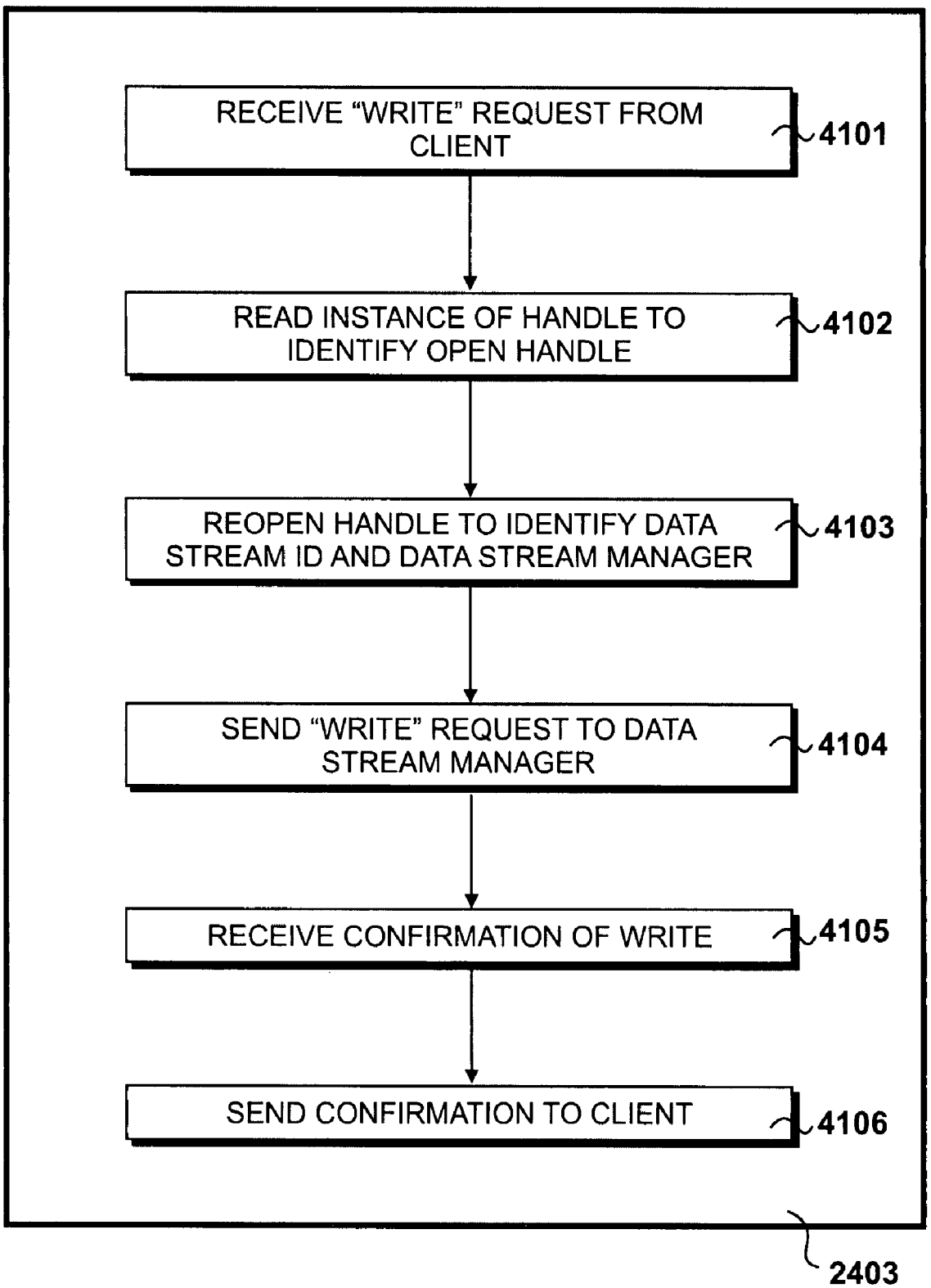
FIG. 41 details a process carried out by the data access manager shown in FIG. 24A to write a data stream.

If the question asked at step 4003 is answered in the negative, to the effect that the element is not a reference, then at step 4008 the element is read from the data stream using the offset and data size identified at step 4002. Following either of steps 4007 or 4008, a question is asked at step 4009 at to whether the end of the data stream has been reached. If this question is answered in the negative then control is returned to step 4001 and the next element is read. If it is answered in the affirmative then at step 4009 then step 3904 is completed.
FIG. 41

Figure 42:
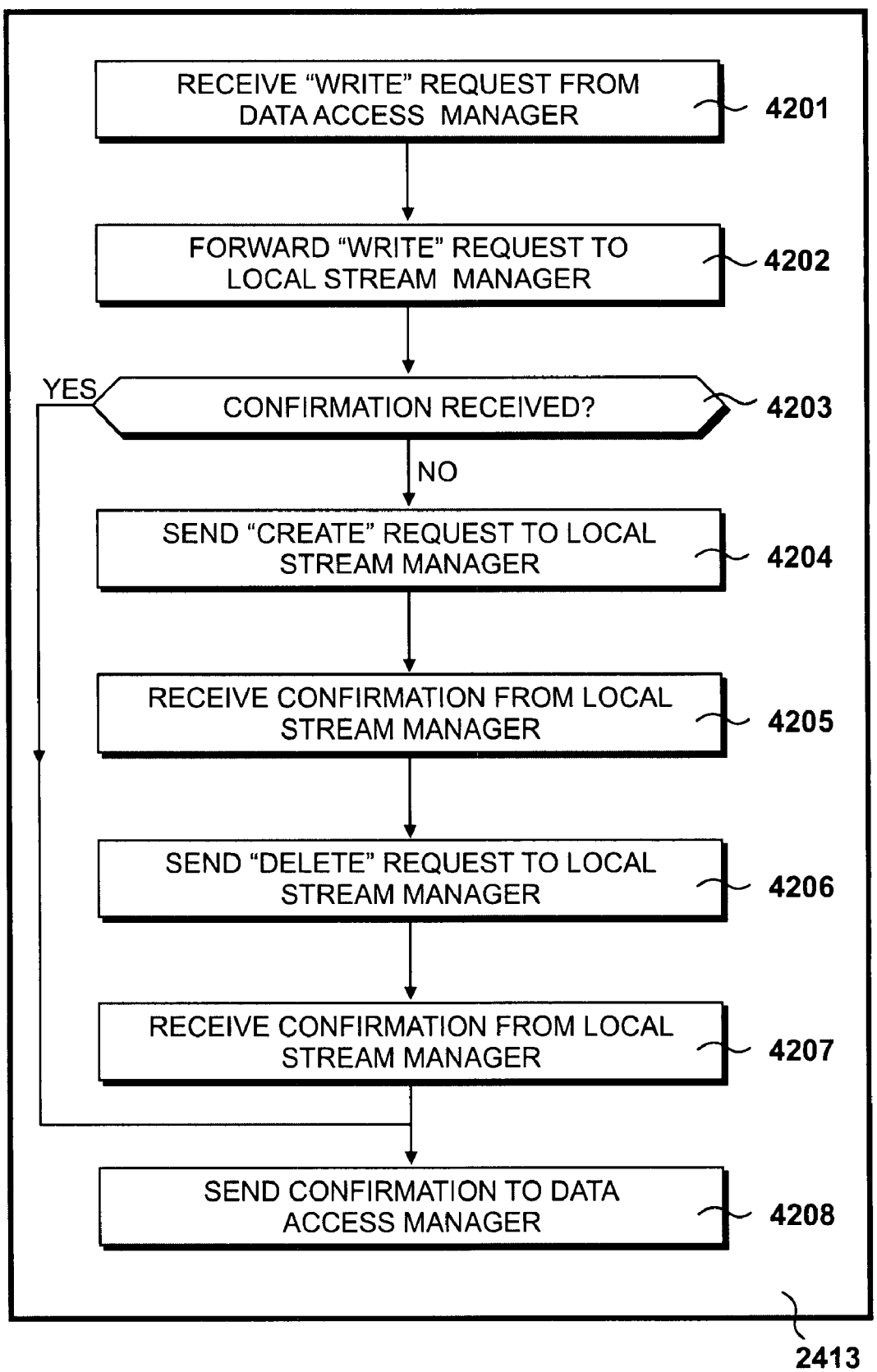
FIG. 42 details a process carried out by the data stream manager shown in FIG. 24B to write a data stream.

Write process 2403 on data access manager 801 is detailed in FIG. 41. At step 4101 a WRITE request is received from a client, along with an open handle reference, and at step 4102 the open handle is read to identify the master handle. At step 4103 the master handle is read to identify the data stream ID and data stream manager that should be used. At step 4104 a WRITE request is sent to the identified data stream manager and at step 4105 a confirmation of write is received from the data stream manager, with a confirmation being sent to the client at step 4106.
FIG. 42

Write process 2413 on data stream manager 2312 is detailed in FIG. 42. At step 4201 a WRITE request along with a data stream ID and data to be written is received from data access manager 801. At step 4202 a WRITE request is sent to local stream manager 2312 and at step 4203 a question is asked at to whether confirmation of write has been received. If this question is answered in the negative then an error has been received, meaning that the local stream manager 2312 could not write the data stream to its original location.

Figure 43:
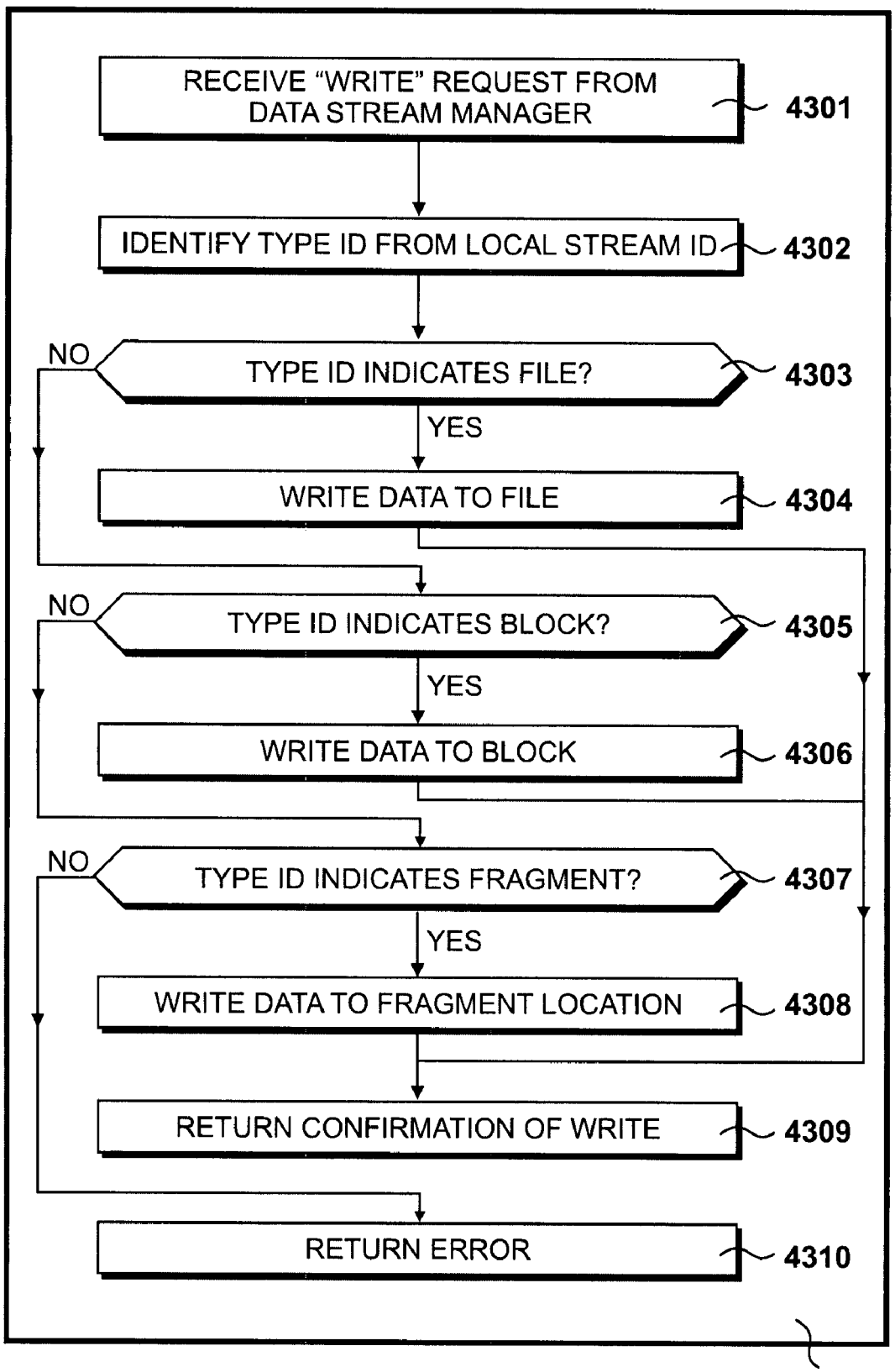
FIG. 43 details a process carried out by the local stream manager shown in FIG. 24C to write a data stream.

Thus at step 4204 a CREATE request is sent to local stream manager 2312, requesting it to create a new data stream using the same data. After reception of confirmation of create at step 4206 a DELETE request is sent to discard the local stream ID at step 4207. Once confirmation is received at step 4207, or following an answer in the affirmative at step 4203, confirmation of write is sent to data access manager 801 at step 4208.
FIG. 43

Write process 2423 on local stream manager 2312 is detailed in FIG. 43. At step 4301 a WRITE request along with a local stream ID is received from data stream manager 2312. The type ID that identifies the way in which the referenced data stream is stored is identified at step 4302.

At step 4303 a question is asked as to whether the type ID indicates an operating system file, and if this question is answered in the affirmative then at step 4304 the file is written.

If the question asked at step 4303 is answered in the negative, then at step 4305 a further question is asked as to whether the type ID indicates a block, and if this question is answered in the affirmative then at step 4306 the block is written.

If the question asked at step 4305 is answered in the negative, then at step 4307 a further question is asked as to whether the type ID indicates a fragment, and if this question is answered in the affirmative then at step 4308 the fragment is forwarded to fragment manager 805 for storage.

Following any of steps 4304, 4306 or 4308 a confirmation of write is sent to data stream manager 2312 at step 4309. Alternatively, if the question asked at step 4307 is answered in the negative, an error message is returned at step 4310.

FIG. 44

Figure 44:
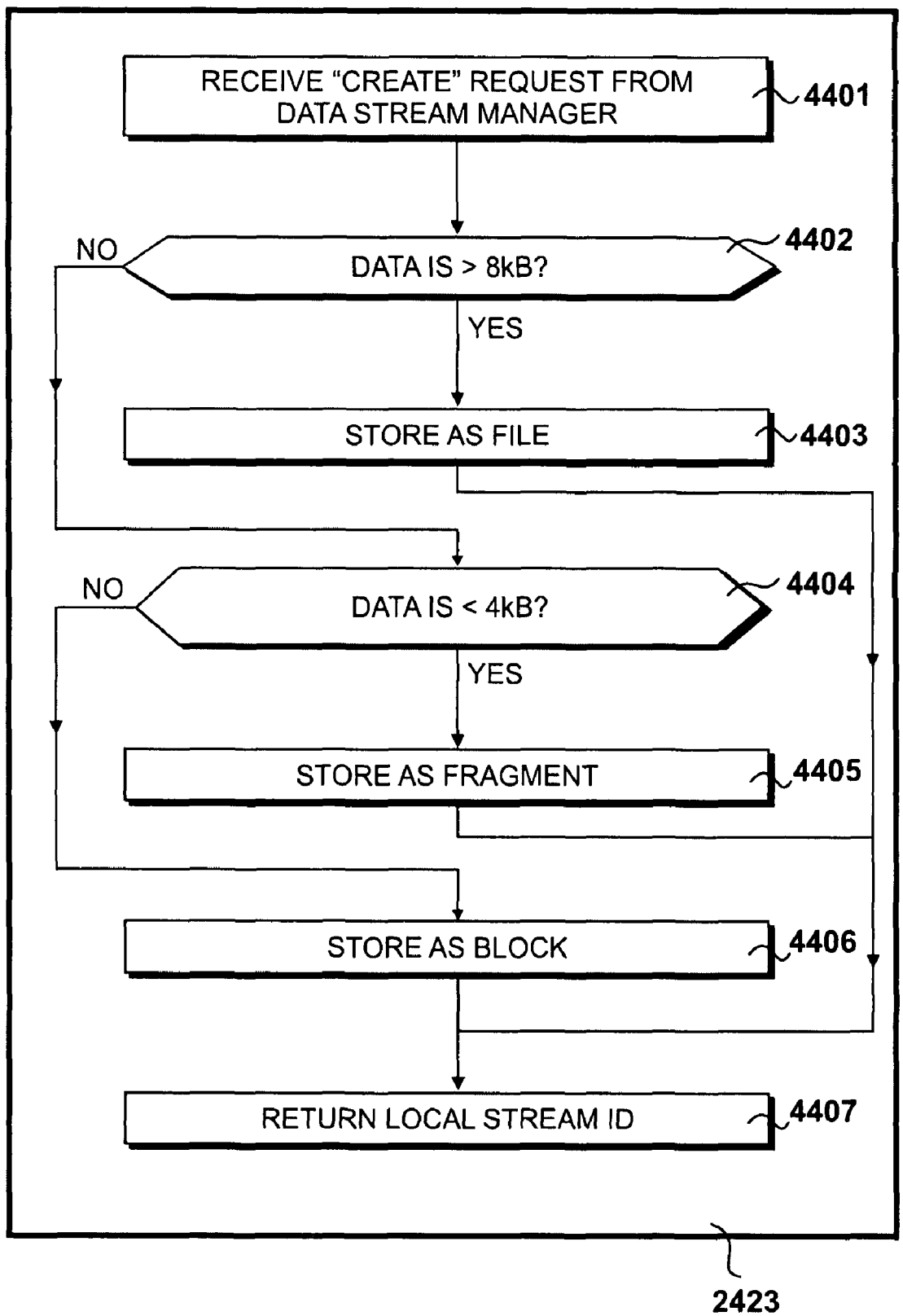
FIG. 44 details a process carried out by the local stream manager shown in FIG. 24C to create a data stream.

FIG. 44 details CreateStream process 2423 on local stream manager 2312. At step 4401 a CREATE request with a data stream ID, data to be to a new data stream, and an indication of the size of the data is received from data stream manager 2302. At step 4402 a question is asked at to whether the data contained within the data stream is larger than 8 kB, and if this question is answered in the affirmative then at step 4403 the file is stored. If it is answered in the negative then at step 4404 a question is asked at to whether the data is smaller than 4 kB. If this question is answered in the affirmative then at step 4405 the data is stored as a fragment at step 4405. If it is answered in the negative then the data is stored as a block at step 4406.

Following any of steps 4403, 4405 or 4406, at step 4407 the local stream ID of the created stream is passed to data stream manager 2312.

FIG. 45

Figure 45:
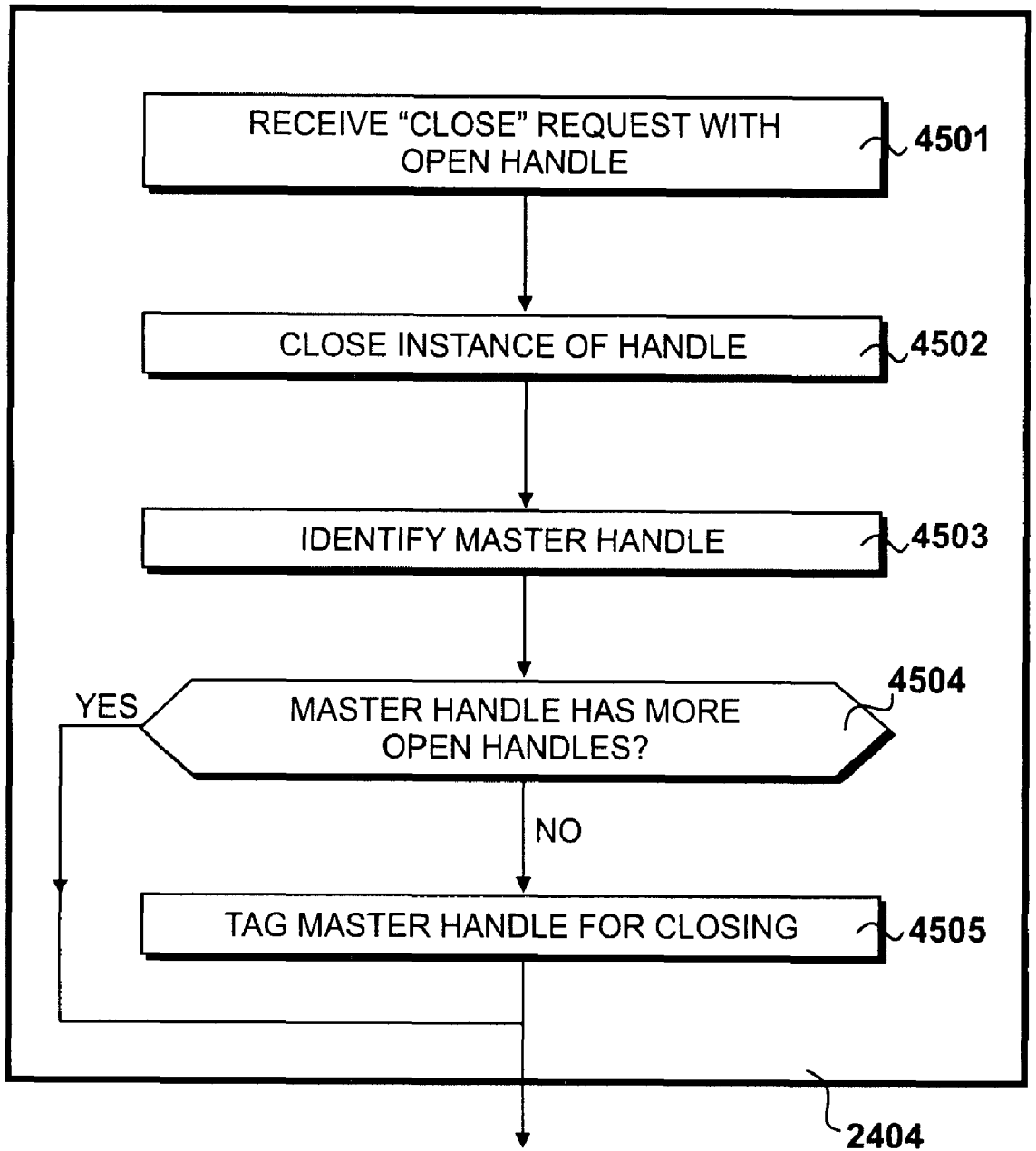
FIG. 45 details a process carried out by the data access manager shown in FIG. 24A to close a data stream.

Close process 2404 on data access manager 801 is detailed in FIG. 45. At step 4501 a CLOSE request along with an open handle is received from an application. At step 4502 the open handle ID is removed from hash table 807 and at step 4503 the master handle is identified. At step 4504 a question is asked at to whether there are any more open handles that reference this master handle. If this question is answered in the negative then at step 4505 the master handle is tagged for closing.

FIG. 46

Figure 46:
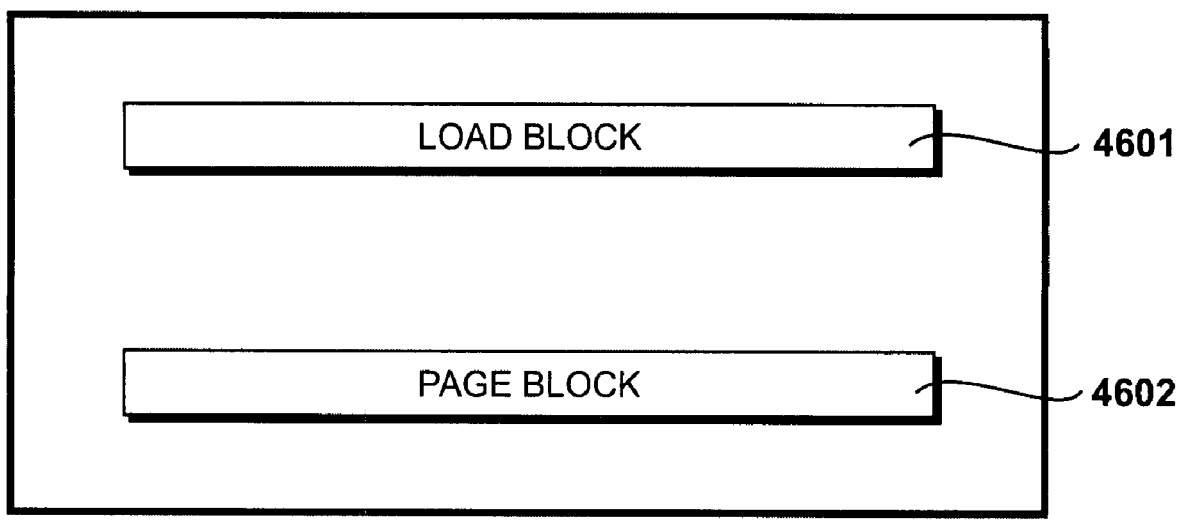
FIG. 46 shows the atomic cache manager shown in FIG. 8.

FIG. 46 shows atomic cache manager 804. It includes two processes, load block process 4601, which loads blocks from the storage device into memory, and page block process 4601 which pages blocks back to disk when they have been changed. The atomic cache 808 in memory consists of a 32 MB buffer 719 that stores changed blocks before they are paged to the hard drive, and a table that links the physical location of blocks within the buffer or on disk to their logical IDs that can be identified from local stream IDs. This table is duplicated on the hard drive 313. When local stream manager requests an 8 kB block of data, read block process 4601 retrieves it, stores it in the buffer and locks it for access. Page block process 4602 then writes blocks back to disk that were locked for write access before being unlocked.

When local stream manager 2312 writes a block it does not write to the same location but to a new block. The atomic cache table ID is updated to link the logical ID of the block with the physical address of the new block. Periodically, the table is paged to disk, and at this point the old physical location is no longer relevant and can be overwritten. However, should a crash occur before the paging the old table references the logical ID to the physical location of the old block and thus the filesystem is still intact, although data may be lost.

FIG. 47

Figure 47:
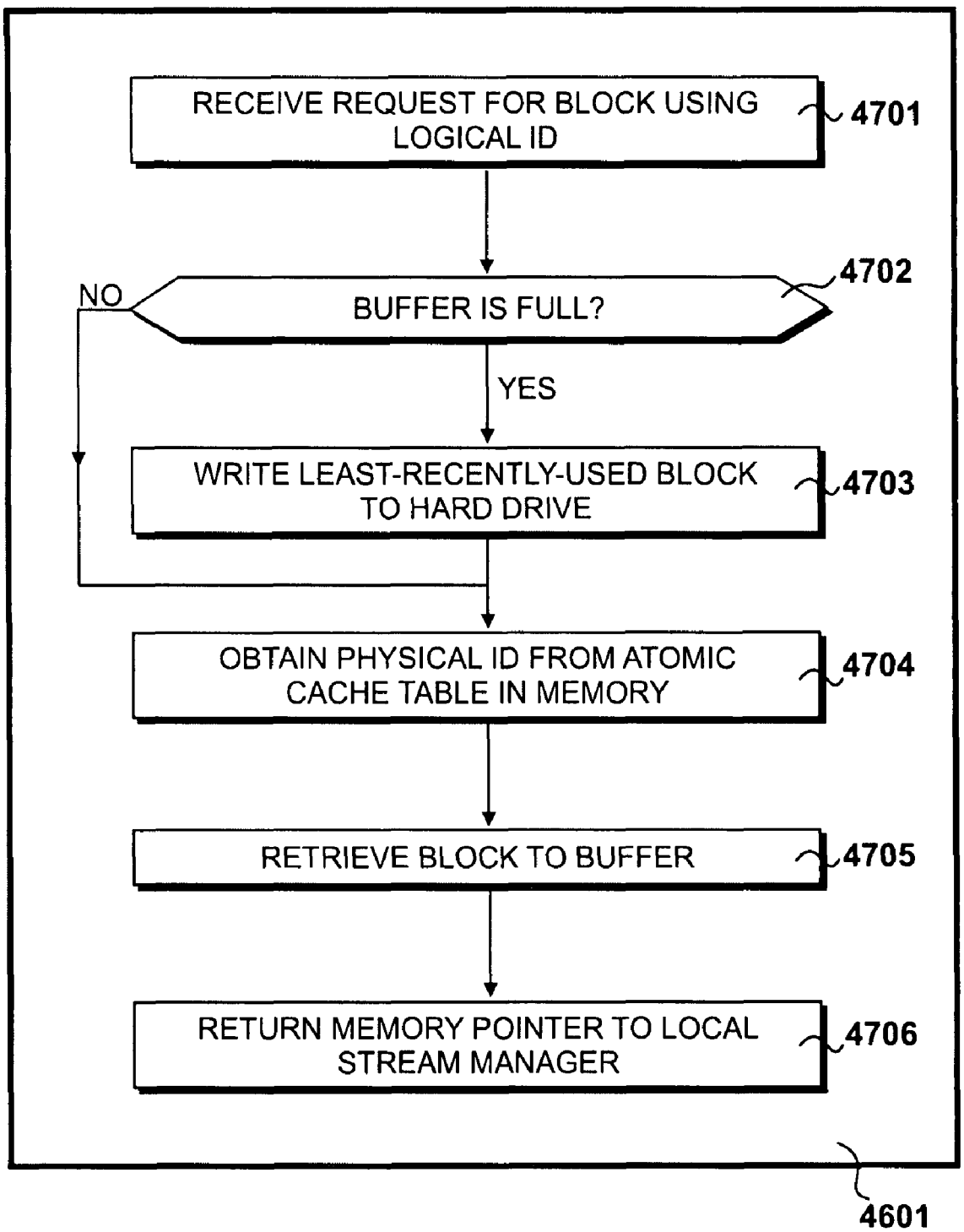
FIG. 47 details a process carried out by the atomic cache manager shown in FIG. 46 to load a block into memory.

Load block process 4601 is detailed in FIG. 47. At step 4701 the process receives a request from local stream manager that contains the logical ID of a block of data, which includes whether the block is to be locked for read-write access or read-only access. At step 4702 a question is asked as to whether the buffer is full. If this question is answered in the affirmative then a block must be removed. The buffer operates a two-queue system to calculate the most least-recently-used modified block and at step 4703 this block is paged back to the hard drive 313. Following this, and if the question asked at step 4703 is answered in the negative, at step 4704 a unused physical location within the buffer is obtained by interrogating the atomic cache table 4701 and at step 4705 the required block is retrieved from the hard drive 313 and locked into memory, either for read-write access or read-only access. A memory pointer is then returned to the local stream manager at step 4706.

FIG. 48

Figure 48:
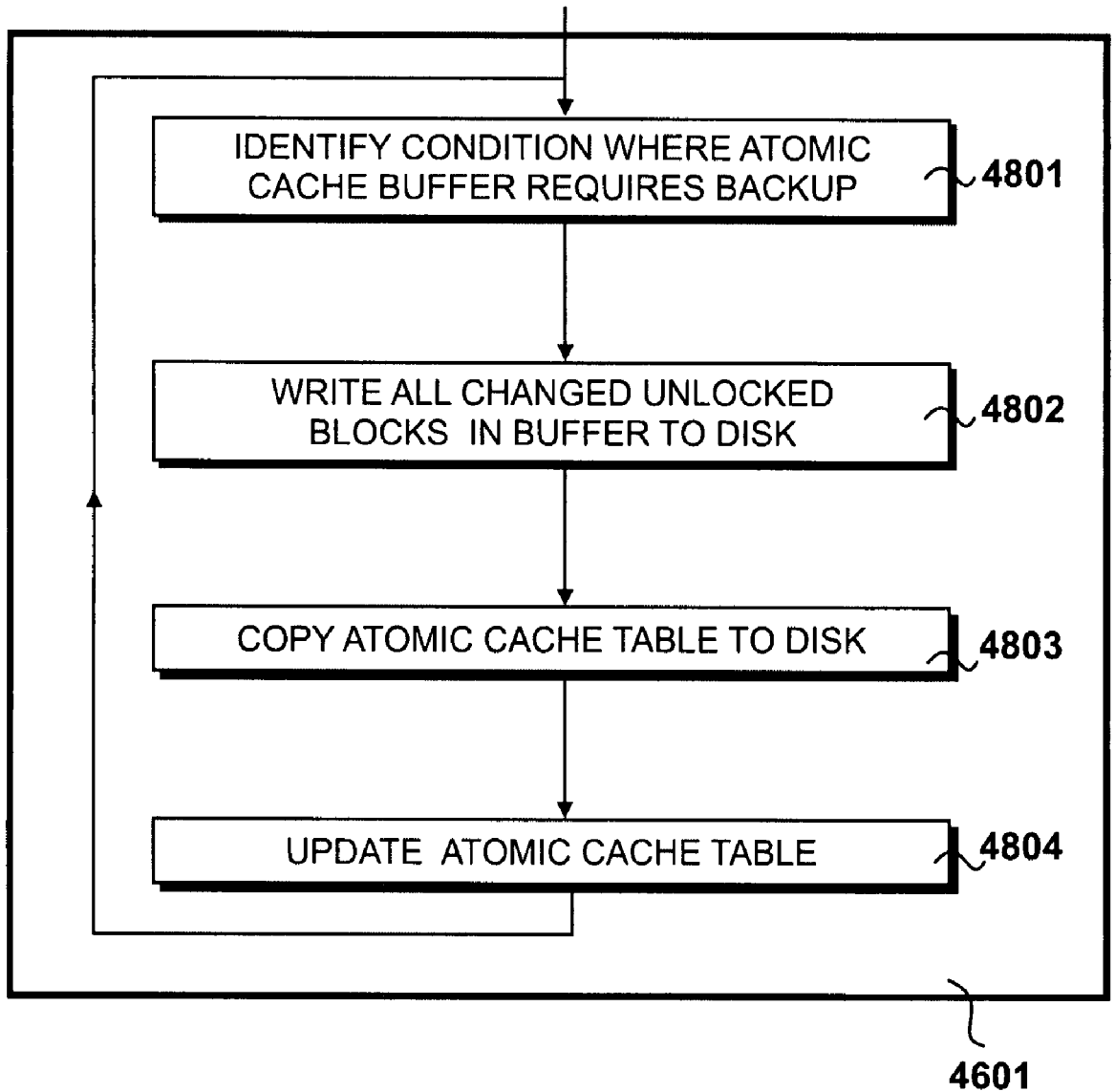
FIG. 48 details a process carried out by the atomic cache manager shown in FIG. 46 to page blocks back to disk.

FIG. 48 details page block process 4602. At step 4801 a condition is identified that the atomic cache buffer 4701 needs backing up. This happens with variable frequency depending upon how much read-write access to the blocks is being made by local stream manager 2312. At step 4802 all the blocks in the buffer 808 are written to the hard drive 313 using an atomic operation. At step 4803 the atomic cache table is updated to indicate that this has occurred, concluding page block process 4602.

FIG. 49

Figure 49:
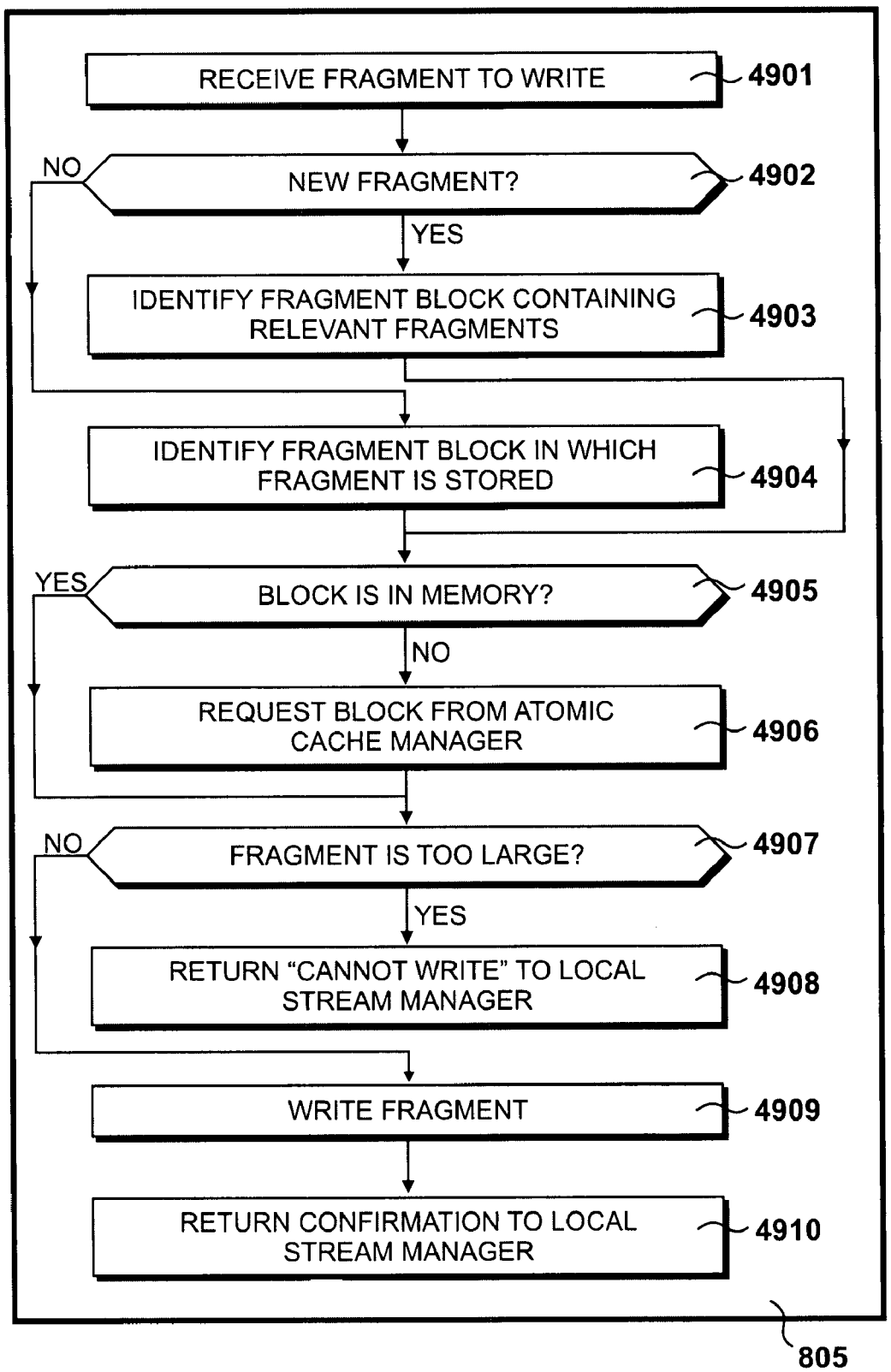
FIG. 49 shows the fragment manager shown in FIG. 8.

Fragment manager 805 which writes fragments to fragment sets is detailed in FIG. 49. At step 4901 a fragment to store is received from local stream manager 2312, along with the data stream ID of a related fragment. In this embodiment a related fragment belongs to or describes the parent directory of the application file that the fragment describes, or an application file within the parent directory. Alternatively, a related fragment could be one that includes a reference to the fragment under consideration or is referred to by it. Alternatively again, fragments are often nodes or leaves in the file object or directory indices, and fragments which are close to each other in the B+ tree can be considered to be related.

At step 4902 a question is asked as to whether this is a new fragment, rather than an old one being changed. If this question is answered in the affirmative then at step 4903 a fragment set containing related fragments is identified. If there is no space in this set, then a child set will be tried, followed by a parent set. Up to three child sets will be created for any set. Finally, if all children and the parent of the set are full, another relevant set will be identified. If the question is answered in the negative then at step 4904 the fragment block in which the fragment is stored is identified.

At step 4905 a question is asked as to whether the required block is in memory, and if this question is answered in the negative then at step 4906 the block is requested from atomic cache manager 804. Following this, or if the question asked at step 4805 is answered in the negative, a further question is asked as to whether the fragment is too large for the fragment set. The space allocated to the fragment can expand and contract, into another block in the set if necessary, but if the fragment has become too large for the set then it must be stored in another set. Thus if this question is answered in the affirmative then at step 4908 the message "cannot write" is returned to local stream manager 2312. Alternatively, the fragment is written at step 4909 and confirmation of write is returned to the local stream manager 2312 at step 4910.

When a fragment is stored in a space that is too big or too small for it, or when a fragment is deleted, all the other fragments in the block are moved forwards or backwards, and the fragment offsets array 3802 is updated with the new positions of the moved fragments.

FIG. 50

Background threads provided by the data stream extension include indexing service 901, compression service 902 which compresses frozen data streams, backup service 903 which backs up data streams to networked locations, and pre-fetch service 904 that obtains new data streams that are relevant to the user's virtual disks. Processes 901, 902, 903 and 904 run constantly whenever processing system 201 is idle.

Figure 50:
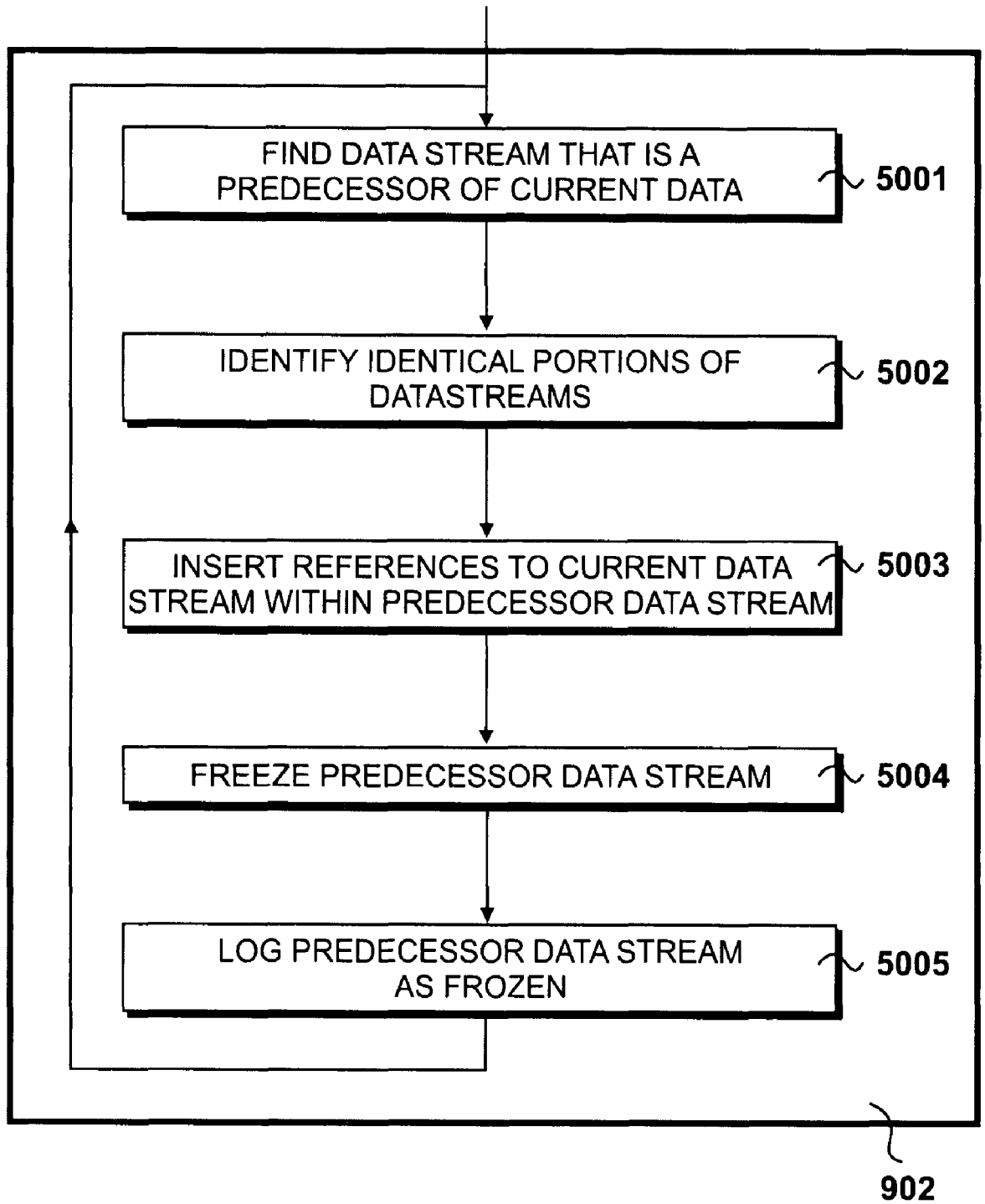
FIG. 50 details the compression process shown in FIG. 9.

Compression process 902 is detailed in FIG. 50. At step 5001 the data streams log 809 is interrogated to find a frozen data stream that is a predecessor of a more recent data stream. At step 5002 portions of the data streams that contain or refer to identical data are identified. At step 5003 references to the recent data stream are inserted into the predecessor data stream in place of the data.

Thus it is always older data streams that contain references to newer ones, thus ensuring that the newer and therefore more current data streams will be more quickly accessed.

This compression process is carried out separately on each computer system in the environment shown in FIG. 1. This can mean that data streams with identical data stream IDs may have a different structure because they reference different new data streams. However, when the information is extracted it will be identical. Thus data streams with the same ID may contain different data but are considered to contain identical information.

FIG. 51

Figure 51:
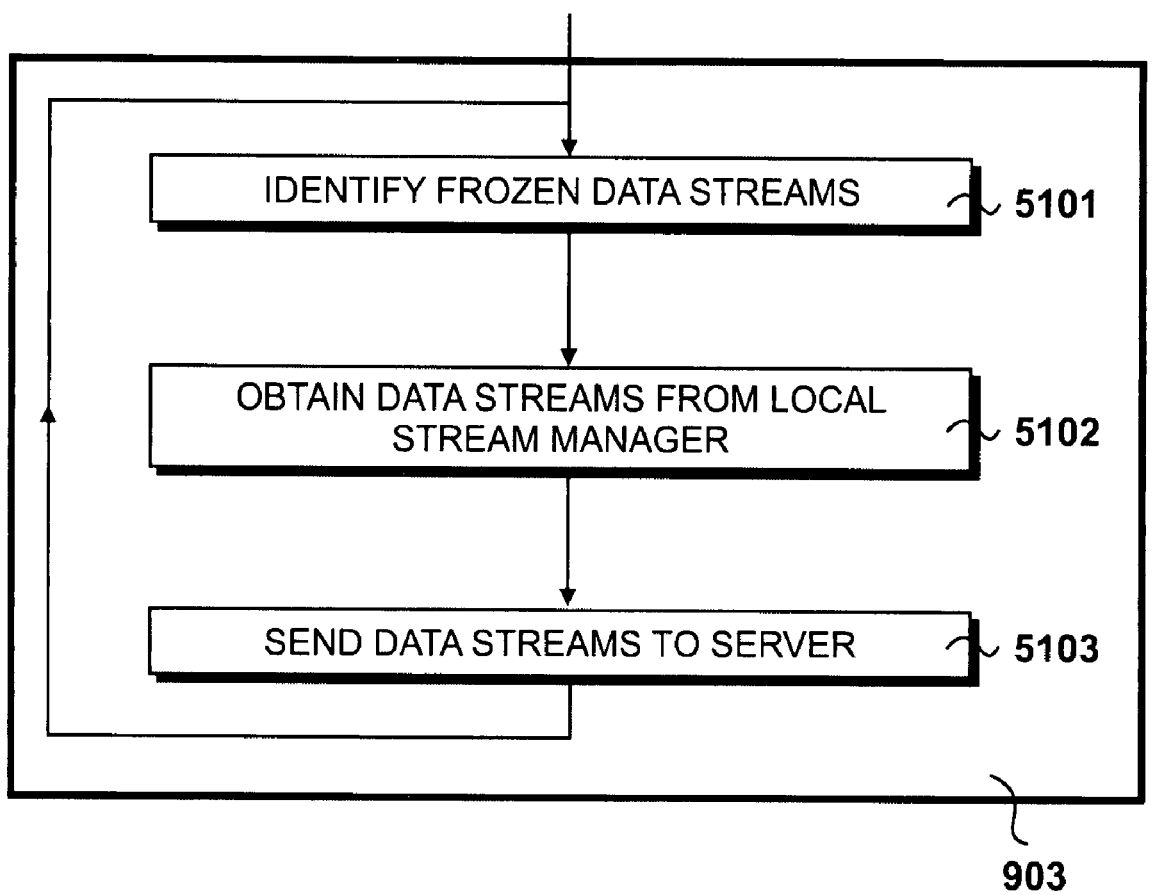
FIG. 51 details the back-up process shown in FIG. 9.

Back-up process 903 is detailed in FIG. 51. At step 5101 frozen data streams are identified from data streams log 809. At step 5102 these data streams are read via local stream manager 803 and at step 5103 the data streams are sent out to the local server for back-up. This process may be repeated by backing up to remote servers 102 and 103 or any other storage device within the environment shown in FIG. 1.

Because it is not possible for a user to access the data contained in the data streams without having the root file object, it is possible to constantly back up data streams in this way without any worry of other users accessing them. In traditional systems a back-up to server would result in other users being able to view a user's data, unless it was password protected, which requires user intervention. Using the system described herein, backups can be done constantly and automatically without this concern.

FIG. 52

Figure 52:
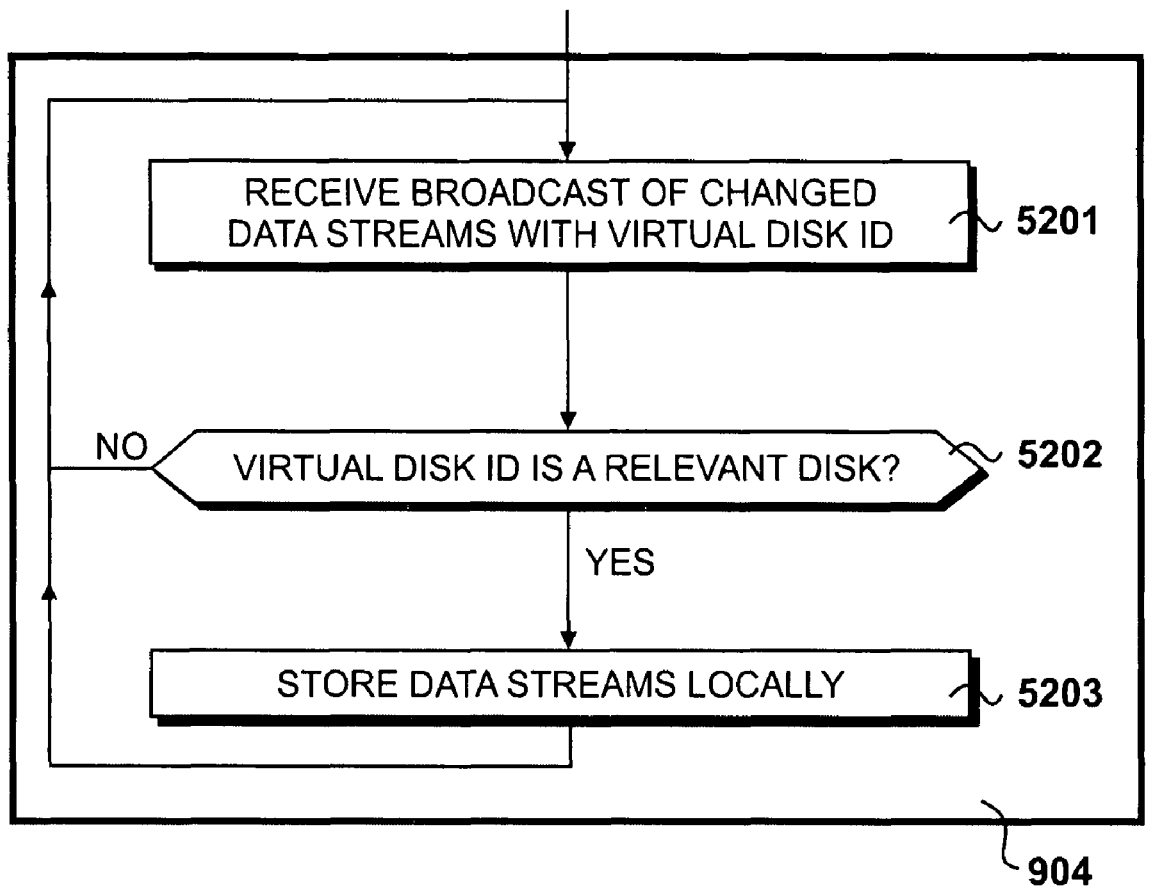
FIG. 52 details the pre-fetch process shown in FIG. 9.

Pre-fetch process 904 is detailed in FIG. 52. At step 5201 a broadcast is received from a server that contains new data streams, along with an identification of the virtual disks to which they are relevant. At step 5202 a question is asked as to whether any of these virtual disks are used by the system, and if this question is answered in the affirmative the data streams are stored locally at step 5203. If it is answered in the negative the broadcast is ignored. This allows a single network transmission to update multiple clients, thus reducing network traffic.

Additionally, when processing system 201 is idle and if there is sufficient storage space, the pre-fetch process may also interrogate local or remote servers for changes to relevant virtual disks and receive new data streams in response.

This process ensures as far as possible that any data streams that might be required in the near future are available.

The invention claimed is:

1. A computer-implemented method comprising steps of:
 storing and indexing data objects, each having a file identification, by said file identifications using an index having a tree configuration, wherein said index defines a virtual directory structure for a plurality of application files, each application file thereby having a location within said virtual directory structure, and said index is traversed to identify a location of a data object, wherein each of said data objects contains data that facilitates the access of a corresponding application file;
   analyzing data objects to assess an extent to which the location within said virtual directory structure of the application file corresponding to a second data object is related to the location within the virtual directory structure of the application file corresponding to a first data object; and
   allocating similar file identifications to the data objects corresponding to related application files, thereby clustering, within said tree, locations of data objects corresponding to related application files; wherein an application file may be a directory or a file, and a data object corresponding to a directory includes a reference to a further index that indexes the contents of the directory, wherein each of said further indices has a tree configuration, and wherein said further index is a B+ tree in which the keys are the names of application files and the values are corresponding file identifications; wherein:
   said step of analyzing data objects is performed by assessing the location of corresponding application files within a virtual directory structure, where application files located within the same virtual directory are considered to be more related than those located within different virtual directories, and wherein:
   said step of assessing the location of corresponding application files is performed by splitting the location path of an application file into a plurality of parts, creating a hash of each part and combining said hashes.

2. A method according to claim 1, wherein said index is a B+ tree in which the keys are file identifications and the values are corresponding data objects.

3. A method according to claim 1, wherein an application file may be a directory or a file, and a data object corresponding to a file includes a reference to a data stream that contains the information contained in the file.

4. A method according to claim 3, wherein said data stream contains references to further data streams and said information contained in said data stream is described by data contained in said data stream and said further data streams.

5. A non-transitory computer-readable medium having computer-readable instructions executable by a computer such that when executing said instructions a computer will perform the steps of:
 storing and indexing data objects, each having a file identification, by said file identifications using an index having a tree configuration, wherein said index defines a virtual directory structure for a plurality of application files, each application file thereby having a location within said virtual directory structure, each of said data objects contains data that facilitates the access of a corresponding application file, and said index is traversed to identify a location of a data object, wherein each of said data objects contains data that facilitates the access of a corresponding application file;
   analyzing data objects to assess an extent to which the location within the virtual directory structure of the application file corresponding to a second data object is related to the location within the virtual directory structure of the application file corresponding to a first data object; and
   allocating similar file identifications to the data objects corresponding to related application files, thereby clustering, within said tree, locations of data objects corresponding to related application files; wherein an application file may be a directory or a file, and a data object corresponding to a directory includes a reference to a further index that indexes the contents of the directory, wherein each of said further indices has a tree configuration, and wherein said further index is a B+ tree in which the keys are the names of application files and the values are corresponding file identifications; wherein:
   said step of analyzing data objects is performed by assessing the location of corresponding application files within a virtual directory structure, where application files located within the same virtual directory are considered to be more related than those located within different virtual directories, and wherein:

said step of assessing the location of corresponding application files is performed by splitting the location path of an application file into a plurality of parts, creating a hash of each part and combining said hashes.

6. A non-transitory computer-readable medium according to claim 5, wherein an application file may be a directory or a file, and a data object corresponding to a directory includes a reference to a further index that indexes the contents of the directory.

7. A non-transitory computer-readable medium according to claim 5, wherein an application file may be a directory or a file, and a data object corresponding to a file includes a reference to a data stream that contains the information contained in the file.

8. A data structure apparatus comprising a processing device and at least one storage device, wherein said processing device is configured to:

store data in the form of application files in said storage device, wherein each application file has a corresponding data object that contains data that facilitates the access of an application file;

produce an index having a tree configuration, wherein said index defines a virtual directory structure for a plurality of application files, each application file thereby having a location within said virtual directory structure;

storing and indexing data objects corresponding to said application files, each data object having a file identification, by said file identifications using said index, wherein said index is traversed to identify a location of data object;

analyze the application files to assess an extent to which their locations within the virtual directory structure are related; and allocate similar file identifications to data objects corresponding to related application files, thereby clustering the locations of data objects corresponding to related application files in said index; wherein an application file may be a directory or a file, and a data object corresponding to a directory includes a reference to a further index that indexes the contents of the directory, wherein each of said further indices has a tree configuration, and wherein said further index is a B+ tree in which the keys are the names of application files and the values are corresponding file identifications; wherein:

said processor is configured to analyze application files by assessing the location of corresponding application files within a virtual directory structure, where application files located within the same virtual directory are considered to be more related than those located within different virtual directories, and wherein:

said processor is configured to assess the location of corresponding application files by splitting the location path of an application file into a plurality of parts, creating a hash of each part and combining said hashes.

9. The apparatus according to claim 8, wherein the index produced by the processing device takes the form of a B+ tree having keys and values, wherein the keys of said tree are file identifications and the values of said tree are corresponding data objects.

10. A method comprising steps of:

storing and indexing data objects in a processing device, each data object having a file identification, by said file identifications using an index having a tree configuration, wherein said index defines a virtual directory structure for a plurality of application files, each application file thereby having a location within said virtual directory structure, and said index is traversed to identify a location of a data object, wherein each of said data objects contains data that facilitates the access of a corresponding application file;

analysing data objects with the processing device to assess an extent to which the location within said virtual directory structure of the application file corresponding to a second data object is related to the location within the virtual directory structure of the application file corresponding to a first data object; and allocating similar file identifications to the data objects corresponding to related application files, thereby clustering, within said tree, locations of data objects corresponding to related application files, wherein said index is a B+ tree in which the keys are file identifications and the values are corresponding data objects, wherein said step of analyzing data objects is performed by assessing the location of corresponding application files within a virtual directory structure, where application files located within the same virtual directory are considered to be more related than those within different directories, wherein said step of assessing the location of corresponding application files is performed by creating a hash of the location path of the application file, wherein said hash is created by splitting said location path into three parts, creating a hash of each part, and combining said hashes.

* * * * *